United States Patent
Seiler et al.

(10) Patent No.: US 11,315,327 B1
(45) Date of Patent: Apr. 26, 2022

(54) BEAM-RACING FALLBACKS IN A DISPLAY ENGINE

(71) Applicant: Facebook Technologies, LLC, Menlo Park, CA (US)

(72) Inventors: Larry Seiler, Redmond, WA (US); Alexander Nankervis, Seattle, WA (US); John Adrian Arthur Johnston, San Mateo, CA (US); Jeremy Freeman, Kirkland, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 53 days.

(21) Appl. No.: 16/669,260

(22) Filed: Oct. 30, 2019

Related U.S. Application Data

(60) Provisional application No. 62/755,368, filed on Nov. 2, 2018.

(51) Int. Cl.
| | | |
|---|---|---|
| *G06T 19/00* | (2011.01) | |
| *G06F 3/0346* | (2013.01) | |
| *G06F 3/01* | (2006.01) | |
| *A63F 13/40* | (2014.01) | |
| *A63F 13/213* | (2014.01) | |
| *G06K 9/00* | (2006.01) | |
| *A63F 13/245* | (2014.01) | |

(52) U.S. Cl.
CPC .......... *G06T 19/006* (2013.01); *A63F 13/213* (2014.09); *A63F 13/245* (2014.09); *A63F 13/40* (2014.09); *G06F 3/011* (2013.01); *G06F 3/017* (2013.01); *G06F 3/0346* (2013.01); *G06K 9/00671* (2013.01)

(58) Field of Classification Search
CPC combination set(s) only.
See application file for complete search history.

(56) References Cited

U.S. PATENT DOCUMENTS

| | | |
|---|---|---|
| 5,699,497 A | 12/1997 | Erdahl et al. |
| 6,111,582 A | 8/2000 | Jenkins |
| 9,986,215 B1 | 5/2018 | Tardif et al. |

(Continued)

OTHER PUBLICATIONS

Akeley K., "Reality Engine Graphics," In Proceedings of the 20th annual conference on Computer graphics and interactive techniques, Sep. 1, 1993, pp. 109-116.

(Continued)

*Primary Examiner* — Andrew G Yang
(74) *Attorney, Agent, or Firm* — Baker Botts L.L.P.

(57) ABSTRACT

In one embodiment, a method includes determining a first time interval for rendering pixel values for a first portion of a display, where the first portion of the display is one of a plurality of portions of the display, accessing a representation of virtual objects in a virtual scene, and determining that the first time interval is insufficient for rendering pixel values for the first portion of the display based on the representation of virtual objects. The method further includes, for each of the portions of the display, determining a current viewpoint of a user, rendering, based on the current viewpoint of the user, pixel values for that portion of the display, and sending the rendered pixel values to be output by the display, where the rendered pixel values for the first portion of the display are rendered based on a simplified representation of virtual objects in the virtual scene.

20 Claims, 25 Drawing Sheets

(56) References Cited

U.S. PATENT DOCUMENTS

| | | | |
|---|---|---|---|
| 10,028,022 B1* | 7/2018 | Pique Corchs | H04N 21/44209 |
| 10,572,764 B1* | 2/2020 | Bastani | G02B 30/34 |
| 10,714,027 B1 | 7/2020 | Bastani et al. | |
| 11,069,124 B2 | 7/2021 | Hunt et al. | |
| 2009/0303170 A1 | 12/2009 | Chung et al. | |
| 2011/0043521 A1 | 2/2011 | Smyth | |
| 2014/0092316 A1 | 4/2014 | Rumreich | |
| 2016/0189423 A1* | 6/2016 | Kaeser | G06F 3/012 345/420 |
| 2017/0047033 A1 | 2/2017 | Tanaka et al. | |
| 2017/0235362 A1 | 8/2017 | Thunstrom et al. | |
| 2017/0236466 A1 | 8/2017 | Spitzer et al. | |
| 2017/0316601 A1 | 11/2017 | Kakarlapudi et al. | |
| 2017/0330496 A1* | 11/2017 | Oravainen | A63F 13/5255 |
| 2018/0040097 A1* | 2/2018 | Saleh | G06T 1/20 |
| 2018/0107271 A1 | 4/2018 | Woo | |
| 2018/0114342 A1* | 4/2018 | Lee | H04N 5/23238 |
| 2018/0146212 A1 | 5/2018 | Hensler et al. | |
| 2018/0226007 A1 | 8/2018 | Yamada | |
| 2018/0275410 A1* | 9/2018 | Yeoh | H04N 13/344 |
| 2018/0286105 A1 | 10/2018 | Surti et al. | |
| 2018/0300933 A1 | 10/2018 | Burke et al. | |
| 2018/0350036 A1 | 12/2018 | Vanreenen et al. | |
| 2018/0357794 A1 | 12/2018 | Young et al. | |
| 2018/0373200 A1 | 12/2018 | Shi et al. | |
| 2019/0035363 A1 | 1/2019 | Schluessler et al. | |
| 2019/0057647 A1 | 2/2019 | Hack | |
| 2019/0088002 A1 | 3/2019 | Howson et al. | |
| 2019/0110053 A1 | 4/2019 | Varia et al. | |
| 2019/0156785 A1 | 5/2019 | Marchya et al. | |
| 2019/0221029 A1* | 7/2019 | Yoneda | G06T 15/20 |
| 2019/0272028 A1 | 9/2019 | Hong et al. | |
| 2019/0318530 A1 | 10/2019 | Hunt et al. | |
| 2020/0090396 A1 | 3/2020 | Holmes et al. | |
| 2021/0142552 A1* | 5/2021 | Kimura | G06T 17/20 |

OTHER PUBLICATIONS

Benthin C., et al., "Efficient Ray Tracing of Subdivision Surfaces Using Tessellation Caching," In Proceedings of the 7th Conference on High-Performance Graphics, 2015, 8 pages.

Binder N., et al., "Efficient Stackless Hierarchy Traversal on GPUs With Backtracking in Constant Time," In Proceedings of High Performance Graphics, 2016, pp. 41-50.

Carr N.A., et al., "The Ray Engine, GPU Algorithms for Radiosity and Subsurface Scattering," In Proceedings of the ACM SIGGRAPH/ EUROGRAPHICS Conference on Graphics Hardware (HWWS '02), 2003, 10 pages.

Cook R.L., et al., "Distributed Ray Tracing," ACM, Computer Graphics, Jul. 1984, vol. 18 (3), pp. 137-145.

Dammertz H., et al., "Shallow Bounding Volume Hierarchies for Fast SIMD Ray Tracing of Incoherent Rays," In Proceedings of the Nineteenth Eurographics Conference on Rendering (EGSR '08), Jun. 2008, pp. 1-8.

Davidovic T., et al., "3D Rasterization: A Bridge Between Rasterization and Ray Casting," In Proceedings of Graphics Interface, 2012, 8 pages.

Demers J., "Chapter 23. Depth of Field: A Survey of Techniques," GPU Gems, Randima Fernando Edition, Addison-Wesley, 2004, 11 pages.

Garanzha K., et al., "Fast Ray Sorting and Breadth-First Packet Traversal for GPU Ray Tracing," In Computer Graphics Forum, EUROGRAPHICS, 2010, vol. 29 (2), pp. 289-298.

Goldsmith J., et al., "Automatic Creation of Object Hierarchies for Ray Tracing," IEEE Computer Graphics and Applications, May 1987, vol. 7 (5), pp. 14-20.

Gruenschlo L., et al., "MSBVH: An Efficient Acceleration Data Structure for Ray Traced Motion Blur," In Eurographics, ACM SIGGRAPH Symposium on High Performance Graphics, ACM, 2011, 6 pages, DOI:http://dx.doi.org/10.1145/2018323.2018334.

Guenter B., et al., "Foveated 3D graphics," ACM Transactions on Graphics, Nov. 1, 2012, vol. 31 (6), 10 pages, XP055199808.

Heitz E., et al., "The SGGX Microflake Distribution," ACM Transactions on Graphics, Jul. 2015, 11 pages.

Igehy H., "Tracing Ray Differentials," In Proceedings Conference on Computer Graphics and Interactive Techniques (SIGGRAPH '99), 1999, 8 pages.

Johnson G.S., et al., "The Irregular Z-buffer: Hardware Acceleration for Irregular Data Structures," ACM Transactions on Graphics, 2005, vol. 24 (4), 18 pages.

Karras T., et al., "Fast Parallel Construction of High-Quality Bounding Volume Hierarchies," In Proceedings of the 5th High-Performance Graphics Conference, ACM, 2013, 11 pages.

Keller A., et al., "The Path Tracing Revolution in the Movie Industry," In ACM SIGGRAPH 2015 Courses, 2015, Article 24, pp. 1-7.

Kramida G., "Resolving the Vergence-Accommodation Conflict in Head-Mounted Displays," IEEE Transactions on Visualization and Computer Graphics, 2015, vol. 22 (7), pp. 1912-1931, 20 pages.

Mattausch O., et al., "CHC+RT: Coherent Hierarchical Culling for Ray Tracing," In Computer Graphics Forum, 2015, vol. 34 (2), pp. 1-12.

Moller T., et al., "Fast, Minimum Storage Ray/Triangle Intersection," Journal of Computer Graphics Techniques, Oct. 1997, vol. 2 (1), pp. 1-7.

Molnar S., et al., "A Sorting Classification of Parallel Rendering," IEEE Computer Graphics and Applications, Jul. 1994, vol. 14 (4), 11 pages.

Parker S.G., et al., "OptiX: A General Purpose Ray Tracing Engine," ACM transactions on graphics, Jul. 2010, vol. 29 (4), Article 66, 13 pages.

Patidar S., et al., "Ray Casting Deformable Models on the GPU," Graphics & Image Processing, Indian Conference on Computer Vision, Graphics and Image Processing, Sixth Indian Conference IEEE, 2008, pp. 481-488.

Patney A., et al., "Perceptually-Based Foveated Virtual Reality," SIGGRAPH 2016 Emerging Technologies, Jul. 24-28, 2016, 2 pages.

Reshetov A., et al., "Multi-level Ray Tracing Algorithm," In ACM SIGGRAPH 2005 Papers, ACM, 2005, pp. 1176-1185.

Roger D., et al., "Whined Ray-tracing for Dynamic Scenes Using a Ray-space Hierarchy on the GPU," In proceedings of the 18th Eurographics Conference on Rendering Techniques, 2007, 13 pages.

Saito T., et al., "Comprehensible Rendering of 3-D Shapes," In Proceedings of the 17th Annual Conference on Computer Graphics and Interactive Techniques, ACM, Aug. 1990, vol. 24 (4), pp. 197-206.

Toth R., et al., "Comparison of Projection Methods for Rendering Virtual Reality," Eurographics Association, 2016, 9 pages.

Wald I., et al., "Embree: A Kernel Framework for Efficient CPU Ray Tracing," ACM Transactions on Graphics, Jul. 2014, vol. 33 (4), Article 143, 8 pages.

Wald I., et al., "Ray Tracing Deformable Scenes Using Dynamic Bounding Volume Hierarchies," ACM Transactions on Graphics, Jan. 2007, vol. 26 (1), Article 6, pp. 1-28.

Wald I., et al., "State of the Art in Ray Tracing Animated Scenes," In Eurographics 2007, STAR—State of the Art Reports, 2007, 28 pages.

Walter B., et al., "Microfacet Models for Refraction Through Rough Surfaces," In Proceedings of the 18th Eurographics Conference on Rendering Techniques (EGSR), 2007, 12 pages.

Warren H., et al., "Ray-Specialized Acceleration Structures for Ray Tracing," 2008 IEEE Symposium on Interactive Ray Tracing, IEEE, 2008, 8 pages.

Whitted T., et al., "An Improved Illumination Model for Shaded Display," Communication ACM, Jun. 1980, vol. 23 (6), 6 pages.

Wyman C., et al., "Frustum-Traced Raster Shadows: Revisiting Irregular Z-Buffers," In Proceedings of the 19th Symposium on Interactive 3D Graphics and Games (i3D '15), ACM, 2015, 9 pages.

* cited by examiner

0: L0-Full-A (16 samples)     1-7: (use pattern 0)

0: L1-Full-A (8 samples)     1: L1-Full-B (16 samples)
2: L1-Mid-A (10 samples)     3: L1-Mid-B (12 samples)
4: L1-Low-A (8 samples)      5: (use pattern 4)
6: L1-High-A (8 samples)     7: (use pattern 6)

0: L2-Full-A (4 samples)     1: L2-Full-B (8 samples)
2: L2-Mid-A (6 samples)      3: L2-Mid-B (6 samples)
4: L2-Low-A (4 samples)      6: L2-High-A (4 samples)
5: L2-Low-B (4 samples)      7: L2-High-B (4 samples)

BEAM-RACING FALLBACKS IN A DISPLAY ENGINE

PRIORITY

This application claims the benefit, under 35 U.S.C. § 119(e), of U.S. Provisional Patent Application No. 62/755,368, filed 2 Nov. 2018, which is incorporated herein by reference.

TECHNICAL FIELD

This disclosure generally relates to generating graphics for an artificial reality scene.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a beam racing technique may be used to reduce the latency between generating and displaying images in a scanning display by generating portions of each image and providing the image portions to the display at particular times in accordance with timing information provided by the display. Each image portion is termed a "swath" and may correspond to one or more full or partial rows of image pixels. The display may be a resonant scanning display, in which case the swaths may be provided to the display at times that are based on the motion of the resonant scanning device. Generating and displaying swaths in this way is desirable in AR/VR systems because each swath may be displayed as soon as it has been generated, rather than waiting for the whole image to be generated before displaying any part of the image. Since the system processes one swath at a time, instead of waiting the entire image, the delay between image generation and pixel output is reduced, and each swath may be based on the most recent movement/perspective of the user available at the time the swath is generated.

In particular embodiments, a computing system may schedule swath generation for a resonant scanning AR/VR display that uses beam racing by receiving a clock signal waveform that specifies future motion of scanning assembly in the AR/VR display, determine future emission timing based on the clock signal waveform, identify, based on the future emission timing, a time interval that is to occur in the near future, determine how many lines (or pixels) are to be generated for a swath during the time interval based on length of the time interval, and schedule generation of the determined number of lines of the swath to be performed during the time interval. Subsequently, when the time interval occurs (e.g., the start time of the time interval is reached), the swath may be generated by a display engine and sent to a display system for display.

In particular embodiments, each swath may have a time budget, and if swath generation will not or does not finish within its allotted time interval, one or more fallback actions may be performed. The fallback actions do not render the swath as originally requested, but may instead render the swath as black to indicate its absence, or cause the scene complexity to be reduced, so that the swath may be rendered within its time budget in the next frame. Swath generation time may exceed the swath's time budget because, for example, scene complexity is unpredictable, and the scene that contains the swath may be more complex than can be processed within the time interval allotted to the swath.

Foveated rendering may be used to increase the speed at which images may be generated by rendering "non-foveated" regions of the display which may be seen by the portion of the retina outside the fovia, with less detail than "foveated" regions of the display, which may be seen by the fovea. The fovea of the eye, located the center of the retina, has the highest density of cones in the retina, and therefore allows the eye to see more detail than the portion of the retina outside the fovia. Using this foveated rendering technique may reduce the computational cost (e.g., processing time) of rendering images without visibly reducing image quality, since reductions in image quality in the foveated regions are unlikely to be seen by the user. As such, tiles of a non-foveated region of an image may be rendered with less detail than tiles in the foveated region. Since non-foveated regions may be generated more quickly, the time needed to generate the image may be reduced. Tiles may be rendered with less detail by, for example, determining the values of a subset of the pixels using pixel interpolation and replication instead of bilinear interpolation.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
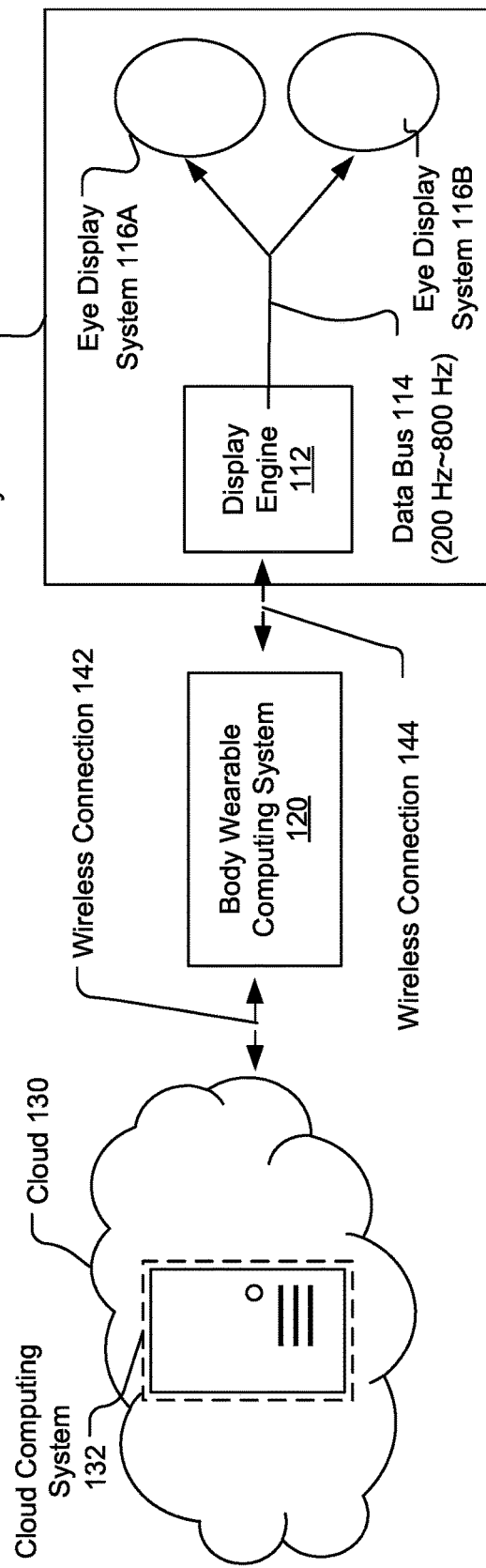
FIG. 1A illustrates an example artificial reality system.

In particular embodiments, a beam racing technique may be used to reduce the latency between generating and displaying images in a scanning display by generating portions of each image and providing the image portions to the display at particular times in accordance with timing information provided by the display. Each image portion is termed a "swath" and may correspond to one or more full or partial rows of image pixels. The display may be a resonant scanning display, in which case the swaths may be provided to the display at times that are based on the motion of the resonant scanning device. Generating and displaying swaths in this way is desirable in AR/VR systems because each swath may be displayed as soon as it has been generated, rather than waiting for the whole image to be generated before displaying any part of the image. Since the system processes one swath at a time, instead of waiting the entire image, the delay between image generation and pixel output is reduced, and each swath may be based on the most recent movement/perspective of the user available at the time the swath is generated.

Swaths may be provided to the display on-demand. The display may specify a particular swath to be provided by the graphics generation system, the size of the swath (e.g., 16 or 32 rows of pixels across the length of the display), and timing constraints that determine when the swath is to be provided to the display. For example, the display may specify that different swaths are to be provided in different time intervals having different lengths based on oscillation of a mirror in the resonant scanning display.

A resonant scanning display may use an electrostatic actuator that oscillates at a particular frequency to generate an image. The scanning display may include a scanning assembly in which the scanning element is a scanning mirror driven using one or more microelectromechanical systems (MEMS) components. For example, the scanning mirror may be rotated in one or more dimensions using one or more MEMS actuators. Such resonant MEMS devices provide certain benefits over linear MEMS devices, including lower power consumption, reduced size, and potentially larger scan angles. However, resonant scanning displays may demand pixel data at varying rates so that pixel display is synchronized with the oscillation of a scanning element such as a mirror. Providing pixel data to a resonant display using beam racing can be challenging because the speed of the oscillator, and thus the lengths of the time intervals during which swaths may be sent to the display, may vary over time. Traditional beam racing methods use fixed-length time intervals, and the time interval length is determined by a graphics processing unit (GPU). In resonant scanning displays, the scanning display may determine the length of each time interval, and the length of each time interval may be different from the previous time interval. Traditional beam racing methods are thus unsuitable for use with resonant scanning displays.

In particular embodiments, a computing system may schedule swath generation for a resonant scanning VR display that uses beam racing by receiving a clock signal waveform that specifies future motion of scanning assembly in the VR display, determine future emission timing based on the clock signal waveform, identify, based on the future emission timing, a time interval that is to occur in the near future, determine how many lines (or pixels) are to be generated for a swath during the time interval based on length of the time interval, and schedule generation of the determined number of lines of the swath to be performed during the time interval. Subsequently, when the time interval occurs (e.g., the start time of the time interval is reached), the swath may be generated by a display engine and sent to a display system for display.

The terms "row" and "column" as used herein may refer to a physical arrangement of emitters and/or emitter related circuitry into groups, and are sometimes used together to differentiate between two spatial dimensions that are orthogonal to each other. Rows and columns are generally interchangeable and should not be taken to refer to any particular dimension. For instance, a row may refer to either the horizontal or the vertical dimension of a display device. Further, the term "line" may refer to a row or a column.

FIG. 1A illustrates an example artificial reality system 100. In particular embodiments, the artificial reality system 100 may include a headset system 110, a body wearable computing system 120, a cloud computing system 132 in a cloud 130, etc. In particular embodiments, the headset system 110 may include a display engine 112 which is connected to two eye display systems 116A and 116B through a data bus 114. The headset system 110 may be a system including a head-mounted display (HMD) which may be mounted on a user's head to provide artificial reality to the user. The headset system 110 may have limited amount of power available in its power sources (e.g., batteries). The display engine 112 may provide display data to the eye display systems 116A and 116B though the data bus 114 with relative high data rates (e.g., 200 Hz~800 Hz). The display engine 112 may include one or more controller blocks, texel memories, transform blocks, pixel blocks, etc. The texels stored in the texel memories may be accessed by pixel blocks and may be provided to the eye display systems 116A and 116B for display.

Figure 1B:
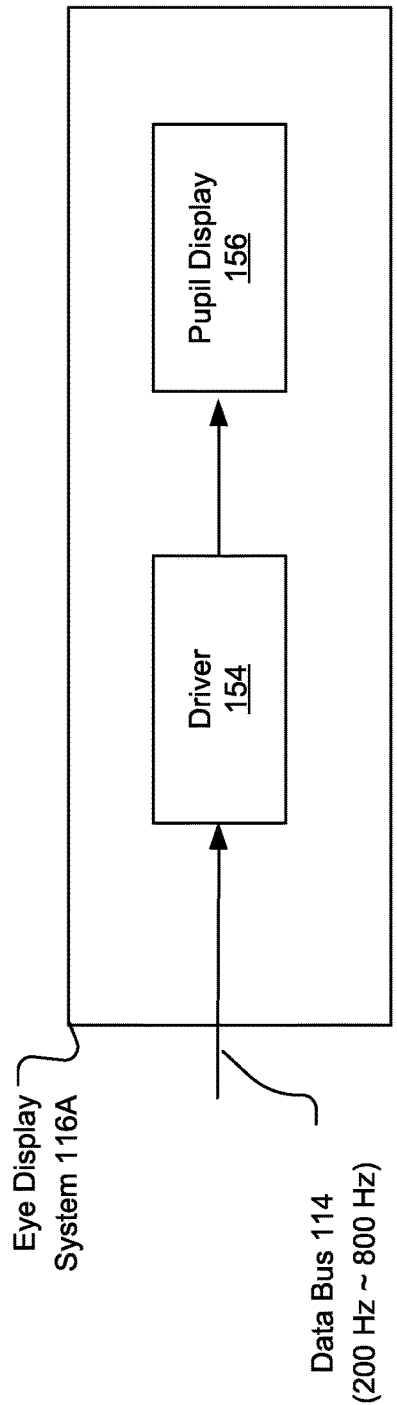
FIG. 1B illustrates an example eye display system of a headset system.

In particular embodiments, the body wearable computing system 120 may be worn on the body of a user. In particular embodiments, the body wearable computing system 120 may be a computing system (e.g., a laptop, a desktop, a mobile computing system) that is not worn on a user body. The body wearable computing system 120 may include one or more GPUs, one or more smart video decoders, memories, processors, and other modules. The body wearable computing system 120 may have more computational resources than the display engine 112 but may still have limited amount power in its power sources (e.g., batteries). The body wearable computing system 120 may be coupled with the headset system 110 through a wireless connection 144. The cloud computing system 132 may be high performance computers (e.g., servers) and may communicate with the body wearable computing system 120 through a wireless connection 142. FIG. 1B illustrates an example eye display system (e.g., 116A or 116B) of the headset system 110. In particular embodiments, the eye display system 116A may include a driver 154, a pupil display 156, etc. The display engine 112 may provide display data to the pupil display 156 the data bus 114 and the driver 154 at high data rates (e.g., 200 Hz~800 Hz).

Figure 2A:
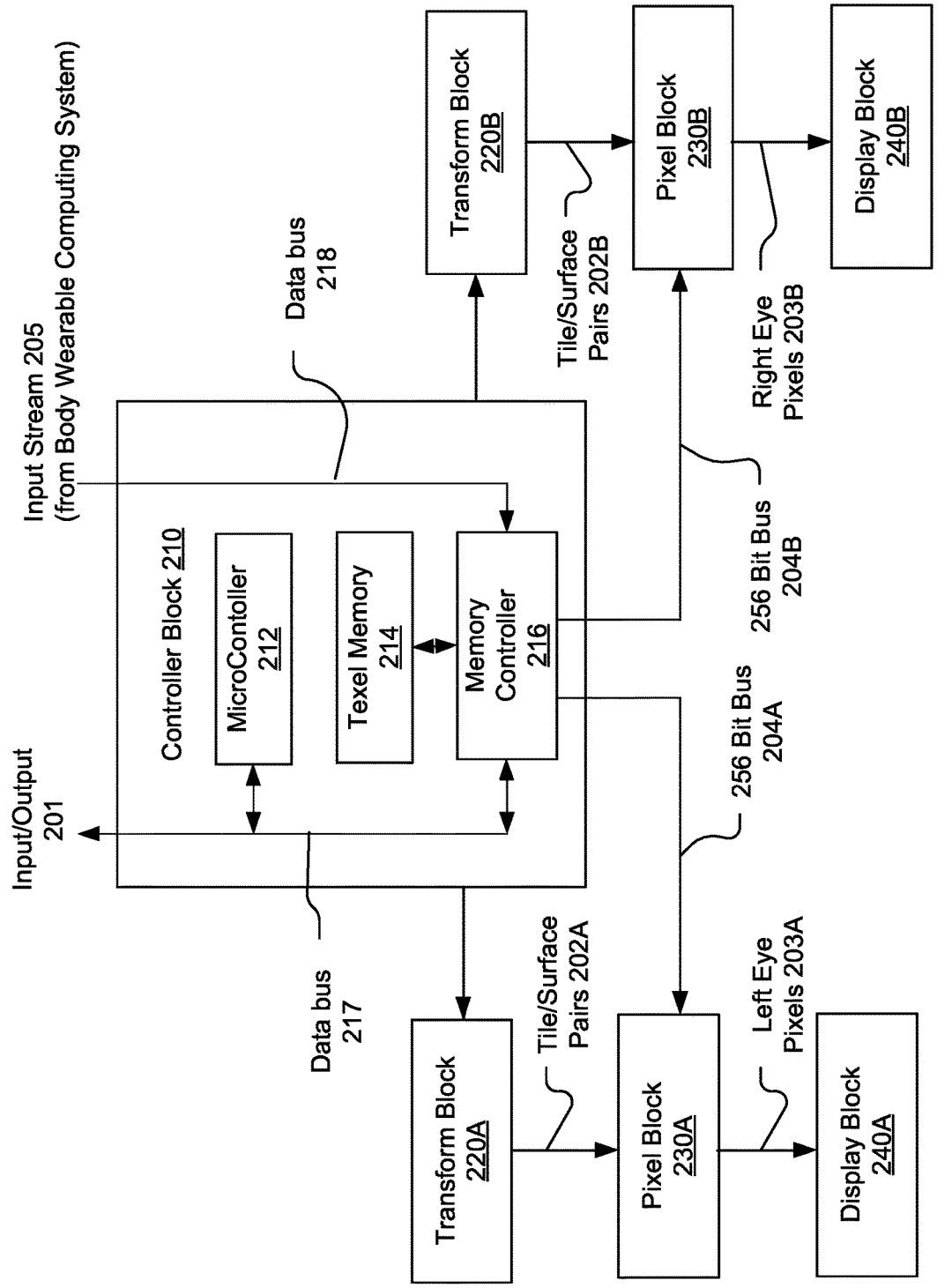
FIG. 2A illustrates a system diagram for a display engine.

FIG. 2A illustrates a system diagram for a display engine 112. In particular embodiments, the display engine 112 may include a control block 210, transform blocks 220A and 220B, pixel blocks 230A and 230B, display blocks 240A and 240B, etc. One or more of the components of the display engine 112 may be configured to communicate via a high-speed bus, shared memory, or any other suitable method. As shown in FIG. 2A, the control block 210 of display engine 112 may be configured to communicate with the transform blocks 220A and 220B, pixel blocks 230A and 230B, and display blocks 240A and 240B. As explained in further detail herein, this communication may include data as well as control signals, interrupts and other instructions.

In particular embodiments, the control block 210 may receive input from the body wearable computing system (e.g., 120 in FIG. 1A) and initialize a pipeline in the display engine 112 to finalize the rendering for display. In particular embodiments, the control block 210 may receive data and control packets from the body wearable computing system. The data and control packets may include information such as one or more surfaces comprising texture data and position data and additional rendering instructions. The control block 210 may distribute data as needed to one or more other blocks of the display engine 112. The control block 210 may initiate pipeline processing for one or more frames to be displayed. In particular embodiments, each of the eye display systems 116A and 116B may comprise its own control block 210. In particular embodiments, one or more of the eye display systems 116A and 116B may share a control block 210.

In particular embodiments, the transform blocks 220A and 220B may determine initial visibility information for surfaces to be displayed in the artificial reality scene. In general, the transform blocks 220A and 220B may cast rays from pixel locations on the screen and produce filter commands (e.g., filtering based on bilinear or other types of interpolation techniques) to send to the pixel blocks 230A and 230B. The transform blocks 220A and 220B may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and may produce results to send to the pixel blocks 230A and 230B.

In general, the transform blocks 220A and 220B may each comprise a four-stage pipeline, in accordance with particular embodiments. The stages of a transform block 220A or 220B may proceed as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems 116A and 116B of the headset system 110. The transform blocks 220A and 220B may determine whether each ray bundle intersects with surfaces in the scene by comparing a bounding box of each tile to bounding boxes for the surfaces. If a ray bundle does not intersect with an object, it may be discarded. Tile-surface intersections are detected, and the corresponding tile-surface pair is passed to the pixel blocks 230A and 230B.

In general, the pixel blocks 230A and 230B may determine color values from the tile-surface pairs to produce pixel color values, in accordance with particular embodiments. The color values for each pixel may be sampled from the texture data of surfaces received and stored by the control block 210. The pixel blocks 230A and 230B may receive tile-surface pairs from the transform blocks 220A and 220B and may schedule bilinear filtering. For each tile-surface pair, the pixel blocks 230A and 230B may sample color information for the pixels within the tile using color values corresponding to where the projected tile intersects the surface. In particular embodiments, the pixel blocks 230A and 230B may process the red, green, and blue color components separately for each pixel. In particular embodiments, the pixel block 230A of the display engine 112 of the first eye display system 116A may proceed independently, and in parallel with, the pixel block 230B of the display engine 112 of the second eye display system 116B. The pixel block may then output its color determinations to the display block.

In general, the display blocks 240A and 240B may receive pixel color values from the pixel blocks 230A and 230B, covert the format of the data to be more suitable for the scanline output of the display, apply one or more brightness corrections to the pixel color values, and prepare the pixel color values for output to the display. The display blocks 240A and 240B may convert tile-order pixel color values generated by the pixel blocks 230A and 230B into scanline or row-order data, which may be required by the physical displays. The brightness corrections may include any required brightness correction, gamma mapping, and dithering. The display blocks 240A and 240B may output the corrected pixel color values directly to the physical display (e.g., pupil display 156 in FIG. 1B via the driver 154) or may output the pixel values to a block external to the display engine 112 in a variety of formats. For example, the eye display systems 116A and 116B or headset system 110 may comprise additional hardware or software to further customize backend color processing, to support a wider interface to the display, or to optimize display speed or fidelity.

In particular embodiments, the controller block 210 may include a microcontroller 212, a texel memory 214, a memory controller 216, a data bus 217 for I/O communication, a data bus 218 for input stream data 205, etc. The memory controller 216 and the microcontroller 212 may be coupled through the data bus 217 for I/O communication with other modules of the system. The microcontroller 212 may receive control packages such as position data and surface information though the data bus 217. The input stream data 205 may be input to controller blocks 210 from the body wearable computing system after being set up by the microcontroller 222. The input stream data 205 may be converted to the required texel format and stored into the texel memory 214 by the memory controller 216. In particular embodiments, the texel memory 214 may be static random-access memory (SRAM).

In particular embodiments, the body wearable computing system may send input stream data 205 to the memory controller 216, which may convert the input stream data into texels with required formats and store the texels with swizzle patterns in the texel memory 214. The texel memory organized in these swizzle patterns may allow the texels (e.g., in 4×4 texel blocks) that are needed for determining at least one color component (e.g., red, green, and/or blue) of every pixel all pixels associated with a tile (e.g., "tile" refers to an aligned block of pixels, such as a block of 16×16 pixels) to be retrieved by the pixel bocks 230A and 230B using one reading operation. As a result, the headset could avoid the excess multiplexing operations that are needed for reading and assembling texel array if the texel array is not stored in such patterns, and therefore reduces computational resource requirement and power consumption of the headset system.

In particular embodiments, the pixel blocks 230A and 230B may generate pixel data for display based on retrieved texels from the texel memory 212. The memory controller 216 may be coupled to pixel blocks 230A and 230B through two 256 bits data buses 204A and 204B, respectively. The pixel bocks 230A and 230B may receive the tile/surface pair from the respective transform blocks 220A and 220B and may identify the texels that are needed to determine at least one color component of all the pixels associated with the tile. The pixel blocks 230A and 230B may parallelly retrieve the identified texels (e.g., a 4×4 texel array) from the texel memory 214 through the memory controller 216 and the 256 bits data buses 204A and 204B. For example, the 4×4 texel array that are needed to determine at least one color component of all the pixels associated with a tile may be stored in one memory block and may be retrieved using one memory reading operation. The pixel blocks 230A and 230B may use multiple sample filter blocks (e.g., one or each color component) to parallelly perform interpolation on different groups of texels to determine the corresponding color component for the corresponding pixels. The pixels values may be sent to the display blocks 240A and 240B for further processing before being displayed by the eye display systems 116A and 116B, respectively.

Figure 2B:
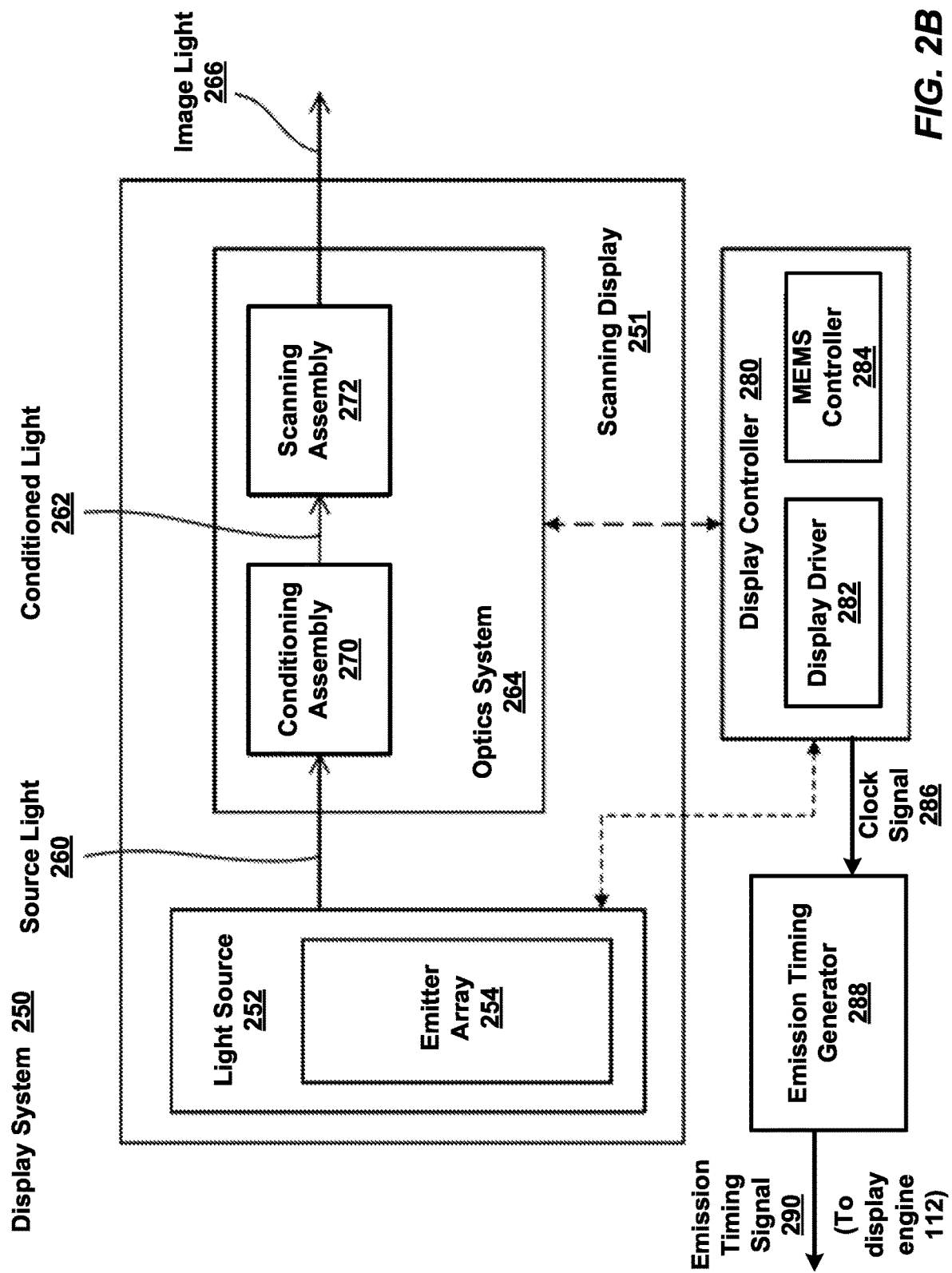
FIG. 2B is a simplified block diagram of a display system for implementing one or more embodiments.

FIG. 2B is a simplified block diagram of a display system 250 for implementing one or more embodiments. The display system 250 includes a scanning display 251, and further includes a display controller 280, a light source 252, and an optics system 264. The scanning display 251 generates image light 266 in accordance with scanning instructions from the display controller 280. The scanning display 251 includes a light source 252 and an optics system 264. The light source 252 is a source of light that generates a spatially coherent or a partially spatially coherent source light 260. The source light 260 may comprise a display image. The optics system 264 comprises at least a conditioning assembly 270 and a scanning assembly 272. The conditioning assembly 270 conditions the source light 260 into conditioned light 262, and the scanning assembly 272 scans the conditioned light 262. The image light 266 may be coupled to an entrance of an output waveguide.

The light source 252 emits light in accordance with image data in the form of one or more illumination parameters received from the display controller 280. An illumination parameter is used by the light source 252 to generate light. An illumination parameter may include, e.g., source wavelength, pulse rate, pulse amplitude, beam type (continuous or pulsed), other parameter(s) that affect the emitted light, or some combination thereof. The illumination parameter can be applied to an emitter of the light source 252 using analog and/or digital signals. The illumination parameter and/or other image data can be supplied from the display controller 280 to circuitry that generates, based on the image data, the signals which drive the light source. This driving circuitry can be included in the light source 252 (e.g., co-located with emitters of the light source) or located external to the light source 252.

The light source 252 comprises a plurality of emitters, wherein each emitter may be, e.g., a light-emitting diode (LED), a laser diode, a vertical cavity surface emitting laser (VCSEL), an organic LED (OLED), a micro-LED (uLED), a tunable laser, or some other light source that emits coherent or partially coherent light. The emitters of the light source 252 emit light in a visible band (e.g., from about 390 nm to 700 nm), and they may emit light in accordance with one or more illumination parameters. In particular embodiments, the scanning display 251 comprises multiple light sources each with its own array of emitters emitting light in a distinct wavelength such that when scanned, light emitted from each of the light sources are overlapped to produce various wavelengths in a spectrum. Each emitter of the light source 252 comprises an emission surface from which a portion of source light is emitted. The emission surface may be identical for all emitters or may vary between emitters. An emitter width is a width of an area of the emission surface. The emission surface may have different shapes (e.g., circular, hexagonal, etc.). For example, an emitter which is a uLED with a circular emission surface may have an emitter width of 25 micrometers characterized as a diameter of the circular emission surface.

The plurality of emitters of the light source 252 is arranged as an array of emitters. The emitters can be organized in a one-dimensional (1D) or two-dimensional (2D) array. In a 2D array, the emitters are formed along a first dimension and a second dimension orthogonal to the first dimension (e.g., along rows and columns). Each column of emitters corresponds to a respective column in an image ultimately displayed to the user. The emitters may be of various colors. For example, the light source 252 may include a set of red emitters, a set of green emitters, and a set of blue emitters, where emitters of different color together form an individual pixel. An individual pixel may include at least one red emitter, at least one green emitter, and at least one blue emitter. Rows of emitters of the same color may be arranged in a single group. For example, the array may comprise N rows of red emitters followed by N rows of green emitters and then N rows of blue emitters.

The light source 252 may include additional components (e.g., driving circuits, memory elements, heat sinks, etc.). In one or more embodiments, the light source 252 comprises a plurality of data shifting circuits and a plurality of driving circuits, which are electrically coupled to the array of emitters. The data shifting circuits may supply image data from the display controller 280 to the driving circuits, which then generate signals that activate the emitters. In particular image data can be sequentially shifted through a row or column of emitters to form a display image, with the resulting emitted light being scanned to form an output image. The driving circuits include circuitry for controlling the array of emitters based on the image data. For example, the driving circuits may apply illumination parameters received from the display controller 280 (e.g., brightness values received from a display driver 282 of the display controller 280) to control each emitter in the array of emitters using analog and/or digital control signals. The emitters can be controlled using currents (e.g., the display can be a current mode display) or voltages. In particular embodiments, the emitters are controlled using pulse-width modulation (PWM), amplitude adjustments, or a combination of both.

The conditioning assembly 270 conditions source light 260 from the light source 252. Conditioning the source light 260 may include, e.g., expanding, collimating, focusing, distorting emitter spacing, adjusting orientation an apparent location of an emitter, correcting for one or more optical errors (e.g., field curvature, chromatic aberration), some other adjustment of the light, or some combination thereof. The conditioning assembly 270 comprises one or more optical elements (e.g., lenses, mirrors, apertures, gratings, or any other suitable optical element that affects image light 266).

The scanning assembly 272 includes one or more optical elements that redirect light via one or more reflective portions of the scanning assembly 272. The reflective portions may comprise a scanning mirror or other reflective surface. The direction where the light is redirected toward depends on specific orientations of the one or more reflective portions. The one or more reflective portions of the scanning assembly 272 may form a planar or curved surface (e.g., spherical, parabolic, concave, convex, cylindrical, etc.) that operates as a mirror. The scanning assembly 272 scans along at least one dimension of a 2D emitter array 254. In particular embodiments, the scanning assembly 272 is configured to scan in at least the smaller of the two dimensions. For example, if the emitters are arranged in a 2D array where the rows are substantially longer (e.g., contain more emitters) than the columns, then the scanning assembly 272 may scan down the columns (e.g., row by row or multiple rows at a time). In other embodiments, the scanning assembly 272 may perform a raster scan (horizontally or vertically depending on scanning direction). The scanning assembly 272 can include multiple scanning mirrors, each of which is configured to scan in 0, 1, or 2 dimensions. The scanning can be controlled using one or more MEMS devices, e.g., electrostatic or electromagnetic actuators, included in the optics system 264.

The display controller 280 controls the light source 252 and the optics system 264. The display controller 280 takes content for display and divides the content into discrete sections. The display controller 280 instructs the light source 252 to sequentially present the discrete sections using individual emitters corresponding to a respective row or column in an image ultimately displayed to the user. The display controller 280 instructs one or both of the conditioning assembly 270 and the scanning assembly 272 to condition and/or scan the presented discrete sections. The display controller 280 controls the optics system 264 to direct the discrete sections of the image light 266 to different areas, e.g., different portions of one or more coupling elements of an output waveguide. Accordingly, at the eye box of the output waveguide, each discrete portion is presented in a different location. While each discrete section is presented at different times, the presentation and scanning of the discrete sections occurs fast enough such that a user's eye integrates the different sections into a single image or series of images. The display controller 280 also provides illumination parameters (e.g., intensity or brightness values) for the light source 252. The display controller 280 may control each individual emitter of the light source 252.

The display controller 280 may include a combination of software and/or hardware components that control the scanning assembly 272 in synchronization with controlling the light source 252. For example, the display controller 280 may include one or more computer processors, a dedicated graphics processor, application-specific integrated circuits, software programs containing instructions for execution by the one or more computer processors, etc. In particular embodiments, the display controller 280 includes a display driver 282 and a separate MEMS controller 284. The display driver 282 can be implemented as an integrated circuit that generates the image data for the light source 252 based on instructions from a computer processor executing a software application that determines the display images. For example, the software application can be an application that generates an AR or VR presentation for viewing on an HMD. The MEMS controller 284 may include circuitry that generates control signals for one or more MEMS devices that drive the scanning assembly 272. The control signals can include periodic waveforms with linear or sinusoidal pulses. The display driver 282 and the MEMS controller 284 may be communicatively coupled to one another to facilitate the synchronization of output from the display driver 282 with output from the MEMS controller 284. In particular embodiments, the display controller 280 includes timing circuitry such as clock generator that produces one or more clock signals 286 which determine the timing of the outputs of the display driver 282 and the MEMS controller 284. The clock signals 286 may, for example, determine various operational phases for the output of instructions to the light source 252 and/or the output of instructions to the MEMS devices.

In particular embodiments, the clock signals 286 may be, for example, waveforms that specify the movement of the scanning assembly 272. The clock signals 286 may be provided to the display engine 112 for use in determining emission timing that indicates when to output swaths of pixels to the display system 250. For example, the display engine 112 may determine the time intervals at which to send swaths to the display system 250 based on the clock signal 286. Alternatively or additionally, an emission timing generator 288 may generate an emission timing signal 290 and send the emission timing signal 290 to the display engine 112. The emission timing signal 290 may indicate times at which swaths are to be provided to the display 116A, 116B. To provide a lead time $t_{lead}$ for the display engine 112 to generate the swaths prior to sending them to the display 116A, 116B, the emission timing generator 288 may time-shift the clock signal 286, and map the time-shifted clock signal to emission time intervals to form the emission timing signal 290. The emission time intervals may be shorter for portions of the waveform that correspond to faster movement of the scanning assembly 272, and longer for portions of the waveform that correspond to slower movement of the scanning assembly 272. The time-shifted clock signal waveform 286 may be mapped to a sequence of time intervals according to a predetermined mapping from waveforms to emission timings 1010-1030. The sequence of time intervals may correspond to the vertical lines in the emission timings 1010-1030. The sequence of time intervals may be used to generate the emission timing signal 290. In particular embodiments, the emission timing generator 288 may set the value of the signal to a predetermined value, e.g., 1, generate a pulse in the signal, or otherwise change the signal to indicate the time in the future at which each time interval is to begin. For example, as real time elapses, the emission timing generator 288 may set the value of the signal to 1 for a predetermined period of time when a time interval is to start $t_{lead}$ microseconds in the future. In other words, the time at which each interval is to begin may be indicated to the display engine 112 by a particular value or pulse of the emission timing signal 290 at a time $t-t_{lead}$.

Figure 3:
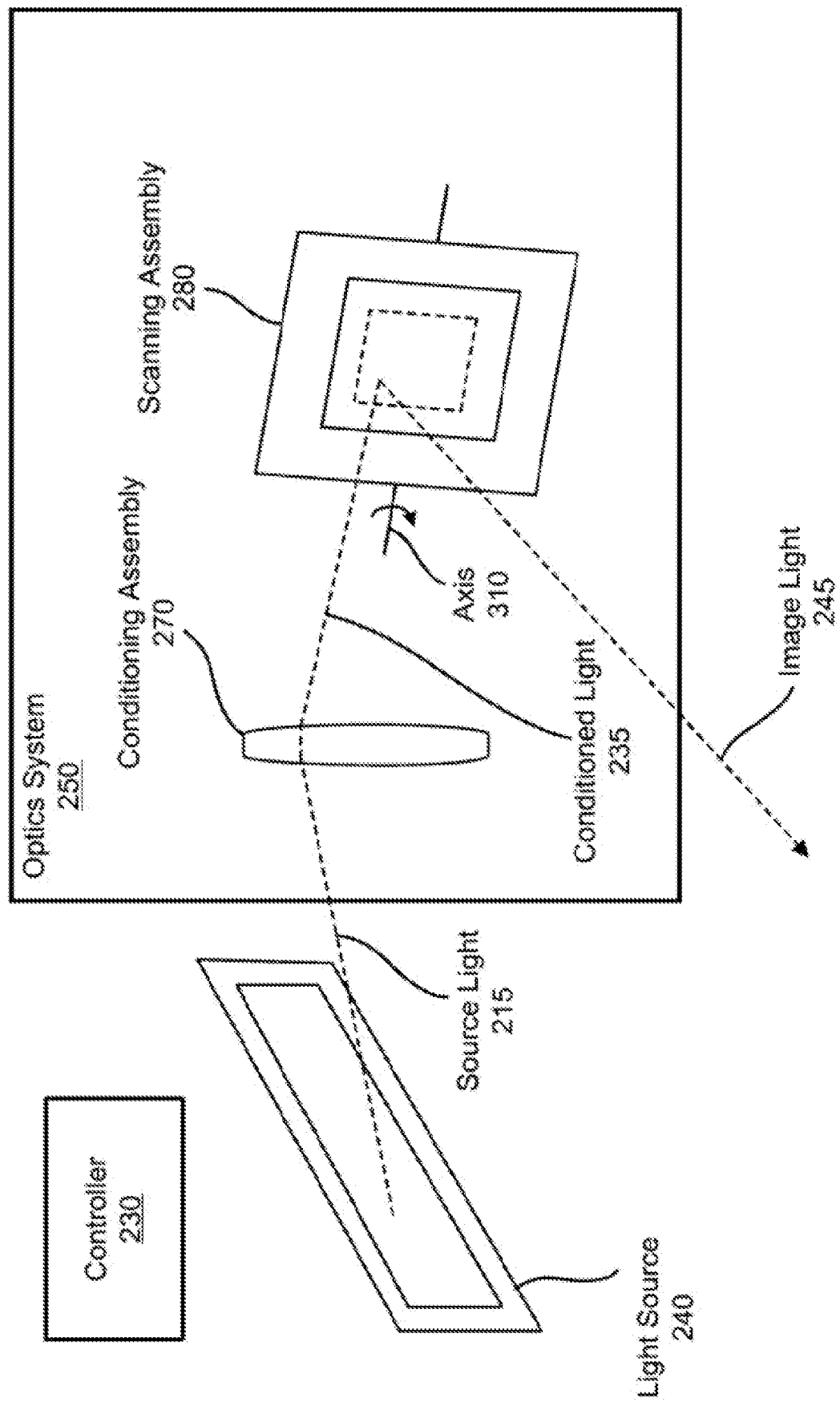
FIG. 3 shows the operation of the scanning display of FIG. 2B.

FIG. 3 shows the operation of the scanning display 251 of FIG. 2B. The scanning display 251 generates light in accordance with scanning instructions from the display controller 280. The light source 252 of the scanning display 251 generates the spatially coherent or the partially spatially coherent source light 260. The optics system 264 receives the source light 260 and with the conditioning assembly 270 converts the source light 260 into conditioned light 262. The conditioned light 262 is then scanned by the scanning mirror assembly 272. The scanning assembly 272 may perform the scanning by rotating about one or more axes (e.g., an axis 310), thereby emitting the image light 266 in one or more dimensions.

FIGS. 4A to 4E illustrate shifting of image data 400 from a scanning display onto a user's eye. The process shown in FIGS. 4A to 4E can be used to control a scanning display in accordance with the techniques described herein. The image data 400 is depicted using alphabetical labels "A" to "M", with each letter representing a row of image data. Each piece of image data 400 is transmitted over time to N number of emitters 412. The emitters 412 may belong to different rows of the same column. Alternatively, the emitters 412 may belong to different columns of the same row. The shifting process depicted in FIGS. 4A to 4E can be used to simultaneously drive multiple rows/columns at a time. For example, in one embodiment the scanning display has 2,560×1536 emitters with 3 colors (e.g., red, green, and blue) and N=8 rows per color. One way to operate the emitters is to send image data for all N emitters every time the row/column is activated. For example, the image data A, C, and E could be sent to emitters 412-C, 412-B, and 412-A, respectively, followed by image data B, D, and F during the next row time. The process of FIGS. 4A to 4E shows an alternative method that reduces the amount of data that needs to be sent.

Figure 4A:
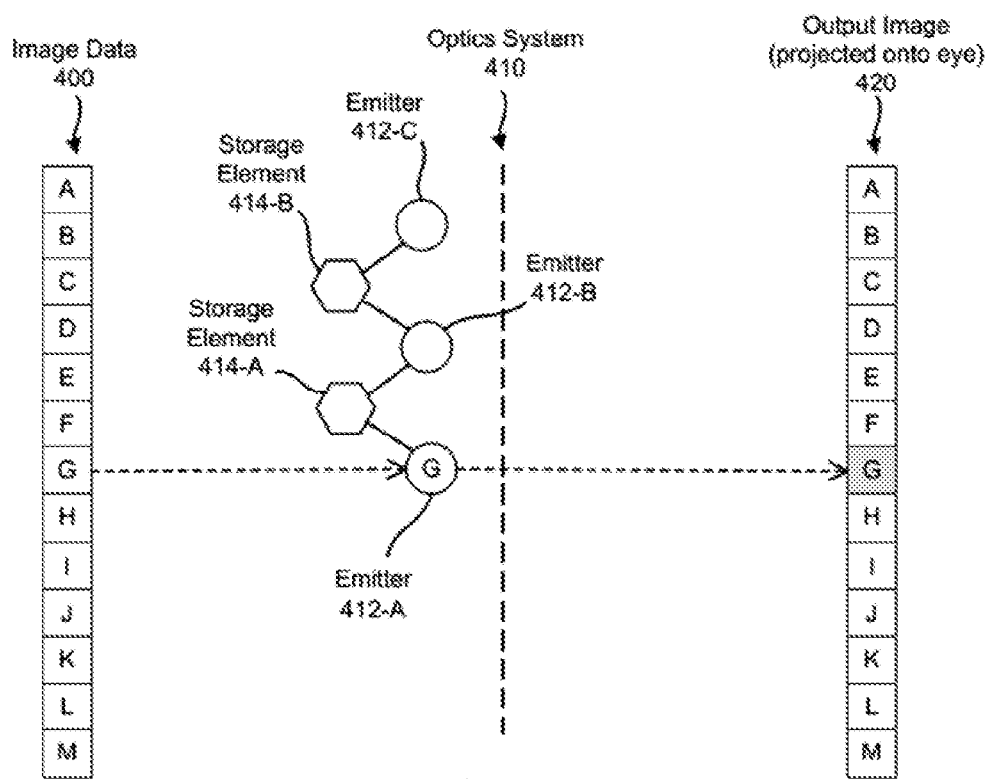
FIGS. 4A to 4E illustrate shifting of image data from a scanning display onto a user's eye.

FIG. 4A shows image data G being loaded into the emitter 412-A and scanned by an optics system 410 to emit light onto an output image 420. The output image 420 corresponds to an image projected onto an eye of a user. As shown, the value G is represented in the output image 420 at a spatial location corresponding to the location of the value G in the image data 400. For convenience, these locations will be referred to as pixels even though, as explained earlier, a pixel may include multiple emitters of different colors rather than a single emitter. Each pixel in the output image 420 may be illuminated N times for each color over a scan cycle. For example, the image data G may be output N times, each time using a different one of the emitters 412. To avoid retransmitting the image data each time, the image data can be stored using storage elements 414 and shifted into the next emitter that is to receive the same image data.

Figure 4B:
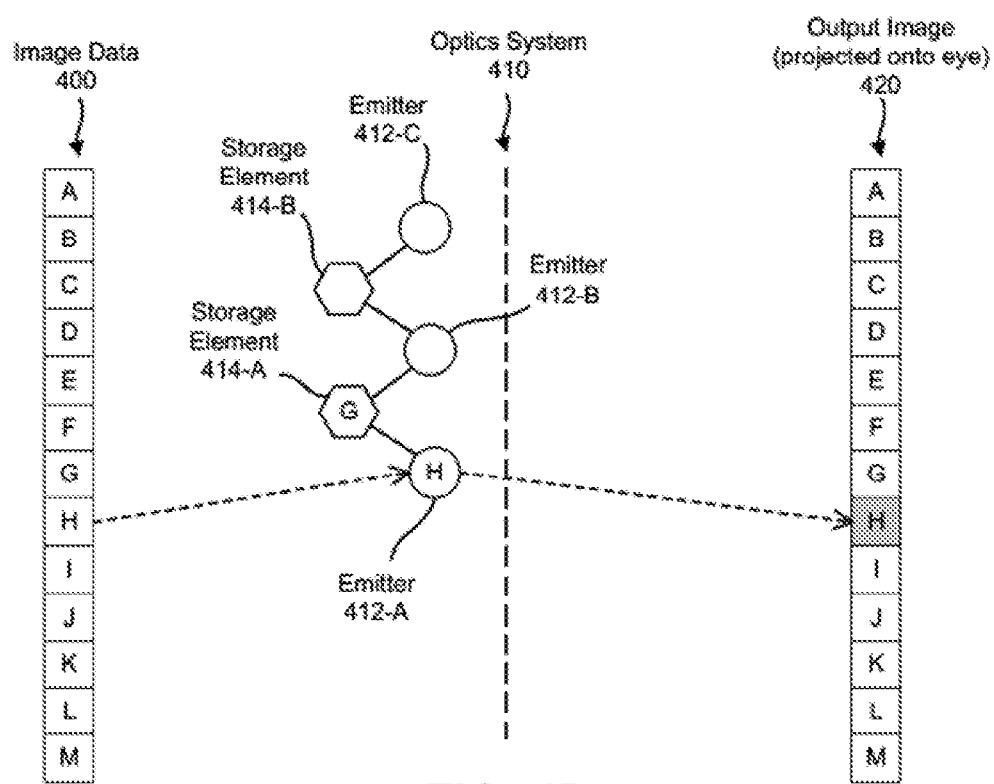

FIG. 4B shows the image data G transferred to storage element 414-A and loading of new image data H into the emitter 412-A. The image data H is projected onto a corresponding pixel in the output image 420.

Figure 4C:
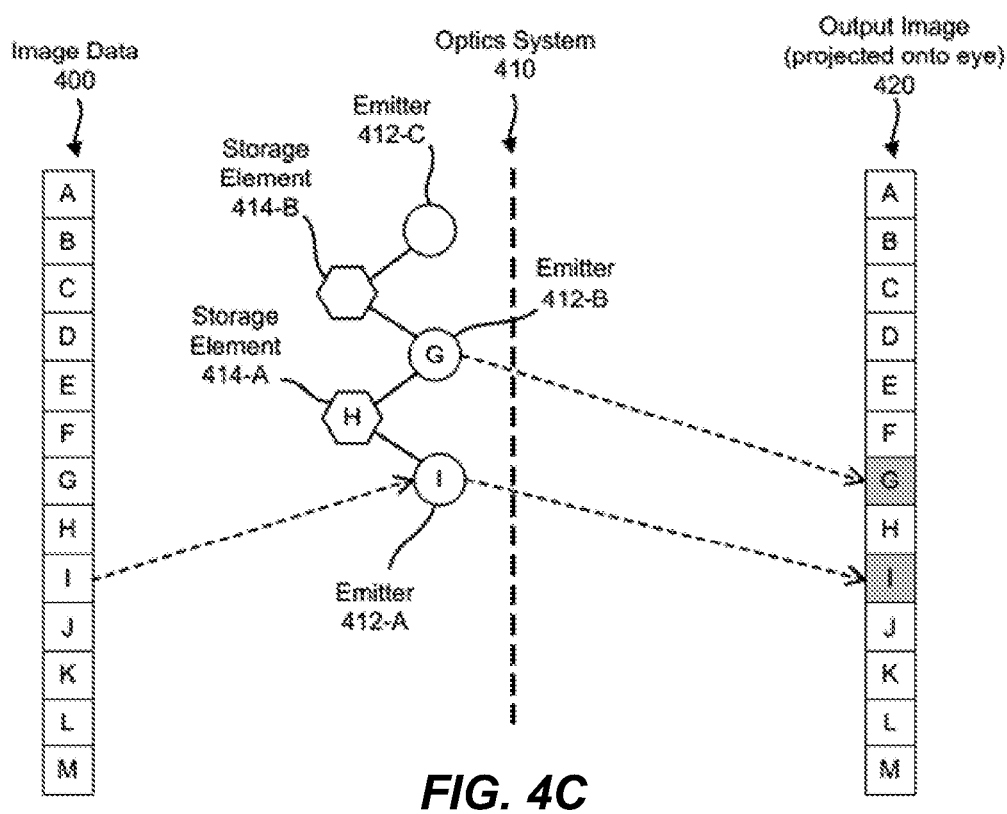

FIG. 4C shows the image data G loaded into emitter 412-B from the storage element 414-A. The image data H is loaded into the storage element 414-A in preparation for loading into the emitter 412-B during the next row time. Additionally, new image data I is loaded into emitter 412-A, with the image data G and I being projected onto the output image 420.

Figure 4D:
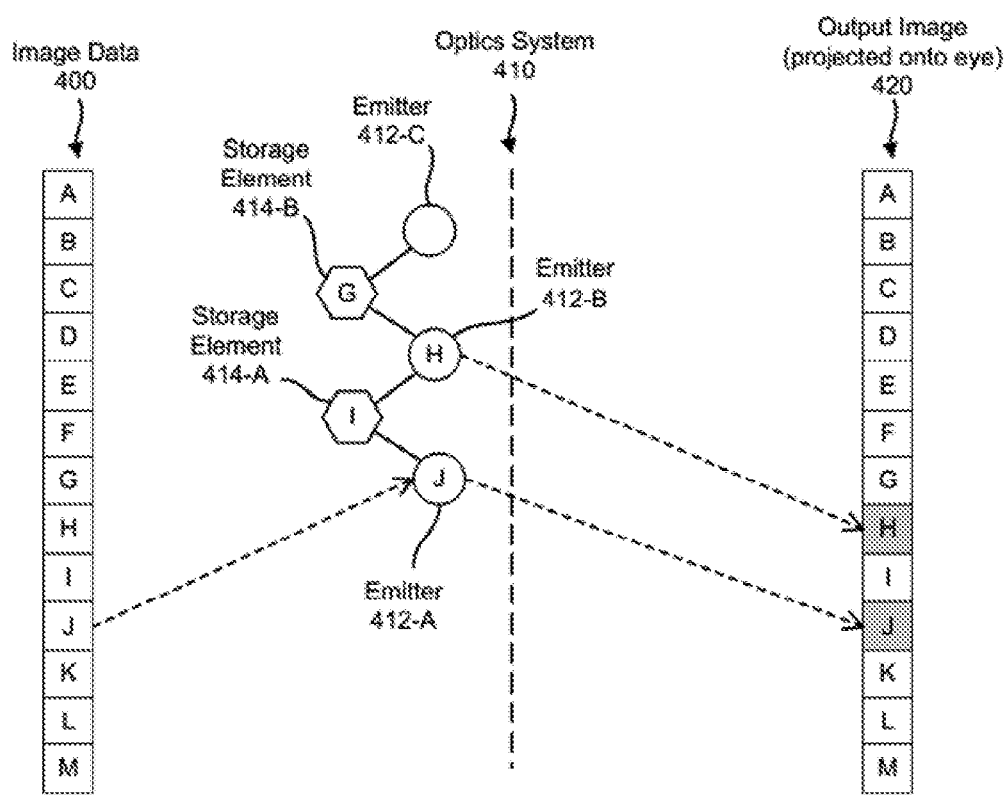

FIG. 4D shows the image data H loaded into emitter 412-B from the storage element 414-A. The image data I is loaded into the storage element 414-A in preparation for loading into the emitter 412-B during the next row time. Similarly, the image data G is loaded into the storage element 414-B in preparation for loading into the emitter 412-C during the next row time. Additionally, new image data J is loaded into emitter 412-A, with the image data H and J being projected onto the output image 420.

Figure 4E:
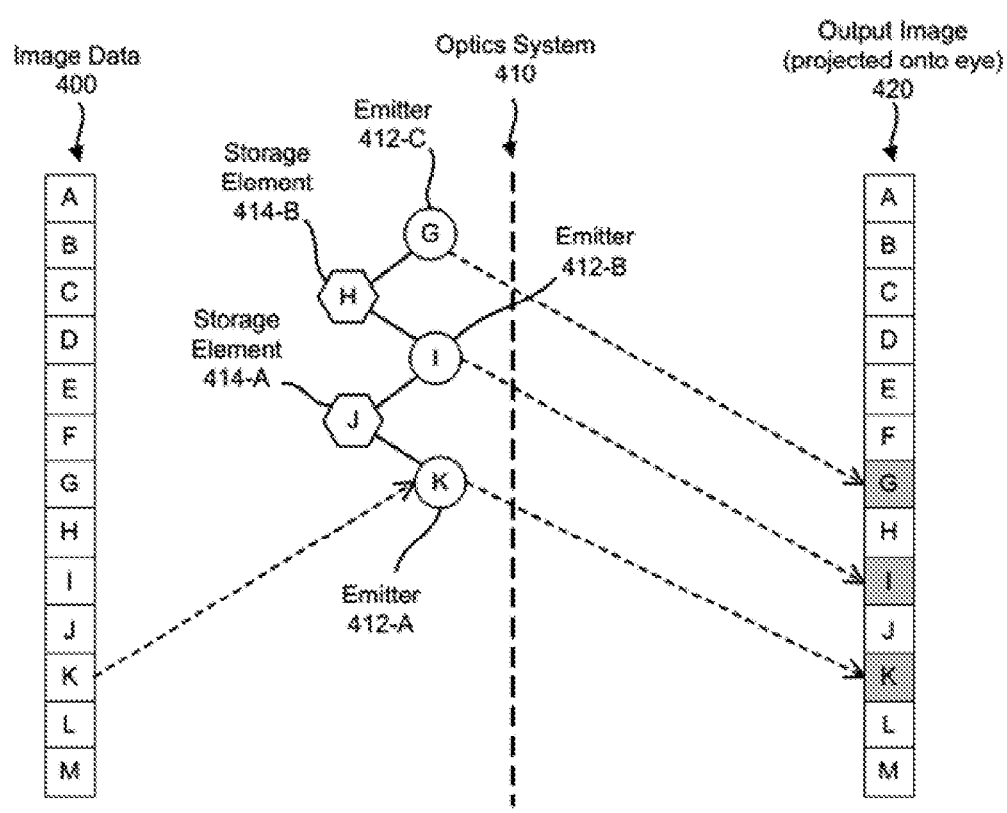

FIG. 4E shows the image data G loaded into emitter 412-C from the storage element 414-B and the image data I loaded into emitter 412-B from the storage element 414-A. The image data H and the image data J are loaded into the storage elements 414-B and 412-A, respectively. Additionally, new image data K is loaded into emitter 412-A, with the image data G, I, and K being projected onto the output image 420. Thus, FIGS. 4A to 4E illustrate the sequential loading of new image data into a first emitter (e.g., emitter 412-A), with the image data being shifted into other emitters (e.g., emitters 412-B and 412-C) using the storage elements 414, until the end of the row or column is reached. It can be seen that if the process were to continue, each item of image data would be projected onto the output image 420 a total of N times, once for each emitter 412, each time corresponding to a different rotational position of a scanning assembly 272. Each pixel of the output image 420 would then be perceived as an aggregate of N number of brightness units.

Example waveforms for controlling a scanning assembly 272 through a MEMS device will now be described. The waveforms can be applied to activate a MEMS device to trigger a rotational movement of a scanning assembly 272 in synchronization with control of a display. In particular, the display can be controlled so that the emitters emit light during specific periods of time relative to the rotational movement of the scanning assembly 272. The example waveforms are described as having portions (e.g., rising or falling portions of individual pulses) or segments (e.g., a segment within a particular rising or falling portion) that correspond to emission times or emission periods. For discussion purposes, it is assumed that the waveforms can be applied to effect instantaneous movement of the scanning assembly 272, such that the timing of the rotational movements exactly matches that of the waveforms. Thus, the waveforms are used to describe the rotational movements. However, it is understood that in practice, there may be a slight delay from when a waveform is applied to when the scanning assembly 272 begins to rotate. There may also be delays when reversing a direction of rotation. Such delays can be caused, for example, by inertia of the MEMS device and/or inertia of the reflective surface.

Figure 5:
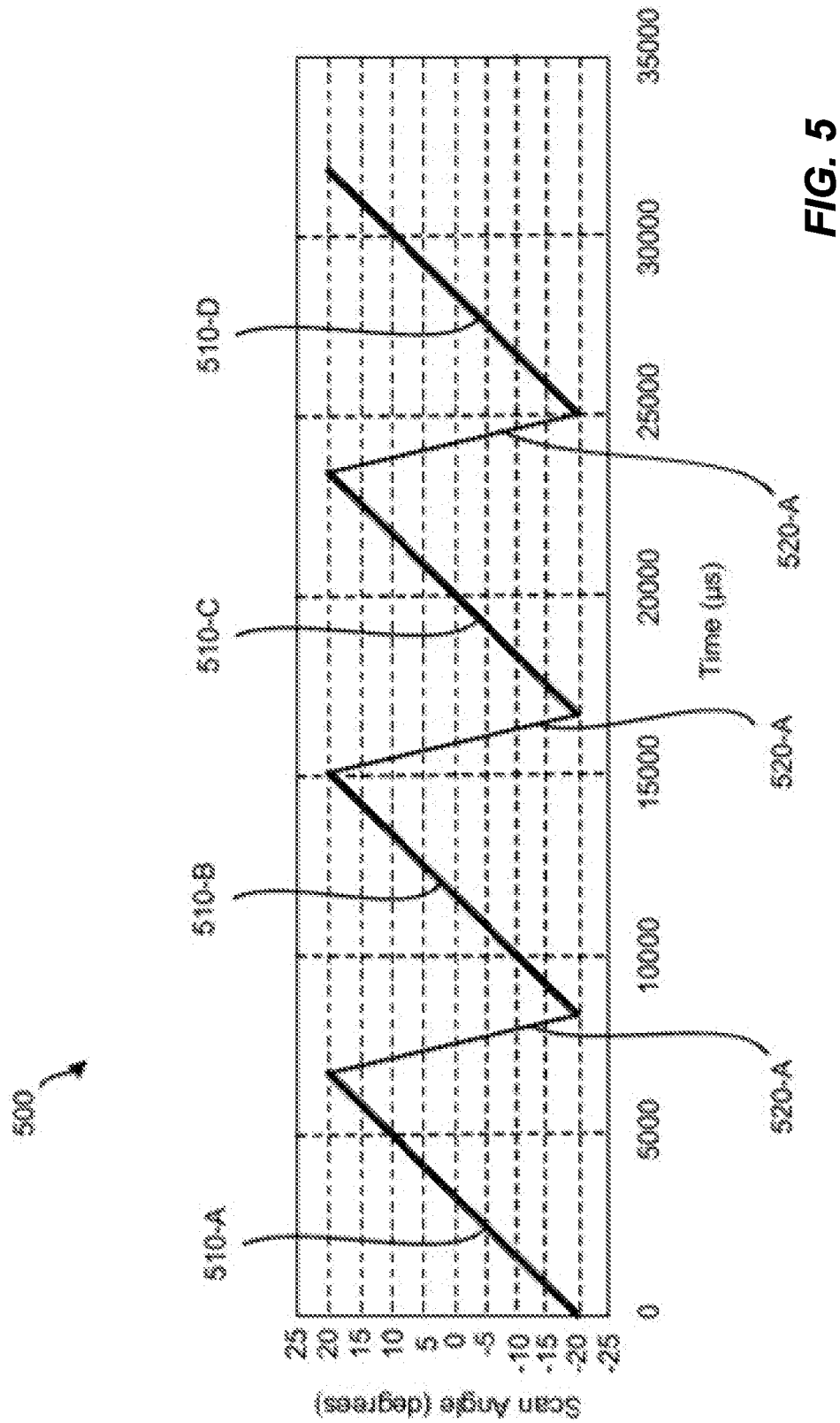
FIGS. 5-8 show example graphs of waveforms that can be used to drive a MEMS device for controlling a scanning assembly.

FIG. 5 is an example graph of a waveform 500 that can be used to drive a MEMS device for controlling a scanning assembly. The waveform 500 is a linear waveform comprising a set of pulses that repeat periodically (at a particular frequency). The waveform 500 is shown with a frequency of 120 Hertz (Hz). The waveform 500 may represent a clock signal that can be output from a display controller 280 to control a MEMS device of the optics system 264. Each pulse includes a rising portion 510 that ramps up linearly as a function of time, followed by a corresponding falling portion 520 that is also linear. The rising portions 510 occupy approximately 80% of the duration of each pulse. The optics system 250 may include circuitry configured to drive the MEMS device so that the scanning assembly 272 rotates across a range of scan angles. In the example of FIG. 5, the scan angles range from −20 to +20 degrees. The zero-degree position may correspond to a position at which the optical axis of the reflective surface of the scanning assembly 272 is orthogonal to the center of the display. For example, if the display and the scanning assembly 272 both include flat, 2D surfaces, then the zero position can be a position at which both surfaces are parallel to each other. As shown, each pulse includes a zero crossing on the rising portion as a well as a zero crossing on the falling portion. Because the rising portions 510 are linear, the speed at which the scanning assembly 272 rotates across the range of scan angles is constant. Similarly, the speed at which the scanning assembly 272 rotates during the falling portions 520 is also constant.

As mentioned earlier, the scanning assembly 272 is driven in synchronization with the display. For example, the display can be controlled such that light is emitted on only the rising portions 510, with the falling portions corresponding to periods of non-emission. In that case, the rate at which image data is supplied to the display (e.g., the frame rate) would be 120 Hz (corresponding to a frame period of 8.3 milliseconds) with a duty cycle of 80%. The amount of time spent supplying data for a particular row of emitters is referred to herein as the row time. In this example, because the rising portions 510 correspond to a constant speed, the row time would also be constant, e.g., 4.34 microseconds.

Figure 6:
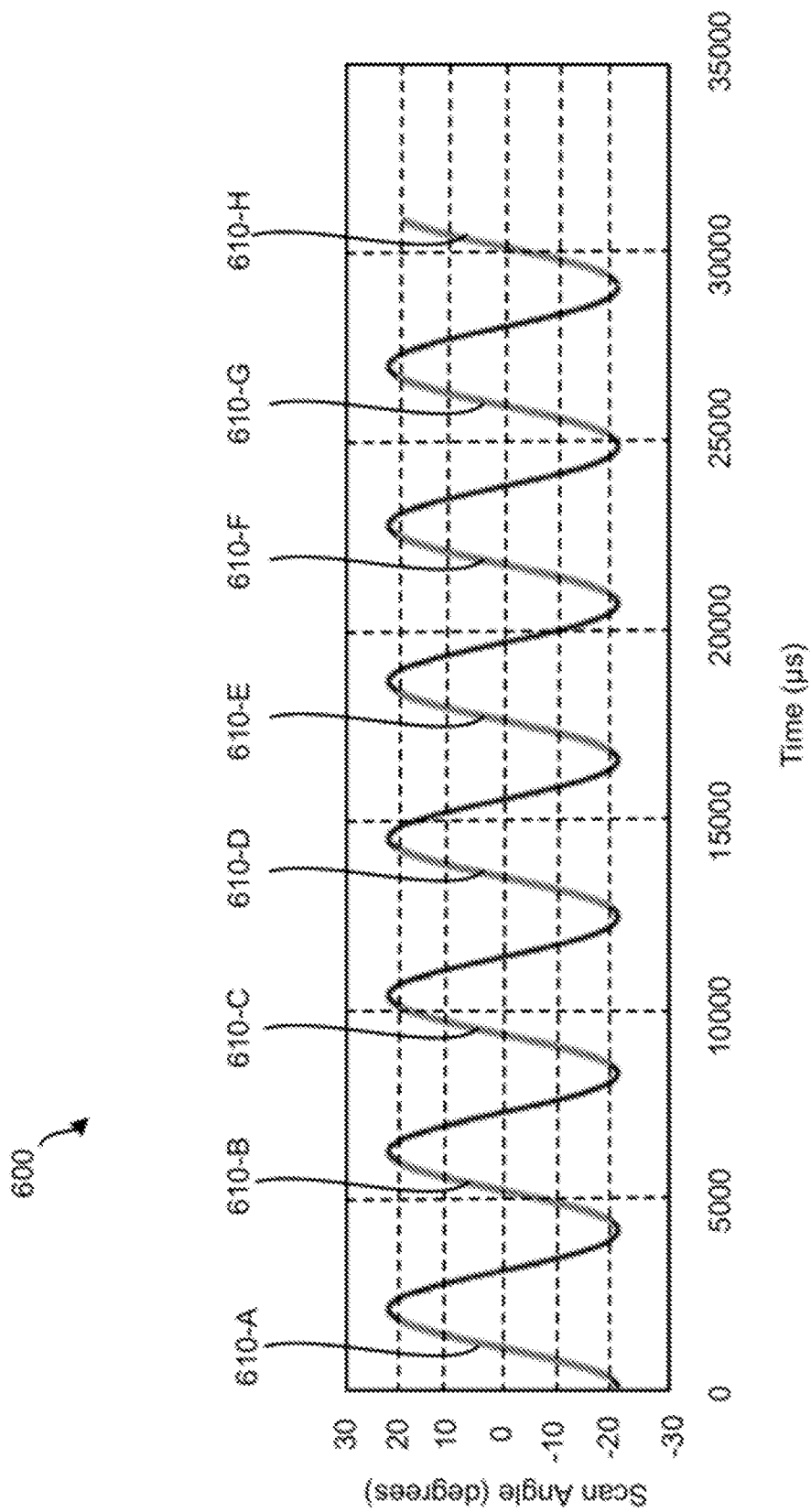

FIG. 6 is an example graph of a waveform 600 that can be used to drive a MEMS device for controlling a scanning assembly. The waveform 600 is non-linear. The waveform 600 represents a clock signal 286 that can be output from the display controller 280 to control a MEMS device of the optics system 264. In particular, the waveform 600 is a sinusoidal waveform that can be used to drive a MEMS device according to a resonant mode of operation (e.g., causing an electrostatic actuator to oscillate at a particular frequency). Resonant MEMS devices provide certain benefits over linear MEMS devices, including lower power consumption, reduced size, and potentially larger scan angles. However, as will be explained, controlling a resonant MEMS device in synchronization with a display can be challenging.

The optics system 264 may include circuitry configured to drive the MEMS device so that the scanning assembly 272 rotates across a range of scan angles. In the example of FIG. 6, the scan angles may range approximately from −20 to +20 degrees. The zero-degree position may correspond to a position at which the optical axis of the reflective surface of the scanning assembly 272 is orthogonal to the center of the display. For example, if the display and the scanning assembly 272 both include flat, 2D surfaces, then the zero position can be a position at which both surfaces are parallel to each other.

The waveform 600 is shown with a frequency of 240 Hz. If the display is controlled to emit on every rising portion 610 of the waveform 600 (e.g., so that emission times correspond to rising portions and non-emission times correspond to falling portions), then the frame rate would be 240 Hz (corresponding to a frame period of 4.2 milliseconds). Because the rising portions 610 are non-linear, the rotational speed of the scanning assembly 272 is not constant. At the zero crossing of the rising portions 610, the speed is 2.3 times higher compared to the beginning or end of the rising portion. Therefore, the rate at which image data is supplied for each row of the display should also be non-constant.

The amount of time spent supplying data for a particular row of emitters is referred to herein as the row time. In this example, because the rising portions 610 correspond to varying speeds, the row time varies over time. For example, the display could be driven with a minimum row time of 0.78 microseconds and a maximum row time of 1.8 microseconds, for an average row time of 0.97 microseconds. The emitter on-time per frame may be set to 1.49 milliseconds. Emission durations are also adjusted for each row in correspondence with changes in row time. In particular, the emission duration of a row is decreased for shorter row times and increased for longer row times. If the row times and emission durations were constant, this could lead to incorrect mapping of display images onto the output image. For example, since faster speeds result in more display area being covered in any given amount of time, failure to adjust the timing of the display images could lead to non-uniform pixel sizing of the output image, e.g., non-uniform resolution. Therefore, the timing of the image data should be dynamically adjusted so that less time is spent supplying image data at faster movement speeds and more time is spent at slower speeds. The frame rate and the MEMS frequency are therefore interrelated.

One option for reducing the complexity of the circuitry for driving the display when a resonant MEMS based scanning assembly 272 is used would be to confine the emission times to the most linear segment of the rising portion 610. The most linear segment is at the center of the rising portion 610. In comparison with the center segment, the beginning and end segments of the rising portion 610 are much more non-linear. Accordingly, part of the beginning and end of each rising portion 610 could be ignored for emission purposes. For example, 10% of the top and bottom portions of every pulse can be clipped when using the waveform 600 for determining the timing of emission. However, the exact amount of clipping can vary and the amount by which the top is clipped can be different than the amount by which the bottom is clipped.

Figure 7:
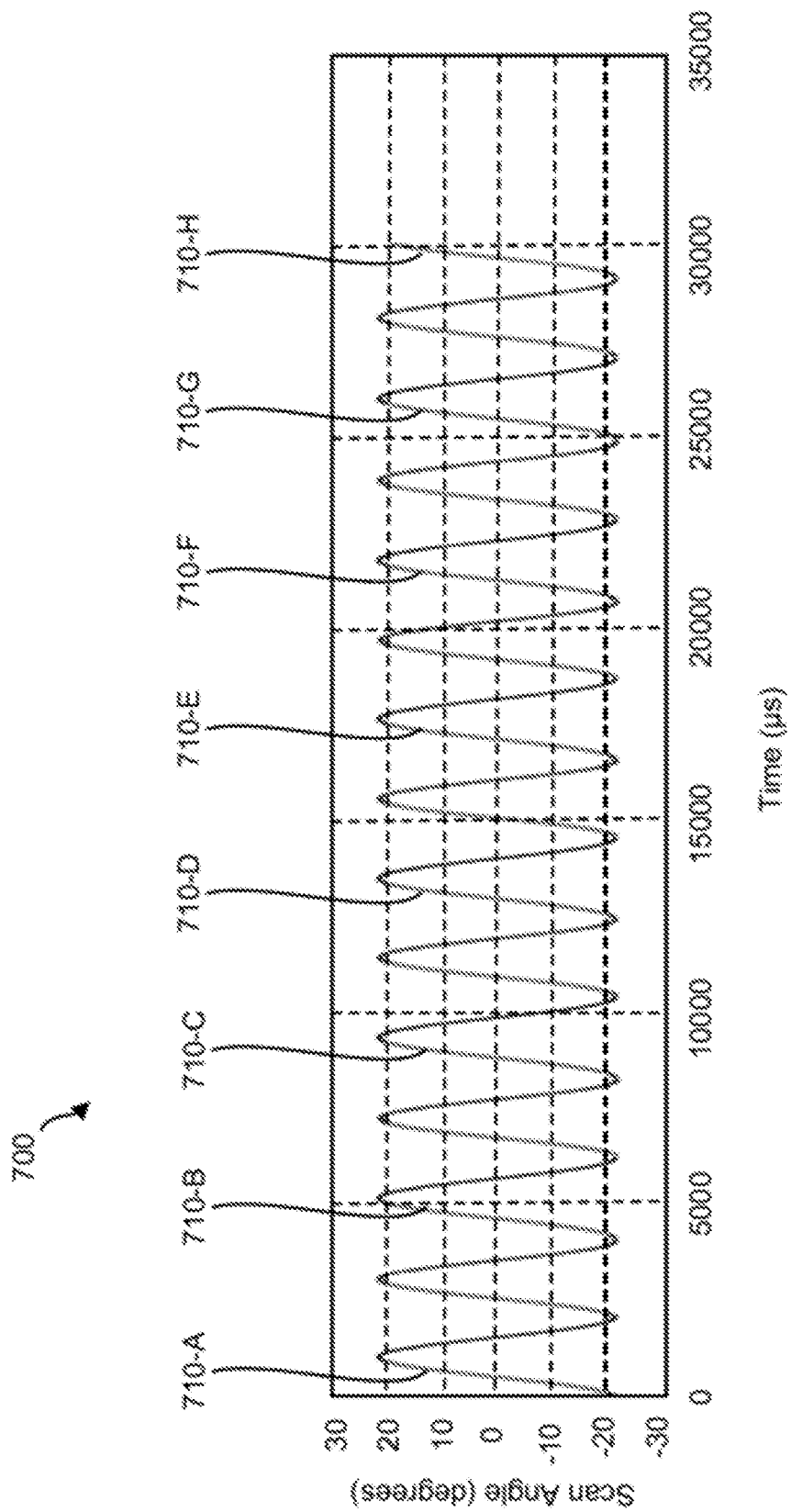

FIG. 7 is an example graph of a waveform 700 that can be used to drive a MEMS device for controlling a scanning assembly. The waveform 700 has a frequency of 480 Hz. However, unlike with the waveform 600, the emission periods correspond to every other rising portion 710, e.g., a frame rate of 240 Hz. The decision not to emit during every pulse can be based on timing constraints on the operation of the scanning assembly 272 and/or timing constraints on the operation of the display. For example, the scanning assembly 272 may be restricted to operation above a certain resonant frequency (e.g., 400 Hz or more) for mechanical stability reasons (hence the choice of 480 Hz for the resonant frequency). Thus, the design of the scanning assembly 272 may dictate the range of frequencies with which the MEMS devices can be driven.

Additionally, the display system is bandwidth limited in that the amount of data that can be supplied in a given amount of time from the display controller 280 to the circuitry that drives the emitters is finite (hence the choice of a 240 Hz frame rate). A higher frame rate would require a correspondingly higher data bandwidth. Further, in this example, although the frame rate is the same as in FIG. 6 (240 Hz), there is less time to drive the emitters in any given frame because the durations of each pulse of the waveform 700 are shorter than those of the waveform 600. For example, when driving the display in conjunction with waveform 700, the average row time could be 0.48 microseconds and the emitter on-time per frame could be 0.74 milliseconds (in contrast to the respective times mentioned above for the waveform 600: 0.97 microseconds and 1.49 milliseconds). In practice, there may need to be a compromise between stable resonant operation and efficient data transfer. For example, after selecting a frame rate based on the design of the display system, a resonant frequency at which the scanning assembly 272 can operate stably can be selected. Because the waveform 600 is non-linear, the row times and emission durations for the display should be dynamically adjusted to account for variation in the speed of the scanning assembly 272.

Figure 8:
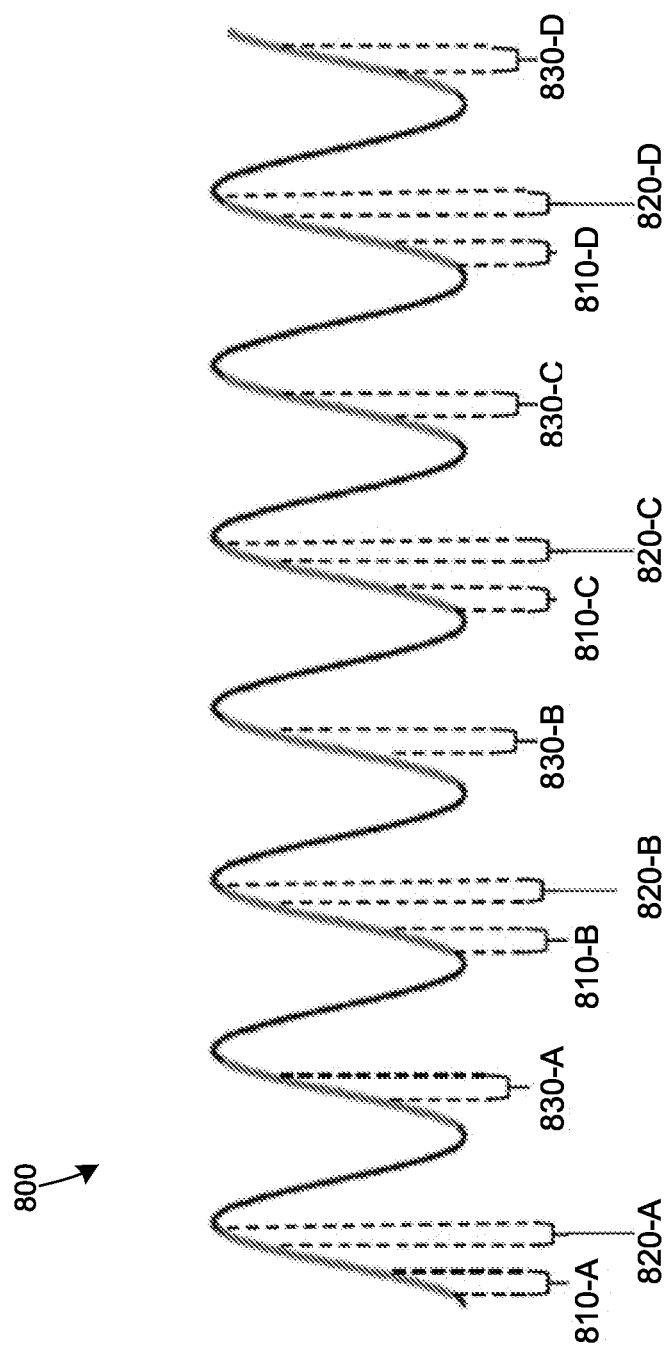

FIG. 8 shows an example waveform 800 that can be used to drive a MEMS device for controlling a scanning assembly. The emission periods of the waveform 800 correspond to each rising portion of the waveform. Emission on every other rising portion is also possible, as is emission on falling portions instead of rising portions. Emission can even be performed on both rising and falling portions, as long as the display system can operate fast enough. In the example of FIG. 8, only part of every rising portion is used for emission. In particular, the beginning and end segments are used for emission periods 810 and 820 on every other rising portion, alternating with the use of the center segments for emission periods 830. Thus, emission can be performed in two phases: a first phase in which the beginning and end segments are used, and a second phase in which the center segment is used. These two phases correspond to different pulses, with the phases being repeated in alternating fashion.

The division of the emission time as shown in FIG. 8 is advantageous because the most uniform portion of the scan range is isolated from the less uniform portions. Further, although the beginning and end segments are non-linear, they are symmetric with respect to each other and thus the speed variations for the emission periods 810 and 820 are approximately the same. The data for emission periods 810, 820 can also be loaded at a different time than the data for emission period 830, thereby reducing bandwidth consumption. In this manner, the circuitry that drives the emitters can settle at one frequency for the first phase and then have time to prepare for operation at a different frequency for the second phase. In comparison to dynamically adjusting for speed variation across the entire scan range, (1) it becomes easier to balance light output (e.g., the control scheme for adjusting emission durations of each row can be simplified) and (2) the lower bandwidth consumption means that more time is available for generating and supplying image data to the display. The emission periods 810 and 820 do not have to be equal in duration to the emission period 830. Instead, the emission time can be divided according to the speed of the scanning assembly 272, which may depend on the shape of the waveform (e.g., the slopes of the rising portion). For instance, the emission periods 810 and 820 could each occupy 30% of the rise time while the emission period 830 occupies 20% of the rise time.

The emission time can be further divided, for example, by splitting each of the emission periods 810 and 820 into two parts, splitting the emission period 830 into three parts, and forming additional phases for the new parts in accordance with the grouping shown in FIG. 8 (e.g., pairing emission times for less linear segments together, with separate emission phases for more linear segments). Additionally, the emission time can be allocated equally among emitters of different colors, as discussed earlier in connection with FIG. 8. For example, the first set of emission periods 810 to 830 can be used for driving red emitters, then the next set of emission periods 810 to 830 can be used for driving green emitters, followed by a set of emission periods 810 to 830 for driving blue emitters.

Particular embodiments described herein supports a technique that is termed "beam racing." In the graphics rendering pipeline, each primitive is rendered in memory before the scene is rasterized. In other words, pixels in the final scene are generated one by one after objects in the scene have been rendered. The pixels are displayed together and assumed to represent the scene at a particular instant in time. However, since it takes time to generate the pixels, there may be significant time lag (e.g., 11 milliseconds) between the time when objects are rendered and the time when the pixels are displayed. In conventional display contexts (e.g., movies, animation, etc.), the lag may not be noticeable. This is not the case in the VR/AR context, however. In VR/AR, a user expects immediate feedback between movement and visual perception. For example, as the user turns his head, he expects the scene to change at that instant and the current display to reflect his current point of view. Any delays, such as the time tag for generating and outputting pixels after rendering, may negatively affect the user experience. For example, if at time $t_0$ the user is standing up, the system may begin to render a scene based on the elevated perspective of the user. However, by the time the pixels of the scene are output at time $t_0+11$ ms, the user may be sitting down. Since the user is now expecting to see a scene from a lower vantage point, seeing a scene that does not reflect such expectation would negatively affect the VR experience and may even cause dizziness or nausea.

Figure 9:
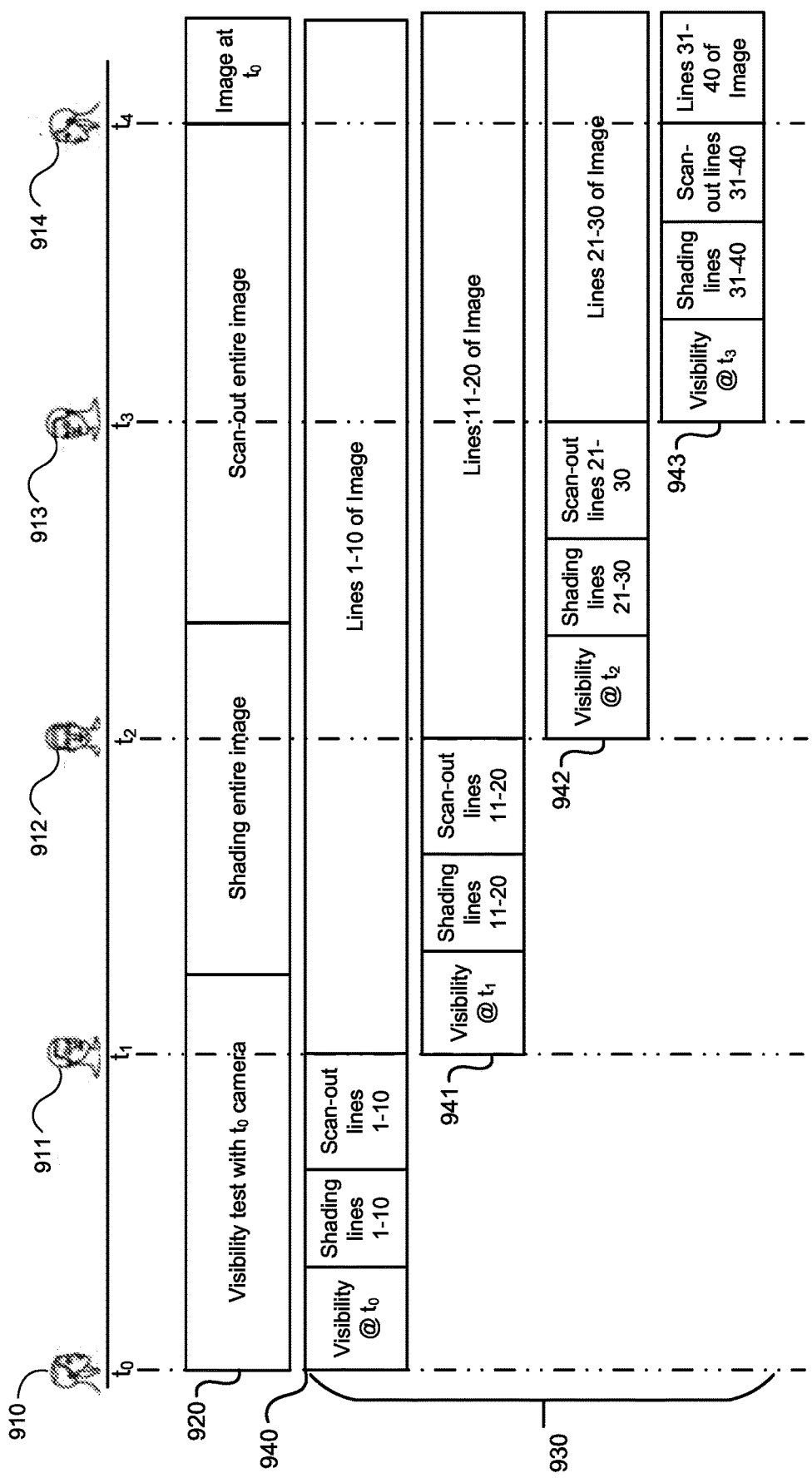
FIG. 9 illustrates examples comparing a graphics-generation timeline without using beam racing to timelines using beam racing.

FIG. 9 illustrates examples comparing a graphics-generation timeline without using beam racing to timelines using beam racing. In particular embodiments, the rendering process described below with reference to FIG. 9 may be performed by the display engine 112. In particular, FIG. 9 illustrates a graphics generation timeline 920 that generates and outputs an entire image at the same time. In the illustrated example, a user wearing an AR/VR device may be rotating his head quickly from position 910 at time $t_0$ to position 914 at time $t_4$. If the pipeline 920 is configured to generate an entire image, it may begin by configuring the orientation of the virtual camera based on the head orientation 910 of the user at time $t_0$ and proceed with determining visibility, shading (e.g., determining color values for pixels), and scanning out the entire image. By the time the image is ready to be output, the time may be $t_4$. However, at time $t_4$, the user's head orientation 914 may have changed significantly from the time $t_0$ orientation 910, yet the image that is presented to the user may have been based on the user's head orientation 910 at $t_0$. This lag may cause a sense of disorientation for the user.

Particular embodiments reduce the latency between rendering and image display by outputting pixels scan line by scan line, where each line is generated based on renderings made when it is that line's turn to be output. For example, the system may render at time $t_0$ and scan out line 0 (rather than the whole scene) based on the to rendering; render at time $t_1$ and scan out line 1 based on the $t_1$ rendering; and so on. Since the system is only processing one line at a time (or multiple predetermined lines at a time but not the all the lines together), the delay between render time and pixel-output time becomes much shorter, and the renderings would be based on the latest movement/perspective of the user. As a result, real-time scene changes would be much more reactive. This "beam racing" technique has the potential to significantly reduce the head-movement to photon latency. Even significant batching, such as hundreds of lines (hundreds of thousands of pixels) could provide large multiplicative reductions in latency over waiting for the full frame before scan out. In particular embodiments, the system may schedule rendering and scan out tasks with respect to the scan out clock.

Referring again to FIG. 9, the beam racing graphics pipeline 930 shows an example of the beam racing technique. In this example, each video frame displayed has 40 horizontal lines. The first timeline 940 represents the timing of generating the first 10 lines (lines 1 to 10) of the video frame. At time $t_0$, the system may use the latest motion sensory data available at that time (e.g., from a AR/VR device's inertial measurement unit, gyroscope, etc.) to orient the virtual camera and perform visibility tests. The system may then perform shading and scan out operations for lines 1-10 of the video frame. In the example shown, lines 1-10 are ready by time $t_1$ and displayed to the user. Since the system is only tasked with generating 10 lines rather than all 40 lines, the duration needed for generating lines 1-10 (e.g., $t_1$-$t_0$) is significantly shorter than the duration needed for generating the whole image (e.g., $t_4$-$t_0$), as shown by timeline 920. Thus, at time $t_1$, the user would be presented with lines 1-10 that were generated using the latest sensor information from to, which is much more current than the scenario shown by timeline 920. In particular embodiments, lines 1-10 may be on continuous display until the rest of the lines in the video frame have been generated, and the process would repeat to generate updated lines 1-10 based on the virtual camera's updated orientation/position.

In particular embodiments, after the system generates lines 1-10, it may proceed to generate lines 11-20, as represented by timeline 941. The process may begin at time $t_1$, at which time the system may perform visibility tests based on the latest sensor data available at that time. The system may again go through the process of shading and scan out, and then output lines 11-20 at time $t_2$. Thus, at time $t_2$, the user is presented with lines 11-20 that are generated based on sensory data from time $t_1$. The system may then repeat the process to generate lines 21-30, starting from time $t_2$ and ending at time $t_3$, and then generate lines 31-40, starting from time $t_3$ and ending at time $t_4$. Thus, at time $t_4$, the user is presented with a video frame that includes much more current information (e.g., as recent as time $t_3$), compared to the scenario presented by the timeline 920, where the user at time $t_4$ is presented with a frame generated based on to data. More information on beam racing may be found in U.S. patent application Ser. No. 15/954,530, filed 16 Apr. 2018, which is incorporated by reference.

In existing systems, the GPU (or graphics driver) may establish the clock that controls the timing at which pixel data is read from memory and pixels are displayed. For example, at the end of each 60 hz cycle, the GPU may send a full frame out to a display. If a new frame is ready, then the new frame is displayed. Otherwise, the previous frame may continue to be displayed. However, full-frame rendering by GPUs suffer from the drawbacks described above with reference to FIG. 9, especially in AR/VR systems where display content needs to reflect the user's current viewpoint or movement. While the beam racing techniques described above may be implemented on existing GPU systems, the output rate may be linear and static (e.g., the output of the swaths would still be driven by the clock of the GPU). However, resonant scanning displays 116A, 116B may demand pixel data at varying rates so that pixel display is synchronized with the oscillation of a scanning element such as a mirror. As explained above with reference to FIG. 6, the need for varying scan out rates may be due to the characteristics of the display device. For example, the resonant scanning display 116A, 116B may use an electrostatic actuator that oscillates at a particular frequency to generate an image. The scanning display 116A, 116B may include a scanning assembly 272 in which the scanning element is a scanning mirror driven using one or more microelectromechanical systems (MEMS) components. For example, the scanning mirror may be rotated in one or more dimensions using one or more MEMS actuators. Such resonant MEMS devices provide certain benefits over linear MEMS devices, including lower power consumption, reduced size, and potentially larger scan angles. However, resonant scanning displays may demand pixel data at varying rates so that pixel display is synchronized with the oscillation of the scanning element. Providing pixel data to a resonant display using beam racing can be challenging because the speed of the oscillator, and thus the lengths of the time intervals during which swaths may be sent to the display 116A, 116B, may vary over time.

In particular embodiments, the aforementioned display engine 112 may implement a beam racing technique to reduce the latency between rendering and displaying images in a scanning display 116A, 116B by generating portions of each image, referred to as swaths, according to timing demands of the scanning display (instead of according to the display engine 112's own clock or static output rate). As explained previously with reference to FIG. 9, in AR/VR systems, it is desirable to dynamically generate swaths, rather than the whole frame. Since the system processes one swath at a time for an image, instead of the entire image, the delay between render time and pixel-output time is reduced, and the renderings may be based on more recent movement/perspective of the user.

In particular embodiments, the display engine 112 may output swaths to the display 116A, 116B based on external requirements set by the display 116A, 116B. The display may specify that a particular swath of a particular size (e.g., 16 lines or 32 lines high by the width of the screen wide, or other appropriate size) is needed at a particular time, at a particular rate, or in a particular time window. For example, the display 116A, 116B may specify varying time intervals between when sequential swaths are needed, or indicate varying time budgets for outputting each swath, depending on the location of the swaths on the display (e.g., swaths that are located in the middle of the screen may need to be made available to the display at a faster rate than swaths located near the edges of the display). As another example, the display 116A, 116B may specify that different swaths having different sizes are to be provided at different time intervals so that the display may output the swaths at times determined based on oscillation of a mirror in the resonant scanning display 116A, 116B.

In particular embodiments, the display engine 112 may react to the external beam-racing requirements set by the resonant display 116A, 116B as follows. In particular embodiments, when beam racing is used with a resonant display 116A, 116B, the display may determine when it needs content (e.g., at what variable rates are pixel rows needed), and, accordingly, when the display engine 112 will generate pixel data and send the pixel data to the display 116A, 116B. That is, the display engine 112 may be responsive to the timing determined by the display 116A, 116B. For example, the display 116A, 116B may inform the display engine 112 of the times at which swaths of pixel data will be needed. The display engine 112 may then generate and provide the pixel data to the display 116A, 116B at those times.

In particular embodiments, pixels of swaths may be supplied to the display 116A, 116B at different rates for different portions of the frame, depending on the display characteristics of the particular display receiving the pixels. The frame rate may vary by, for example, 10% over time, e.g., 400 frames per second plus or minus 10%. As described above with reference to FIG. 6, the display system 250 may be controlled by the display engine 112 to emit on, for example, every rising portion 610 or every other rising portion 610 of the waveform 600. Since the rising portions 610 of the waveform 600 are non-linear, the rotational speed of the scanning assembly 272 is not constant. Therefore, the rate at which image data is supplied for each row of the display 116A, 116B may also be non-constant. Emission durations may also be adjusted for each row in correspondence with changes in row time. In particular, the emission duration of a row may be decreased for shorter row times and increased for longer row times. If the row times and emission durations were constant, this could lead to incorrect mapping of display images onto the output image. For example, since faster speeds result in more display area being covered in any given amount of time, failure to adjust the timing of the display images could lead to non-uniform pixel sizing of the output image, e.g., non-uniform resolution. Therefore, the timing of the image data may be dynamically adjusted so that less time is spent supplying image data at faster movement speeds and more time is spent at slower speeds. The frame rate and the MEMS frequency are therefore interrelated.

Certain regions of a swath may be more complex and thus involve more processing than other regions. Processing may alternate between sides of a swath when the swath is being generated to even out memory access bandwidth. One motivation for doing so may be that a single swath across the screen may have varying degrees of chromatic aberration. For example, the center portion of the swath may have nearly no chromatic aberration, while portions towards the edges have much more. To address chromatic aberration, the system may separately determine the color value for each color component (RGB), so there may be more work to do towards the edges of the swath and less work in the middle. Memory access may be evened-out by dividing the swath into tiles (e.g., 160 tiles in a swath), and processing them in the following order: 0th tile, 80th tile, 1st tile, 81st tile, 2nd tile, 82nd tile, and so on.

In particular embodiments, each swath may have a time budget, and if swath generation will not or does not finish within its allotted time interval, one or more fallback actions may be performed. The fallback actions do not render the swath as originally requested, but may instead render the swath as black to indicate its absence, or cause the scene complexity to be reduced, so that the swath may be rendered within its time budget in the next frame. Swath generation time may exceed the swath's time budget because, for example, scene complexity is unpredictable, and the scene that contains the swath may be more complex than can be processed within the time interval allotted to the swath. Swath time intervals may be determined based on an expected scene complexity, e.g., so that the time intervals are sufficient for most scenes in ordinary applications. However, a small percentage of scenes may be extremely complex, and setting swath time interval lengths sufficient to handle such complex scenes may be impractical. Long time intervals are ordinarily not desirable, since the benefits of beam racing described above (e.g., with reference to FIG. 9) may be diminished as time intervals are increased.

Although fallback actions may result in visible degradation of the scene being generated, they may be preferable to random or otherwise unspecified display output that may occur if no action is taken for unfinished swaths. For example, if swaths are not completely rendered, surfaces that should not be visible because of obstructions may still be displayed. Displaying invisible surfaces is undesirable since doing so may cause confusion or reveal information, such as locations or content in a scene, that should not be visible to the user. Further, the use of fallback actions may reduce the amount of computing hardware resources needed, since the fallback actions may be used without requiring additional system hardware to process the complex scenes that may result in overrun of swath time budgets. Further, the use of fallback actions may allow the AR system to adapt to the hardware resources available, so the AR system may be used on hardware having fewer computational resources.

Traditional GPUs rely on a previously-generated image in a frame buffer to handle swath generation failures. However, particular embodiments of the display engine 112 do not have a frame buffer, so there is no previous image available for use as a fallback.

In particular embodiments, the fallback actions may include displaying the swath in a single color, such as black or transparent, to indicate that the swath has not been properly generated. The display engine 112 may determine that the swath generation will not or has not finished within the scheduled time interval (e.g., not all the pixels in the swath has been computed before the expected scan out time), and output the swath as black or other color representing a missing swath. The downstream display device may receive the black or transparent pixels and output black or show the background image over which the swath was supposed to be overlaid (e.g., as in an AR application). In the resulting output, it may be apparent to the user that an error has occurred, and the swath has not been generated in time, but indicating an error in this way may be preferable to displaying incorrect or partially-complete information.

In particular embodiments, if a display block 240A, 240B detects an error or is halted by the controller block 210, it may send a "StopFrame" signal to the pixel blocks 230A, 230B. The pixel blocks 230A, 230B may then stop writing to the row buffer and pass the StopFrame signal on to the transform blocks 220A, 220B. When the transform blocks 229A 229B receive a StopFrame signal, they may finish the current tile, set a "frame stopped" bit in a status register of the transform blocks 220A, 220B, and pause processing until the microcontroller 212 starts processing again.

In particular embodiments, the fallback actions may include processing fewer surfaces or other features in the next frame, or otherwise reducing the complexity of the scene so that it may be generated within the scheduled time interval. This type of fallback action may be suitable because scene complexity is often the cause of delay for swath generations. As described elsewhere herein, the display engine 112 may be configured to generate swaths of pixel data by process surfaces in a scene, including performing visibility tests (e.g., via ray casting) and shading (e.g., performing bilinear interpolation on the texture data of surfaces to determine pixel color). If the pixels within a swath intersects with many surfaces in the scene (e.g., 16 surfaces may all be visible in the same swath), processing may take longer than what is acceptable to the display 116A, 116B. Thus, in particular embodiments, the fallback action may be to reduce the complexity of the scene by removing or ignoring certain surfaces from the scene. For example, microcode or other logic in the display engine 112 may determine which surfaces to remove based on any suitable rules. For example, the display engine 112 may remove: surfaces with small screen coverage (e.g., because their removal will have less visual impact), large surfaces occupying a large portion of the swath (e.g., because their removal could drastically reduce the amount of processing needed); and/or surfaces located near the edges of the display (e.g., because such surfaces would be in the user's periphery). In particular embodiments, the determination to remove a surface may be made based on priorities associated with the surfaces or other features. For example, priorities for the surfaces may be specified at the application level. For instance, an AR application that generates primary AR objects (e.g., an avatar) and secondary AR objects (e.g., background objects) may indicate the objects' relative priority (e.g., the primary AR objects are to be prioritized over the secondary AR objects). Based on these priorities, the corresponding surfaces generated for the objects may be similarly prioritized. The surfaces with the least-important priorities or other features may then be removed from the scene by the display engine 112 so that they reduce the scene complexity, thereby reducing the processing time needed to generate swaths. Another way to reduce the complexity of the swath may involve identifying a group of two or more separate features, e.g., characters, that may each change individually at a relatively high rate, such as 30 to 60 times per second, and combining the separate features into a single block. The block may change at the same rate, e.g., 30 to 60 times per second. Generating one block may be less complex than generating the characters individually. As another fallback, a frame of one feature per pixel may be generated instead of generating the frame using computationally-intensive techniques such as motion correction.

In particular embodiments, when a swath is not generated because of insufficient available time, the display engine 112 may then request the application to simplify the scene. The application may use an appropriate or preferred applications-specific technique to solve the problem that led to the insufficient time error. For example, once the display engine 112 determines that a swath cannot be completed in time, it may send a notification to the application layer of the fact. The application may then determine the best course of action to improve rendering time. For example, since the application knows exactly what it is asking the display engine 112 to output, it can simplify the scene. For instance, if the scene contains 10 avatars, the application may remove or reduce the size of one or more avatars (such as the inactive ones or the ones that are not necessary for the current state of the application). The application may also reduce scene complexity progressively, such as starting by removing one avatar and waiting to see whether the rendering problem persists before removing another.

In particular embodiments, when swath generation fails because of insufficient time, the microcontroller may receive an interrupt indicating that there is insufficient time to generate the swath as scheduled. The interrupt may further specify how many surfaces should be removed from the swath generation task to allow the swath to be generated within the scheduled time interval. If the microcontroller selects the specified number of surfaces, then the swath generation may continue and complete successfully without those surfaces. Alternatively or additionally, the microcontroller may send a signal to the application indicating that the swath generation task will not (or did not) finish, and let the application decide how to manage the content load.

In particular embodiments, a time budget may be allocated to each swath. The time budget may be an upper limit on the amount of time that may be spent generating the swath. Different time budgets may be allocated to different swaths. The time budget may be based on the timing specification of the downstream display. For example, the time budget for one swath may be $3/400$ second, and the time budget for another swath may be $1/400$ second. In particular embodiments, sampling algorithms may be used to meet the time budget. For example, if there is insufficient time in the budget to render a swath, the sampling algorithm may, sample different areas along the swath and perform more aggressive approximations (e.g., ignore chromatic aberration and use the visibility computations for green as an approximation for the visibility computations for red and blue), simplify the scene, (e.g., by removing surfaces, simplify the surfaces) and the like.

Figure 10:
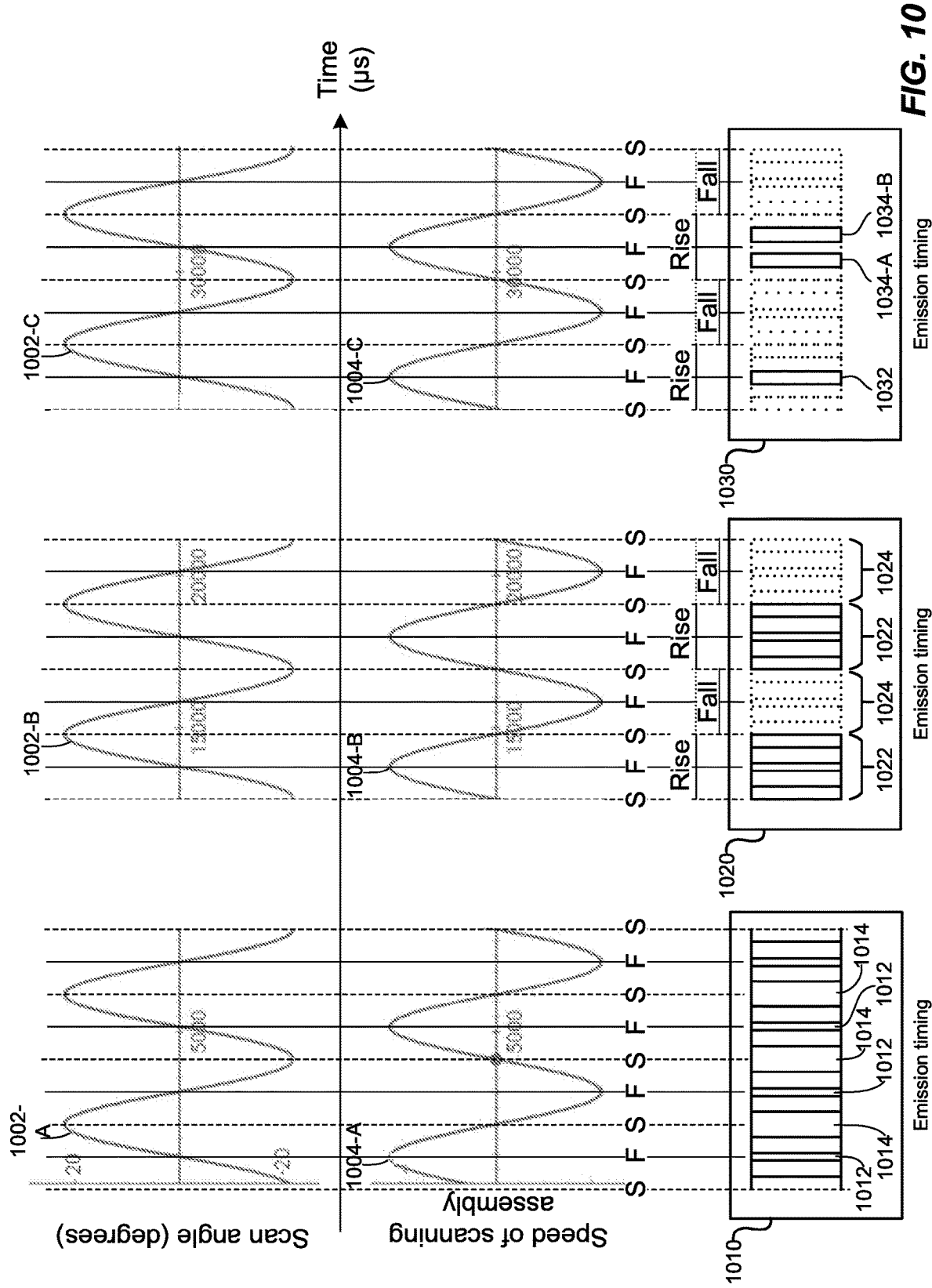
FIG. 10 illustrates example swath emission times that vary as the speed of a scanning assembly changes.

FIG. 10 illustrates example swath emission times that vary as the speed of a scanning assembly changes. The amount of time that may be spent supplying data to emitters for a particular swath may be dependent on the motion of the scanning assembly. As described above with reference to FIG. 6, the scanning assembly's scan angle may change according to the waveform 1002, and the speed of the scanning assembly may change according to the waveform 1004. Thus, the timing of the swath data should be dynamically adjusted so that less time is spent supplying swath data at faster movement speeds and more time is spent at slower speeds. Thus, there are particular timing constraints that affect when and for how long swath data may be supplied to the display. Deviating from these constraints may result in visual distortions in the displayed image. For example, since faster speeds result in more display area being covered in any given amount of time, failure to adjust the timing of the swath data could lead to non-uniform pixel sizing of the output image, e.g., non-uniform resolution.

The example emission timings 1010, 1020, 1030 each show a sequence of time intervals during which swaths may be supplied to a scanning display 251. The vertical lines in the example emission timings 1010, 1020, 1030 identify time intervals during which swaths may be supplied to the display 251. The vertical lines correspond to particular times on the time axis of the waveforms 1002. For example, one swath may be supplied to the display between each pair of vertical lines in each of the emission timings 1010, 1020, 1030. The swaths may be of equal or similar lengths. As described above with reference to FIGS. 6-8, a light emitter of a resonant scanning display may emit light at particular times during the motion of the MEMS device of an optics system 264.

The zero crossings of the scan angle waveforms 1002 correspond to times at which the scan angle is 0 degrees, which may be, for example, when a flat surface of the scanning assembly is parallel to a flat surface of the display. The times that correspond to the zero crossings are labeled with the letter "F" to indicate the fastest speed. The maximum and minimum points on the scan angle waveform 1002 correspond to times at which the scan angle is at its boundaries, e.g., +20 or −20 degrees. The scanning assembly may be moving at its slowest speed at the maximum and minimum points. The times that correspond to the maximum and minimum points are labeled with the letter "S" to indicate the slowest speed. For example, as described above with reference to FIG. 6, at the zero crossings, the speed may be 2.3 times higher compared to the beginning or end of the rising portions.

The waveforms 1002 may represent clock signals 286 output from a display controller 280 to control a MEMS device of the optics system 264, as described above with reference to FIG. 6. The example emission timings 1010-1030 may be generated based on the waveforms 1002A-C. As described above with reference to FIGS. 7 and 8, emitters may be turned off for portions of the waveforms 1002B and 1002C. Each emission timing may have a solid line for a time during which emission occurs (e.g., light is emitted) and dotted lines to represent times during which emission does not occur (e.g., light is not emitted).

In the example waveform 1002-A, the display is controlled to emit during the entire waveform, In the example waveform 1002-B (which corresponds to the waveform 600 of FIG. 6), the emission periods correspond to every other rising portion. That is, the display is controlled to emit on every rising portion of the waveform (e.g., so that emission periods correspond to rising portions and non-emission periods correspond to falling portions). In the example waveform 1003-C (which corresponds to the waveform 800 of FIG. 8), the beginning and end segments are used for emission periods on every other rising portion, alternating with the use of the center segments for emission periods.

In particular embodiments, an emission timing 1010 may be generated by dividing a period of the waveform 1002 into two or more time intervals. Each time interval corresponds to an amount of time during which a swath may be generated and displayed. In particular embodiments, each time interval may correspond to a length of time during which the speed of the scanning assembly varies by less than a threshold amount or percent. For example, during a time interval 1020, the speed of the scanning assembly may range from 400 to 420 radians per second (rad/s), which is a variance of approximately 2.5% from an average speed of 410 rad/s during the interval 1020. If the threshold percentage is 2.5%, then separate time intervals may be assigned to regions of the waveform for speeds that differ from 410 rad/s by more than 2.5%.

Thus, the length of each time interval in the emission timings 1010-1030 may be proportional to a rotation speed of the scanning assembly for at least one point during the time interval. Higher-speed regions of the waveforms may be mapped to shorter time intervals, and lower-speed regions may be mapped to longer time intervals. Similarly, medium-speed regions may be mapped to medium-length time intervals. The number of time intervals for each period of the waveforms 1002 may be determined based on factors such as the desired swath size (e.g., the number of rows per swath) and the speed of motion of the scanning assembly (which corresponds to the period of the waveforms 1002). In the example emission timings of FIGS. 1010-1030, there are eight time intervals for each period of the waveforms 1002. The shortest time interval 1012 corresponds to the fastest portion of the waveform. The longest time interval 1014 corresponds to the lowest portion of the waveform, and the medium time interval (shown between 1012 and 1014) corresponds to the medium-speed portion of the waveform.

FIG. 10 shows three example emission timings 1010, 1020, 1030 for different emission patterns. The emission timings 1010, 1020, 1030 are based on waveforms 1002-A, 1002-B, and 1002-C, respectively, which may correspond changes in scan angle of a scanning assembly of an optics system 264 that rotates over time across a range of scan angles. In the first example emission timing 1010, light emission occurs during the entire time period covered by the waveform 1012-A. In the first example emission timing 1010, a smallest emission time interval 1012 is at or near the times of the zero crossings of the waveform 1002-A. The scanning assembly moves at its highest speed at the zero crossings, so the smallest time interval 1012 is smaller than other time intervals in the timing 1010 that correspond to other portions of the waveform 1002-A. A largest emission time interval 1014 is at or near the maximum and minimum points of the waveform 1002-A. The scanning assembly moves at its slowest speed at the maximum and minimum points, so the largest emission time interval 1014 is larger than other time intervals in the timing 1010 that correspond to other portions of the waveform 1002-A. A medium time interval occurs between the largest time intervals 114 and the smallest time intervals 1012. In other examples, additional time intervals of different lengths may be added to the emission timing 1010, or one or more of the time interval lengths may be removed from the emission timing 1010.

In the second example emission timing 1020, light emission occurs on every rising portion of the waveform 1002-B. Light is not emitted at other times, so swaths sent to the display at other times are not included in the image. Thus, swaths are to be sent to the display during the emission time intervals 1022 enclosed in solid lines in the emission timing 1020. Swaths are not sent to the display during the non-emission time intervals 1024. The second example 1020 corresponds to the emission pattern of FIG. 6. The second emission timing 1020 is otherwise similar to the first emission timing 1010. In other examples, additional time intervals of different lengths may be added to the emission timing 1020, or one or more of the time interval lengths may be removed from the emission timing 1020.

In the third example emission timing 1030, light emission occurs on every rising portion of the waveform 1002-C, but alternates between the "center" segment and the "beginning and end" segments of the rising portions. Thus, swaths are to be sent to the display during the emission time intervals 1032, 1034-A, and 1034-B, which correspond to the "center" and "beginning and end" segments, respectively. Swaths are not sent to the display during the other time intervals in the timing 1030, which are non-emission time intervals. The third example 1030 corresponds to the emission pattern of FIG. 8. The third emission timing 1030 is otherwise similar to the first emission timing 1010. In other examples, additional time intervals of different lengths may be added to the emission timing 1030, or one or more of the time interval lengths may be removed from the emission timing 1030.

In particular embodiments, one or more of the emission timings 1010-1030 may be provided to a display engine 112 so that the display engine 112 may provide display data to a display controller 280 in accordance with the emission timing(s). Since the emission timings 1020-1030 may be generated based on waveforms 1002, and the waveforms 1002 may be clock signals output from a display controller 280, the emission timings may be provided to the display engine 112 via an emission timing generator 288 that receives the clock signals 286 from the display controller 280 and generates the emission timing signal 290 according to mappings from waveforms 1002 to time intervals. For example, the time intervals 1012, 1014, 1032, and 1034 may be generated based on the waveforms 1002 as shown in FIG. 10. The display engine 112 may then generate swaths that correspond to the time intervals specified by the emission timings. For example, the display engine 112 may generate swaths that can be sent to the display controller 280 within the time intervals specified by the emission timings. Since the clock signals are periodic, the clock signals from the display controller 280 may be time-shifted by a particular amount of time so that the display engine 112 has sufficient lead time to generate the swaths to satisfy the emission timing constraints. For example, the clock signals may be time-shifted so that the display engine 112 receives the emission timing that will occur at a predetermined time in the future, e.g., some number of microseconds in the future. The number of microseconds may be, for example, greater than the time needed to render at least one swath, and less than the time needed to render an entire frame.

Figure 11A:
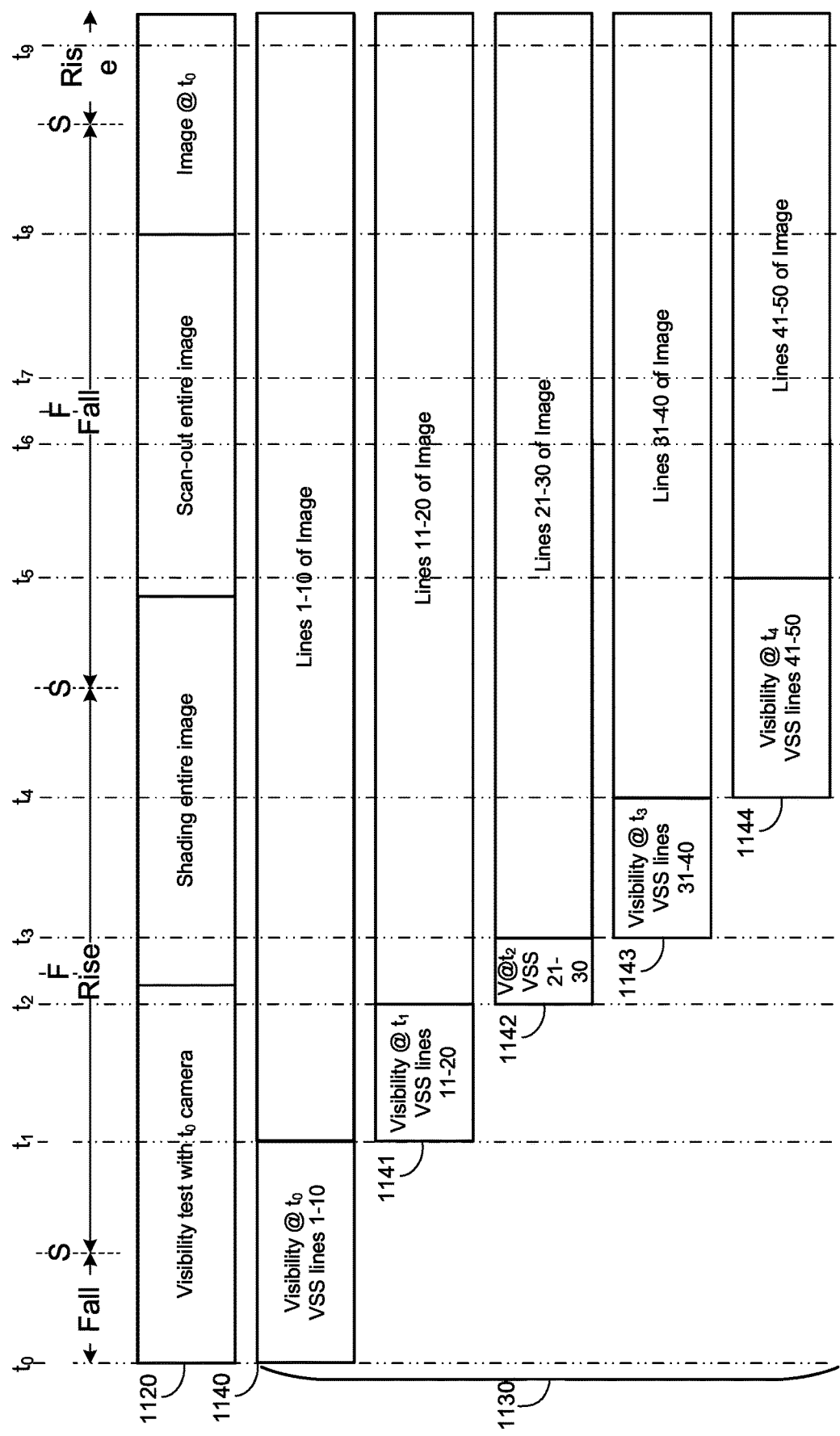
FIGS. 11A and 11B illustrate examples comparing a swath-generation timeline without using beam racing to timelines using beam racing.
Figure 11B:
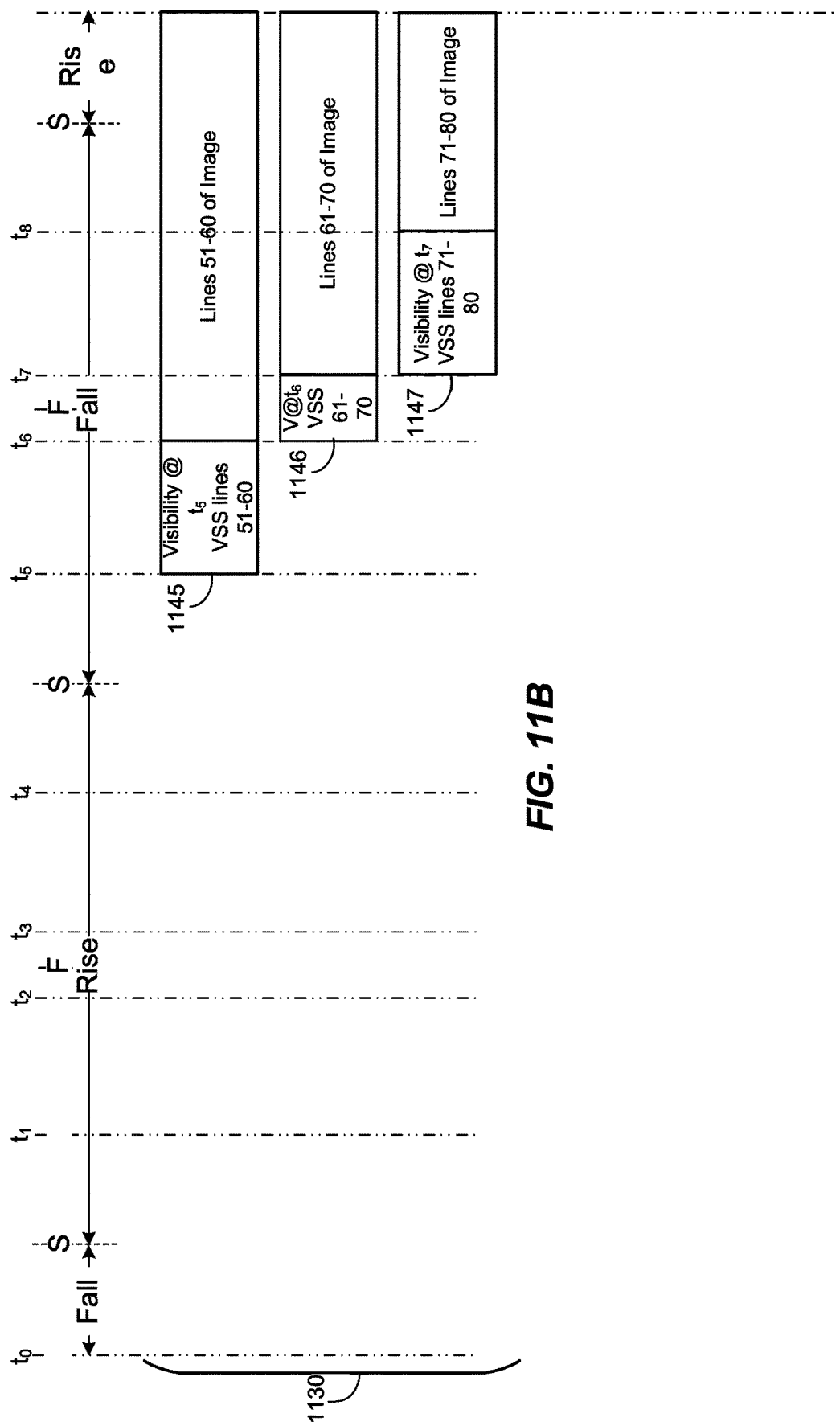

FIGS. 11A and 11B illustrate examples comparing a swath-generation timeline without using beam racing to timelines using beam racing. The swath-generation timeline of FIGS. 11A and 11B corresponds to the emission timing 1010 of FIG. 10, in which the time intervals during which swaths may be generated for display may vary in duration. Thus, each time interval may be a time during which a corresponding swath is to be generated and displayed, and the end time of the time interval may be the time by which the swath for the time interval is needed by the display 116A, 116B. The display engine 112 may generate and display each swath during the time interval that corresponds to the swath. For example, the time interval between t0 and $t_1$ may be a time during which a swath of lines 1-10 is to be generated and displayed. The display engine 112 may generate a swath using the transform blocks 220A, 220B. The display engine 112 may display a swath by sending the swath to the display 116A, 116B. For example, to send the swath, the pixel blocks 230A, 230B may write tiles that represent the swath to a row buffer of the display blocks 240A, 240B.

In particular embodiments, the display engine 112 may use the emission timing signal 290 from the display system 250 to identify time intervals that are to occur in the near future and generate swaths at times based on the identified time intervals, so swaths are ready to be displayed when the time intervals actually occur in real-time. As an example, an emission timing signal 290 may specify the times $t_0$-$t_9$ as, for example, a signal that occurs at those times, or other suitable representation, such as a sequence of times that represent each of the times $t_0$-$t_9$. The near future may be, e.g., up to a predetermined duration of time from the current time. The predetermined duration may be, e.g., the time needed to generate an image (e.g., 2000 lines), or a fraction thereof, e.g., half the time needed to generate an image. For each identified time interval, the display engine 112 may generate a corresponding swath and send the corresponding swath to the display 116A, 116B. Since the time intervals are different lengths, but each swath may be the same size (e.g., 10 lines), swaths may be written to the display 116A, 116B at different rates according to their lengths.

If the emission timing signal 290 is represented as a signal that occurs at the times $t_0$-$t_9$, then the signal may be time-shifted by the predetermined duration, so that the display engine 112 receives the signal for each time t in the times $t_0$-$t_9$ at the predetermined number of time units prior to the time at which the swath for the tine interval ending at time t is needed by the display 116A, 116B. Each time interval may be understood as a time budget for generating and displaying the corresponding swath. If the swath has not been written to the display 116A, 116B by the end of its corresponding time interval, then the swath may be displayed incorrectly or not displayed. In particular embodiments, the display blocks 240A, 240B may detect that a swath has not been completely written by the end of a time period, in which case the display blocks 240A, 240B may generate an error and instruct the pixel blocks 230A, 230B to stop writing to the row buffer. The pixel blocks 230A, 230B may pass an error signal on to the transform blocks 220A, 220B, which may handle the error. For example, the transform blocks 220A, 220B may use a fallback action, as described in further detail below.

FIG. 11A illustrates a graphics generation timeline 1120 that generates and outputs an entire image at the same time. FIGS. 11A and 11B further show timelines 1140-1147 for outputting an image using beam racing. In the illustrated example, a user wearing a VR device may be rotating his head quickly from an initial position at time $t_0$ to a final position at time $t_8$. If the pipeline 1120 is configured to generate an entire image, it may begin by configuring the orientation of the virtual camera based on the head orientation of the user at time to and proceed with shading and scanning out the entire image. By the time the image is ready to be output, the time may be $t_8$. However, at time $t_8$, the user's head orientation may have changed significantly from the time $t_0$ orientation, yet the image that is presented to the user may have been based on the user's head orientation at to. This lag may cause a sense of disorientation for the user.

As described above with reference to FIG. 9, particular embodiments reduce the latency between rendering and image display by outputting pixels scan line by scan line, where each line is generated based on renderings made when it is that line's turn to be generated and output. For example, the system may render at time $t_0$ and scan out line 0 (rather than the whole scene) based on the to rendering; render at time $t_1$ and scan out line 1 based on the $t_1$ rendering; and so on. This "beam racing" technique has the potential to significantly reduce the head-movement to photon latency. In particular embodiments, the system may schedule rendering tasks (e.g., visibility, shading, and scan out) with respect to the clock signal 286 or emission timing signal 290 generated by the display controller 280 as described above.

Referring again to FIG. 11A, the beam racing graphics pipeline 1130 shows an example of the beam racing technique. In this example, each video frame displayed has 80 horizontal lines. Although particular frame sizes and swath sizes are used in this example, the beam racing techniques disclosed herein any suitable sizes may be used with any suitable frame and swath sizes, e.g., a frame size of 1440 or 1600 lines, a swath size of 16, 32, or 90 lines, a display size of 2560×1440 or 2560×1440 (e.g., 2560 pixels per line), and so on.

The display engine 112 may have previously identified the time intervals between $t_0$ and $t_8$ based on the emission timing 1010. The display engine 112 may have further determined that 10 lines are to be generated for each swath, although a different number of lines may be generated, e.g., 1, 32, 64, or other number of lines per swath. The first timeline 1140 represents the timing of generating the first 10 lines (lines 1 to 10) of the video frame. At time $t_0$, the system may use the latest motion sensory data available at that time (e.g., from a VR device's inertial measurement unit, gyroscope, etc.) to orient the virtual camera and perform visibility tests. The system may then perform shading and scan out for lines 1-10 of the video frame. The visibility, shading, and scan out tasks are referred to as "VSS" in FIGS. 11A and 11B. In the example shown, lines 1-10 are ready by time $t_1$ and displayed to the user. Since the system is only tasked with generating 10 lines rather than all 80 lines, the duration needed for generating lines 1-10 (e.g., $t_1-t_0$) is significantly shorter than the duration needed for generating the whole image (e.g., $t_8-t_0$), as shown by timeline 1120. Thus, at time $t_1$, the user would be presented with lines 1-10 that were generated using the latest sensor information from to, which is much more current than the scenario shown by timeline 1120. In particular embodiments, lines 1-10 may be on continuous display until the rest of the lines in the video frame have been generated, and the process would repeat to generate updated lines 1-10 based on the virtual camera's updated orientation/position.

In particular embodiments, after the system generates lines 1-10, it may proceed to generate lines 11-20, as represented by timeline 1141. The process may begin at time $t_1$, at which time the system may perform visibility tests based on the latest sensor data available at that time. The system may again go through the process of shading and scan out, and then output lines 11-20 at time $t_2$. The interval during which lines 11-20 are generated (from $t_1$ to $t_2$) is shorter than the interval during which lines 1-10 are generated (from $t_0$ to $t_1$). Although the time intervals are of different lengths, 10 lines are generated during each interval. The rate at which pixel data is written to the display may be higher for shorter time intervals (such as $t_1$ to $t_2$), than for longer time intervals (such as $t_0$ to $t_1$). At time $t_2$, the user is presented with lines 11-20 that are generated based on sensory data from time $t_1$. The system may then repeat the process to generate lines 21-30, starting from time $t_2$ and ending at time $t_3$, then generate lines 31-40, starting from time $t_3$ and ending at time $t_4$, and then generate lines 41-50, starting from time $t_4$ and ending at time $t_5$.

Referring to FIG. 11B, the system may proceed to generate lines 51-60, as represented by timeline 1145. The process may begin at time $t_5$, at which time the system may perform visibility tests based on the latest sensor data available at that time. The system may again go through the process of shading and scan out, and then output lines 51-6045 at time 6. The system may then repeat the process to generate lines 61-70, starting from time $t_6$ and ending at time $t_7$, and then generate lines 71-80, starting from time $t_7$ and ending at time $t_8$. Thus, at time $t_8$, the user is presented with a video frame that includes much more current information (e.g., as recent as time $t_7$), compared to the scenario presented by the timeline 1120, where the user at time $t_8$ is presented with a frame generated based on to data.

Figure 12:
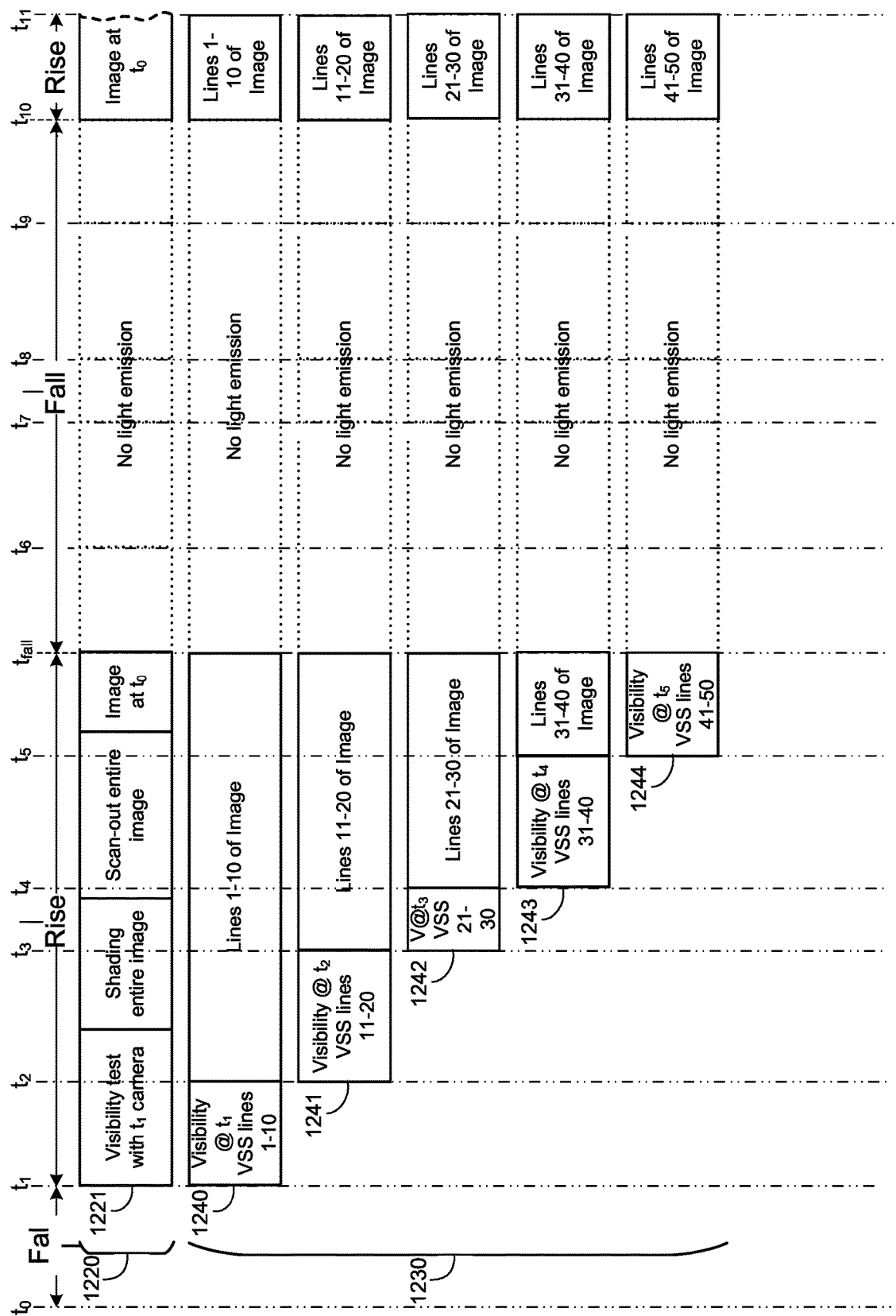
FIG. 12 illustrates examples comparing a swath-generation timeline without using beam racing to timelines using beam racing during emission and non-emission times.

FIG. 12 illustrates examples comparing a swath-generation timeline without using beam racing to timelines using beam racing during emission and non-emission times. The swath-generation timeline of FIG. 12 corresponds to the emission timing 1020 of FIG. 10, in which the time intervals during which swaths may be generated for display may vary in duration, and no light is emitted in certain time intervals. In particular, no light is emitted in time intervals that correspond to falling portions of the waveform 1002-B. Light may be emitted on rising portions but not on falling portions. This emission pattern and example reasons for its use are described above with reference to FIG. 6.

In particular embodiments, the display engine 112 may use the emission timing signal 290 from the display system 250 to identify time intervals that are to occur in the near future and schedule swath generation operations to occur in the identified time intervals. The emission timing signal 290 may indicate time intervals during which light is not emitted by, for example, having a zero value or not being generated during such non-emission time intervals. In particular, FIG. 12 illustrates a graphics generation timeline 1220 that generates and outputs an entire image at the same time and timelines 1240-1244 using beam racing. In the illustrated example, a user wearing an AR/VR device may be rotating his head quickly from an initial position at time $t_1$ to a final position at time $t_{11}$. If the pipeline 1220 is configured to generate an entire image, it may begin a timeline 1221 by configuring the orientation of the virtual camera based on the head orientation of the user at time $t_1$ and proceed with shading and scanning out the entire image. By the time the image is ready to be output, the time may be $t_{fall}$, which corresponds to a time at which a falling portion of the waveform 600 is reached and no light is emitted.

The beam racing graphics pipeline 1230 shows an example of the beam racing technique. In this example, each video frame displayed has 50 horizontal lines, and each swath has ten lines. The display engine 112 may have previously identified the time intervals between $t_1$ and $t_{11}$ based on the emission timing 1020. The first timeline 1240 represents the timing of generating the first 10 lines of the video frame. At time $t_1$, the system may use the latest motion sensory data available at that time (e.g., from a VR device's inertial measurement unit, gyroscope, etc.) to orient the virtual camera and perform visibility tests. The system may then perform shading and scan out for lines 1-10 of the video frame. In the example shown, lines 1-10 are ready by time $t_2$ and displayed to the user. Since the system is only tasked with generating 10 lines rather than all 50 lines, the duration needed for generating lines 1-10 (e.g., $t_2-t_1$) is significantly shorter than the duration needed for generating the whole image (e.g., $t_{fall}-t_1$), as shown by timeline 1221. In particular embodiments, lines 1-10 may be on continuous display until the rest of the lines in the video frame have been generated, and the process would repeat to generate updated lines 1-10 based on the virtual camera's updated orientation/position.

In particular embodiments, after the system generates lines 1-10, it may proceed to generate lines 11-20, as represented by timeline 1241. The process may begin at time $t_2$, at which time the system may perform visibility tests based on the latest sensor data available at that time. The display engine 112 may have determined that 10 lines are to be generated for timeline 1241. The system may again go through the process of shading and scan out, and then output lines 11-20 at time $t_3$. Thus, at time $t_3$, the user is presented with lines 11-20 that are generated based on sensory data from time $t_2$. The system may then repeat the process to generate lines 21-30, starting from time $t_3$ and ending at time $t_4$, then generate lines 31-40, starting from time $t_4$ and ending at time $t_3$, and then generate lines 41-50, starting from time $t_5$ and ending at time $t_{fall}$, at which time is when the emitters may stop emitting light until time $t_{10}$ (as represented by portions 1024 of the emission timing 1020).

In particular embodiments, at time $t_{10}$, the emitters may resume emitting light because a rising portion of the waveform 600 is reached (which corresponds to a second portion 1022 of the emission timing 1020). The pipeline 1220 that is configured to generate an entire image may resume emitting the lines that were being emitted previously to $t_{fall}$. In the beam racing pipeline 1230, at time $t_{10}$, the emitters may resume emitting lines that were being emitted previously to $t_{fall}$.

Figure 13:
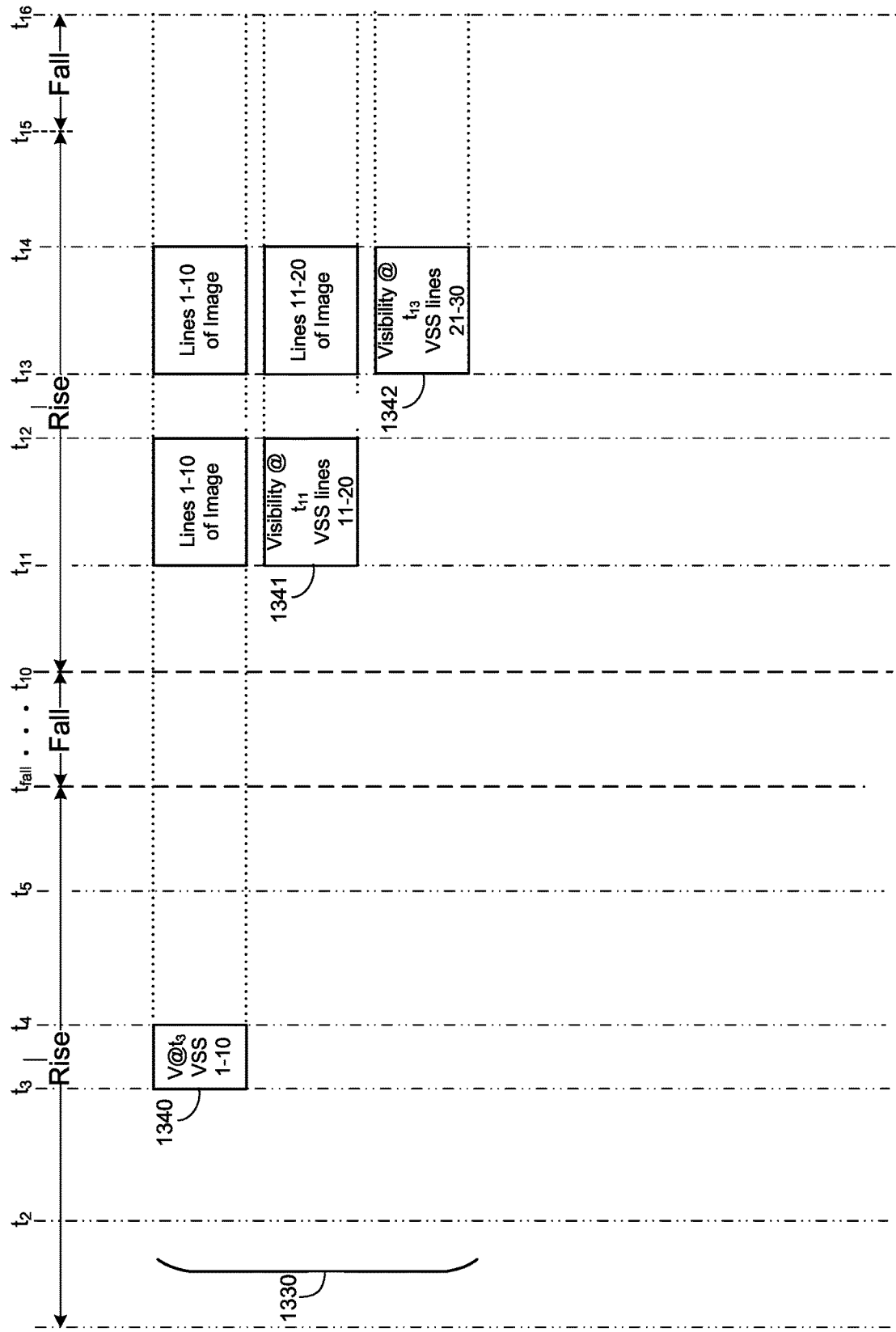
FIG. 13 illustrates example swath-generation timelines using beam racing during emission and non-emission times.

FIG. 13 illustrates example swath-generation timelines using beam racing during emission and non-emission times. The swath-generation timeline 1300 of FIG. 13 corresponds to the emission timing 1030 of FIG. 10, in which the time intervals during which swaths may be generated for display may vary in duration, and no light is emitted in certain time intervals. In particular, the emission timing 1030 specifies that light emission can be performed in two phases: a first phase in which the beginning and end segments (corresponding to emission times 1034-A, and 1034-B) are used, and a second phase in which the center segment (corresponding to emission time 1032) is used. Light is not emitted during other segments of the waveform 1002-C, as shown by the dashed lines in the emission timing 1030. This emission pattern and example reasons for its use are described above with reference to FIG. 8.

In particular embodiments, the display engine 112 may use the emission timing signal 290 from the display system 250 to identify time intervals that are to occur in the near future and schedule swath generation operations to occur in the identified time intervals. In particular, the graphics generation timelines 1340-1342 use beam racing. In the illustrated example, a user wearing a VR device may be rotating his head quickly from an initial position at time $t_2$ to a final position at time $t_{14}$.

The beam racing graphics pipeline 1330 shows an example of the beam racing technique. In this example, each video frame displayed has 30 horizontal lines. The display engine 112 may have previously identified the time intervals between $t_2$ and $t_{14}$ based on the emission timing 1030. The display engine 112 may have thus determined that light is only to be emitted in the time intervals from $t_3$ to $t_4$, which corresponds to the center time interval 1032 of a rising portion of the waveform 1002-C, from $t_{11}$ to $t_{12}$, which corresponds to the beginning time interval 1034-A of a rising portion of the waveform 1002-C, and from $t_{13}$ to $t_{14}$, which corresponds to the end time interval 1034-B of a rising portion of the waveform 1002-C.

The display engine 112 may have further determined that 10 lines are to be generated for each swath. The first timeline 1340 represents the timing of generating the first 10 lines of the video frame. At time $t_3$, the system may use the latest motion sensory data available at that time (e.g., from a VR device's inertial measurement unit, gyroscope, etc.) to orient the virtual camera and perform visibility tests. The system may then perform shading and scan out for lines 1-10 of the video frame. In the example shown, lines 1-10 are ready by time $t_4$ and may be displayed to the user at that time. However, the emitters may stop emitting light at time $t_4$. Thus, lines 1-10 are not displayed between $t_4$ and $t_{11}$. At $t_{11}$ the emitters may resume emitting light for timeline 1340. Lines 1-10 may be displayed until $t_{12}$, at which time the emitters again stop emitting light, and again displayed between $t_{13}$ and $t_{14}$.

In particular embodiments, after the system generates lines 1-10, it may proceed to generate lines 11-20, as represented by timeline 1341. The process may begin at time $t_{11}$, at which time the system may perform visibility tests based on the latest sensor data available at that time. The system may again go through the process of shading and scan out, and then output lines 11-20. In particular embodiments, the system may go through the process of shading and scan out, and then output lines 11-20 at or before time $t_{12}$. If lines 11-20 are output to the display prior to time $t_{12}$ (e.g., because they are ready to be output), then they may be displayed until time $t_{12}$. However, the emitters may stop emitting light at time $t_{12}$. The emitters may resume emitting light from $t_{13}$ to $t_{14}$, during which time lines 11-20 may be displayed. The system may then repeat the process in timeline 1342 to generate lines 21-30, starting from time $t_{13}$ and ending at time $t_{14}$. However, the emitters may stop emitting light at time $t_{14}$. Thus, lines 21-30 are not displayed between $t_{14}$ and the next time interval in which the emitters resume emitting light, which is not shown in FIG. 13.

Figure 14:
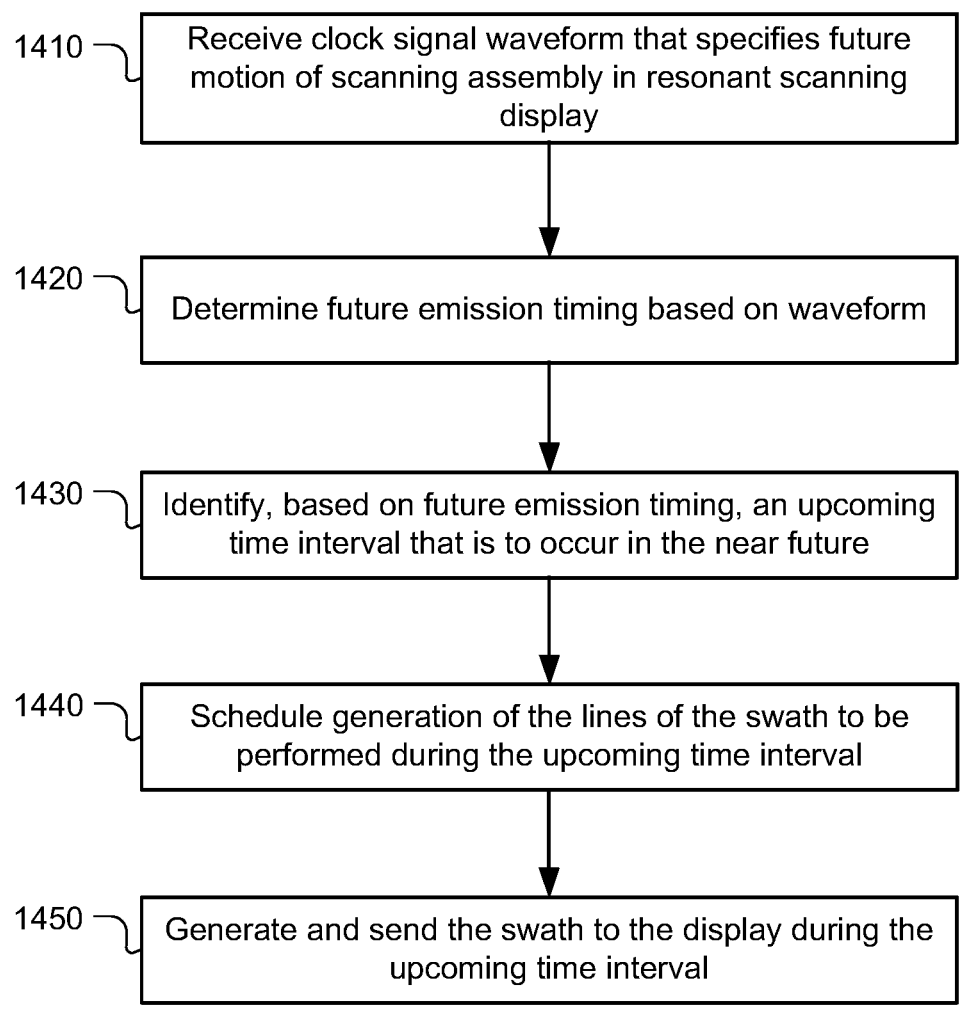
FIG. 14 illustrates an example method for scheduling swath generation for a VR display that uses beam racing.

FIG. 14 illustrates an example method 1400 for scheduling swath generation for a VR display 116A, 116B that uses beam racing. In particular embodiments, the method 1400 may be performed by a display engine 112. The method may begin at step 1410, where a computing system may receive a clock signal waveform 286 that specifies future motion of a scanning assembly 272 in the VR display 116A, 116B, which may be a resonant scanning display. The display engine 112 may receive the clock signal waveform 286 from a display controller 280. At step 1420, the system may determine an emission timing signal 290 based on the clock signal waveform 286 generated by a display controller 280. The future emission timing may specify times in the future at which swaths are to be sent to the display 116A, 116B.

At step 1430, the system may identify, based on the emission timing signal 290, an upcoming time interval that is to occur in the near future. The upcoming time interval may have an associated length, which may be the difference between the start and end times of the upcoming time interval. As described above with reference to FIG. 2B, to provide a lead time for the display engine 112 to generate the swaths prior to sending them to the display 116A, 116B, the emission timing signal 290 may inform the display engine 112 at a time $t_0$-$t_{lead}$ that a time interval is to begin at time $t_0$.

At step 1440, the system may schedule generation of the determined number of lines (or pixels) of the swath to be performed during the upcoming time interval. The display engine 112 may determine the duration of time that will be available for each swath based on the difference between each successive time indicated by the emission timing signal 290. For example, after the emission timing signal 290 indicates at a first time $t_0$-$t_{lead}$ that an upcoming time interval for a swath is to begin at time $t_0$, the display engine 112 may use the next signal, which may occur at a second time $t_1$-$t_{lead}$, to determine the length of the upcoming time interval that is to occur between $t_0$ and $t_1$ (during which time the swath is to be provided to the display 116A, 116B) by computing the difference between the first and second times.

In particular embodiments, steps 1410-1440 may then be repeated for the next swath of an image and the next time interval specified by the emission timing signal 290. Further, for each image to be displayed, steps 1410-1440 may be repeated until all the swaths of the image (which may correspond to all lines of the display) have been scheduled for generation.

At step 1450, when the upcoming time interval occurs (e.g., the start time of the upcoming time interval is reached), the system may generate the swath using the display engine 112 and send the swath to the display 116A, 116B by the end of the upcoming time interval. For each image to be displayed, step 1450 may repeat until all the swaths of the image have been sent to the display 116A, 116B.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for scheduling swath generation for a VR display, including the particular steps of the method of FIG. 14, this disclosure contemplates any suitable method for doing so, including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Foveated rendering may be used to increase the speed at which images may be generated by rendering "non-foveated" regions of the display 116A, 116B, which may be seen by the portion of the retina outside the fovia, with less detail than "foveated" regions of the display. The fovea of the eye, located the center of the retina, has the highest density of cones in the retina, and therefore allows the eye to see more detail than the portion of the retina outside the fovia. Using this foveated rendering technique may reduce the computational cost (e.g., processing time) of rendering images without visibly reducing image quality, since reductions in image quality in the foveated regions are unlikely to be seen by the user. As such, tiles of a non-foveated region of an image may be rendered with less detail than tiles in the foveated region. Since non-foveated regions may be generated more quickly, the time needed to generate the image may be reduced. Tiles may be rendered with less detail by, for example, determining the values of a subset of the pixels using pixel interpolation and replication instead of bilinear interpolation.

In particular embodiments, each tile may be rendered at a particular level of detail determined based on where the tile is located. For example, the level of detail may be determined based on where in the image the tile is located relative to the user's gaze or a lens. There may be two or more levels of detail, and a particular level of detail may be associated with each tile. For example, there may be four levels of detail, named L0-L3. L0 may correspond to a greatest level of detail and may be suitable for the center region of the screen, or for a region on which the user's gaze is focused. L1 may correspond to slightly less detail and may be suitable for regions slightly farther from the center or gaze. L2 may correspond to still less detail and may be suitable for regions still farther from the center or gaze. L3 may correspond to a lowest level of detail and may be suitable for regions at or near the edges of the image, which are likely to appear to the user as the most distorted regions.

In particular embodiments, to render each tile, a predetermined foveated rendering pattern associated with the tile's level of detail may be used to determine how the value of each pixel in the tile is to be generated. Each level of detail may be associated with a particular foveated rendering pattern, which may be understood as a matrix in which each element corresponds to a pixel location for a tile of pixels. Each element of the matrix may specify how the value of the pixel at the corresponding location is to be generated. An element in the foveated rendering pattern matrix may specify that the pixel is to be generated by sampling, pixel interpolation, or replication. Sampling may involve retrieving data for the pixel from a corresponding texel array. The texel array may be selected based on the level of detail. Lower-resolution texture maps may be used for lower levels of detail. For example, if a tile is in a region that corresponds to approximately half the visual acuity of the foveated (L0) region, then a half-resolution texture map may be used for sampling that tile, which may result in fewer texels being read from texel memory. The resulting tile may be blurrier than if it were generated using a full-resolution texture map, but as it appears in a half-acuity region, such blurriness may be acceptable. Further, use of the half-resolution texture map may avoid aliasing effects in the tile pixels. Thus, mipmap level may be selected based on the how far apart sampled pixels are. For example, if the distance between sampled pixels increases by a factor of two, a coarser mipmap level may be selected to avoid aliasing effects.

In particular embodiments, foveated rendering may substantially reduce the amount of computation performed to generate an image. Without using foveated rendering, the entire image may be rendered at full detail, which means that, for each tile, bilinear interpolation is performed for 16×16 sample points by sampling a texel array, which is a relatively costly operation. The texel array may need to be retrieved from memory, and the bilinear interpolation may involve numerous numeric operations. Foveated rendering introduces computational savings by using pixel interpolation and replication operations instead of bilinear interpolation to generate tiles that are in non-foveated regions 1520-1540. Pixel interpolation and replication are simpler operations and thus perform less computation than bilinear interpolation. Bilinear interpolation may involve accessing textures, which may need to be retrieved from texel memory 214. In contrast, pixel interpolation and replication may be performed on the tiles without accessing textures. Since the non-foveated regions may cover a substantial area of the display 1504, the computational savings resulting from using pixel interpolation and replication in non-foveated regions can be substantial, thereby reducing power consumption and allowing for use of less-powerful or less-expensive hardware, or allowing for more details or complexity in the portion of the scene on which the user's vision is focused. For example, computational resources that would have been used for non-foveated regions may be used to generate additional details in the foveated region.

In particular embodiments, pixel interpolation involves determining a pixel's value (e.g., color) based on the values of neighboring pixels, which may have been sampled from the texel array. Pixel interpolation may determine a pixel's value by, e.g., averaging two neighboring pixels on either side of the pixel. Pixel interpolation does not involve performing bilinear interpolation on the underlying texel array, and therefore uses fewer computational resources. Pixel replication involves copying values of neighboring pixels, which may have been sampled or interpolated, and uses fewer computational resources than interpolation.

In particular embodiments, the foveated rendering operations to use for a tile, e.g., sampling, interpolation, and/or replication, may be specified on a per-tile basis. A level of detail to use for the tile may also be specified on a per-tile basis. There may be two or more levels of detail for each surface. The levels of detail are referred to herein as L0 through L3. These levels of detail allow for foveated rendering modes that sample 16 (L0), 8 (L1), 4 (L2), or 2 (L3) positions per row and column in a 16×16 pixel tile. A different mipmap level may be associated with each level of detail, and the resolution of the mipmap for detail level $L<i+1>$ should be less than the resolution of the mipmap for detail level $L<i>$. In particular embodiments, the level of detail should be selected so that the associated number of positions per row and column is less than or equal to the sample resolution. Using lower-resolution mipmaps allows for sampling pixels that are farther apart without producing an aliasing effect. For example, the L0 texture array should not be used when computing 8 samples per tile, since L0 samples 16 positions per row and column in a 16×16 tile, though any of levels L1-L3 may be used in this example. Restricting the selected level of detail for a tile to a resolution level at or lower than the sample resolution (which may be, e.g., the worst-cast sample spacing for a tile) may avoid aliasing and also prevent sampling from zooming out by more than a factor of two. In particular embodiments, providing up to four levels of resolution for each texture array may solve the problem of zooming in by more than 2×. The pixel block 230's buffer controller may check the worst-case sample spacing for a tile and then use a lower resolution level if one is available, thereby selecting a lower-resolution texture. Alternatively, the pixel block 230 may not render the tile if a lower resolution level is not available. This technique may push out the point at which tiles may be dropped because the pre-warped texture is too large for its position and orientation.

In particular embodiments, pixels from a pixel block 230 may be stored in a row buffer together with a foveated rendering pattern identifier for each processed tile. If block artifacts result from changing the foveated rendering level and level of detail on a per-tile basis, the occurrence of such block artifacts may be mitigated by using different foveated rendering techniques or parameters for successive frames. For example, a tile may compute 8×8 samples using level 1 in three-out-of-four frames, and may could compute 16×16 samples using level 0 in one-out-of-four frames.

In particular embodiments, interpolating pixel values that are between computed values may work well except where the interpolated pixel is at the edge of the screen with a computed pixel on only one side. A similar problem may occur when two adjacent tiles need different numbers of interpolated pixels. These interpolation problems may be solved by replicating instead of interpolating. However, these interpolation problems may alternatively be solved by using foveated rendering patterns for which interpolating pixels along the edge of the display does not involve off-display pixels. This foveated rendering pattern solution uses different orientations of the sample pattern in different parts of the ring of tiles at a given level of detail, as described below.

Figure 15A:
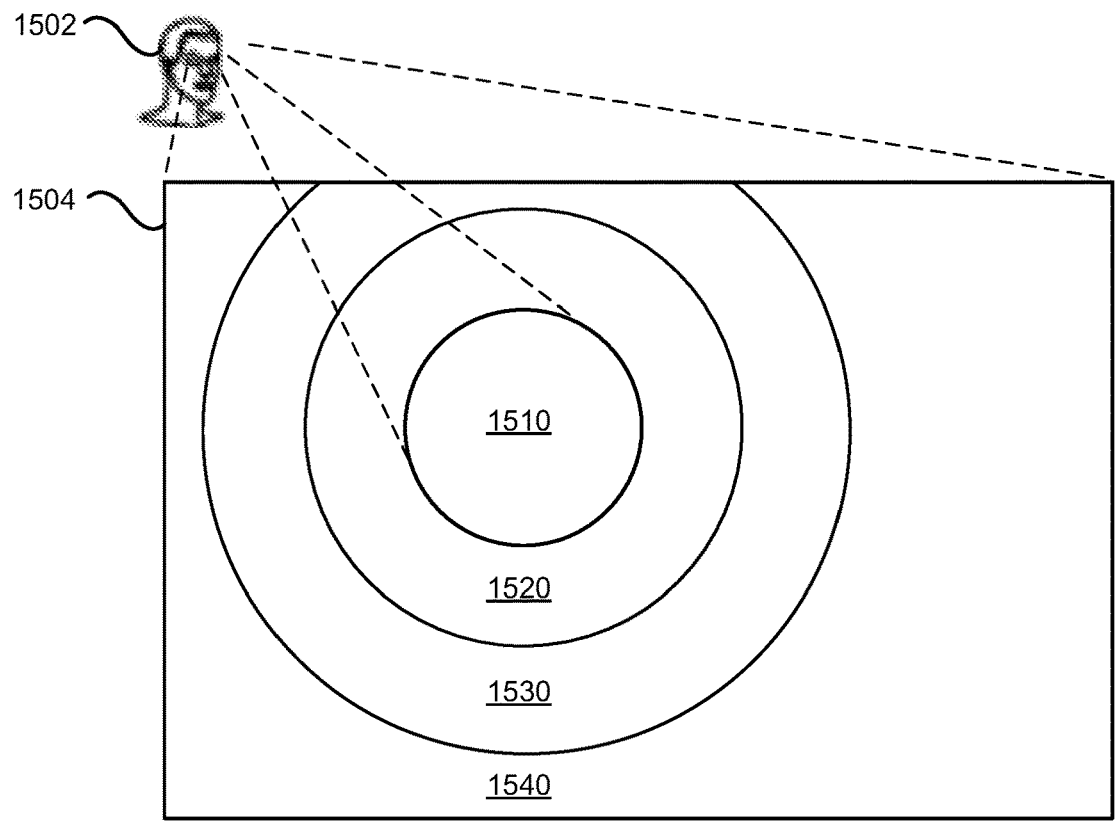
FIG. 15A illustrates foveated and non-foveated regions on an example display screen.

FIG. 15A illustrates foveated and non-foveated regions on an example display screen 1504. The display screen 1504 may be, for example, a pupil display 156. A user's head 1502 is oriented so that at least one of the user's eyes sees the display screen 1504. The fovea of the user's eye sees a foveated region 1510 of the display screen 1504. The foveated region 1510 may be the area in the circle labeled 1510. The location of the foveated region 1510 on the display screen 1504 may change as the user focuses their sight on different areas of the screen 1504. In particular embodiments, the location on which the user is focusing their sight may be determined, e.g., using eye-tracking techniques. Alternatively, the location on which the user is focusing their sight may be estimated or predetermined, e.g., as the center of the display screen 1504. The user's eye also sees three non-foveated regions 1520, 1530, 1540, which may be circular regions outside and surrounding the foveated region 1510 (and may be non-overlapping). The boundaries between the regions 1510, 1520, 1530, 1540 are shown as concentric circles of increasing diameter. The regions are shown as circles for explanatory purposes, and may be other shapes such as ovals or irregular shapes, depending on factors such as the user's position and vision quality.

The user's eye may see less detail of the image in the non-foveated regions 1520, 1530, 1540 than in the foveated region 1510. For example, the image on the display 1504 may appear blurrier or less focused in the first non-foveated region 1520 than in the foveated region 1510. Similarly, the user's eye may see less detail in the second non-foveated region 1530 than the first foveated region 1520, and less detail in the third non-foveated region 1540 than the second non-foveated region 1530.

Figure 15B:
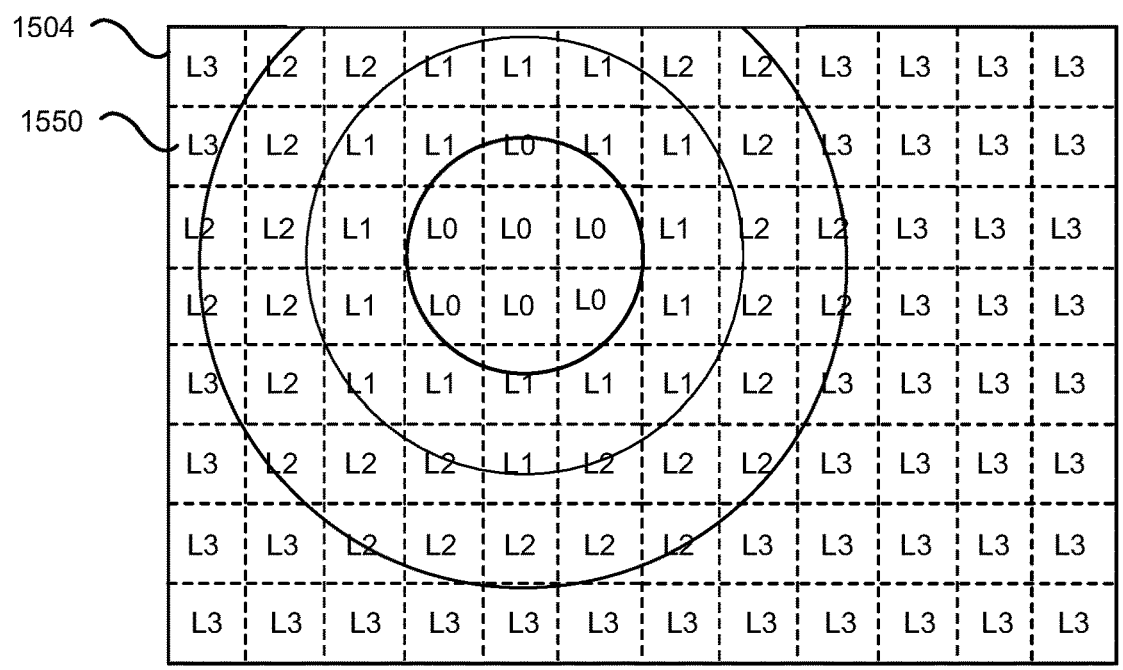
FIG. 15B illustrates example locations of tiles in foveated and non-foveated regions on a display screen.

FIG. 15B illustrates example locations of tiles 1550 in foveated and non-foveated regions on a display screen 1504. Each tile 1550 may include 16×16 aligned pixels or other number of aligned pixels, e.g., 32×32. Each tile 1550 may be associated with one of the regions 1510-1540. The region associated with a tile 1550 may be, e.g., the region in which the center of the tile 1550 is located. Alternatively, the region associated with each tile 1550 may be determined in other ways, e.g., as the region in which the upper-left corner of the tile 1550 is located. Each of the tiles 1550 is labeled in FIG. 15B with a detail level that corresponds to the region in which the tile 1550 is located. The level may be one of L0, L1, L2, or L3, where L0 corresponds to the foveated region 1510, L1 corresponds to the first non-foveated region 1520, L2 corresponds to the second non-foveated region 1530, and L3 corresponds to the third non-foveated region 1540. The tiles 1550 in each of the regions 1510-1540 form a shape based on the shape of their foveated region, as shown in FIGS. 15C-15F.

Figure 15C:
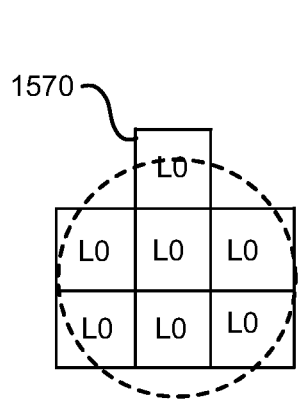
FIG. 15C illustrates an example foveated tile shape.

FIG. 15C illustrates an example foveated tile shape 1570. The tiles in the foveated tile shape 1570 include the L0 tiles from FIG. 15B. The tile shape 1570 thus corresponds to the circular shape of the foveated region 1510. The values of pixels in the tile shape 1570 may be determined by sampling the corresponding surface's texel array.

Figure 15D:
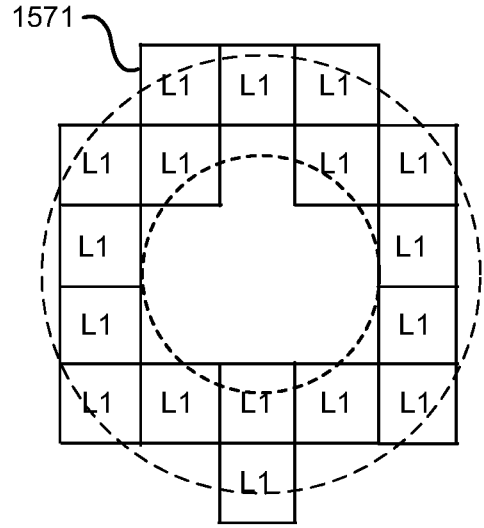
FIGS. 15D-F illustrate example tile rings formed by non-foveated regions.
Figure 15E:
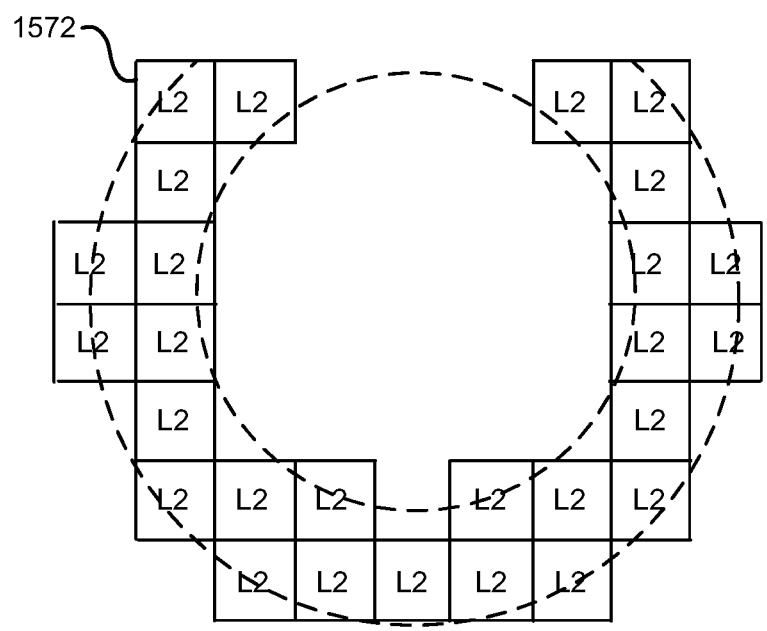
Figure 15F:
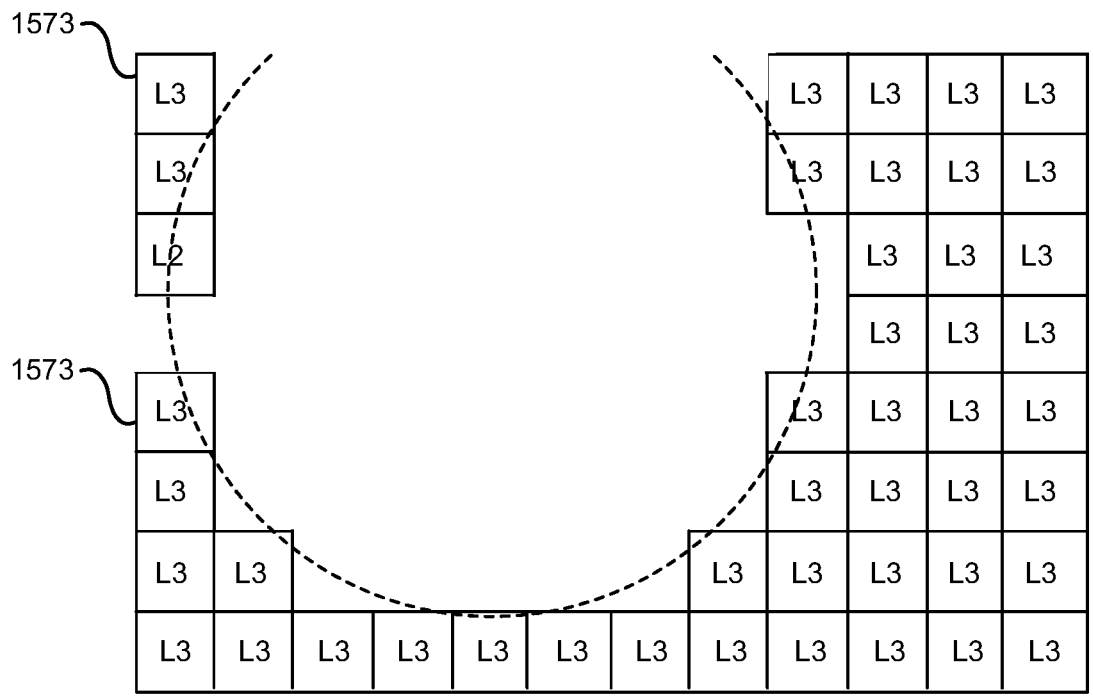

FIGS. 15D-F illustrate example tile rings 1571-1573 formed by the non-foveated regions 1520-1540. Each of the tile rings corresponds to a level of detail. Larger rings (e.g., rings having larger outer circumferences or perimeters, such as ring 1572) may correspond to less-detailed levels than smaller rings (e.g., ring 1571), since larger rings are farther from the foveated region 1510. A foveated rendering pattern may be associated with each tile directly or via the tile's level of detail. Foveated rendering patterns are described below in further detail with reference to FIG. 17.

In particular embodiments, the foveated rendering pattern associated with each tile may be used to determine which pixels of the tile are to be generated by (a) sampling the corresponding surface's texel array, (b) interpolating (e.g., averaging) neighboring sampled pixels, or (c) replicating (e.g., copying) neighboring sampled or interpolated pixels. As an example, if a foveated rendering pattern used for a tile specifies that every other pixel of the tile is to be sampled, a pixel block 230 may sample a half-resolution version of the surface's texel array. Sampling the half-resolution version may be less complex than performing a full mipmapping because a single level of detail may be used for the entire tile. Thus, the pixel block's buffer controller may load a single block of texels into the texel buffer to process the tile. The values of the remaining (e.g., non-sampled) pixels of the tile may be determined, according to the foveated rendering pattern applied to the tile, by interpolating previously-sampled pixels, or by replicating previously-sampled or previously-interpolated pixels.

FIG. 15D illustrates a level 1 foveated-rendering ring 1571. The tiles in the foveated-rendering ring 1571 include the L1 tiles from FIG. 15B. FIG. 15E illustrates a level 2 foveated-rendering ring 1572. The tiles in the foveated-rendering ring 1572 include the L2 tiles from FIG. 15B. FIG. 15F illustrates a level 3 foveated-rendering ring 1571. The tiles in the foveated-rendering ring 1573 include the L3 tiles from FIG. 15B.

Figure 15G:
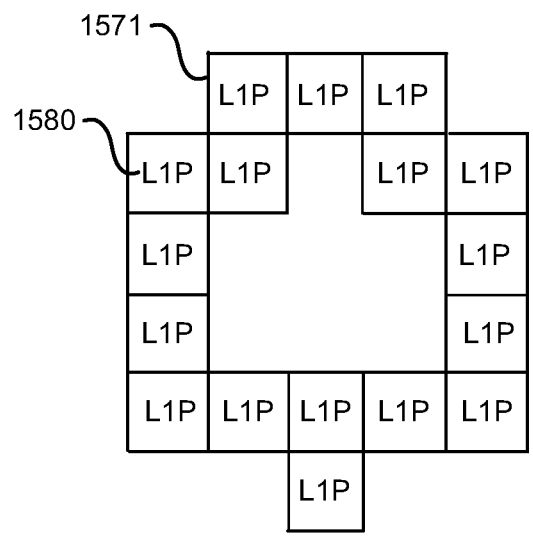
FIG. 15G illustrates use of a foveated rendering pattern L1P to generate pixels in tiles of a foveated-rendering ring.

FIG. 15G illustrates an example use of a foveated rendering pattern L1P to generate pixels in tiles 1580 of a foveated-rendering ring 1571. The foveated rendering pattern L1P may be selected based on the detail level of the tiles 1580. Since the tiles in the level 1 ring 1571 are L1 (detail level 1) tiles, a level 1 foveated rendering pattern L1P is used to interpolate and replicate each of the tiles 1580. The foveated rendering pattern L1P may be applied to each tile 1580 of the foveated-rendering ring 1571 to determine which pixels of each tile 1580 are to be determined by sampling, interpolating, or replicating. Foveated rendering patterns and their application to generate pixels of tiles are described in further detail below.

Figure 16:
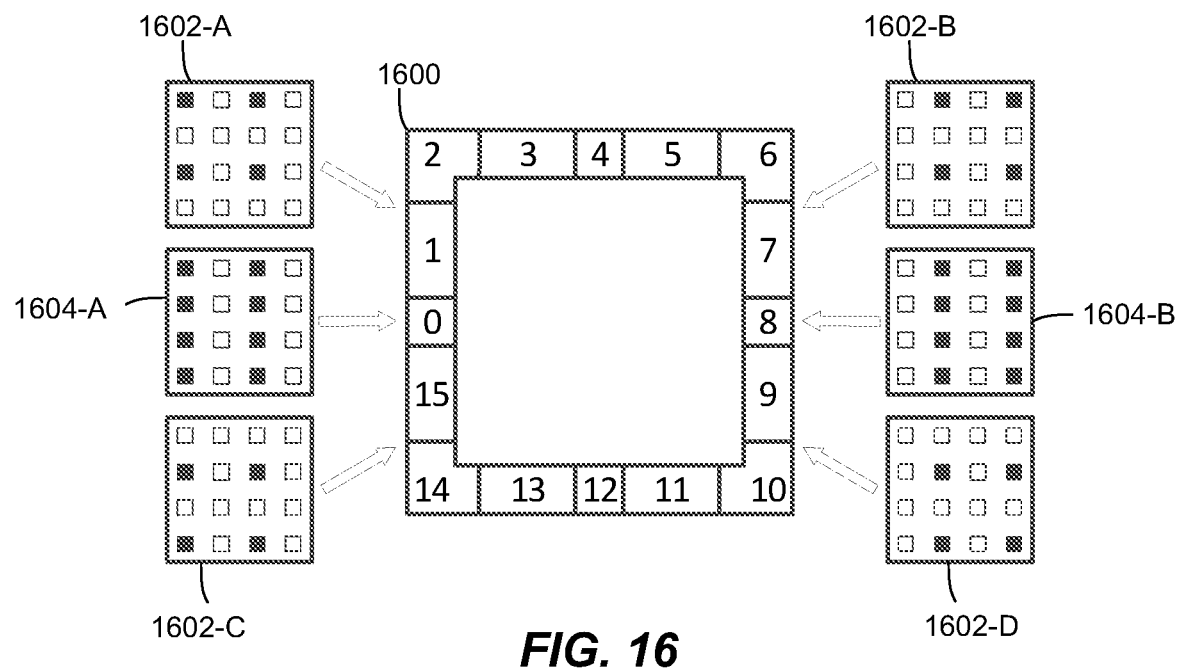
FIG. 16 illustrates an example foveated-rendering ring having regions with example patterns for the four corners of the ring.

FIG. 16 illustrates an example foveated-rendering ring 1600 having 16 regions with example 4×4 patterns 1602-A-1602-D for the four corners of the ring. Each region may include one or more tiles. The corner patterns 1602 may be identical to each other except for their orientation. The middle tile 1604-A of the left side of the ring 1600 and the middle tile 1604-B of the right side of the ring 1600 are shown as separate regions 0 and 8, respectively, since the middle tiles 1604 may have tiles of two different orientations on either side. Each middle tile 1604 may compute samples on both edges, as shown in FIG. 16 for regions 0 and 8.

Figure 17:
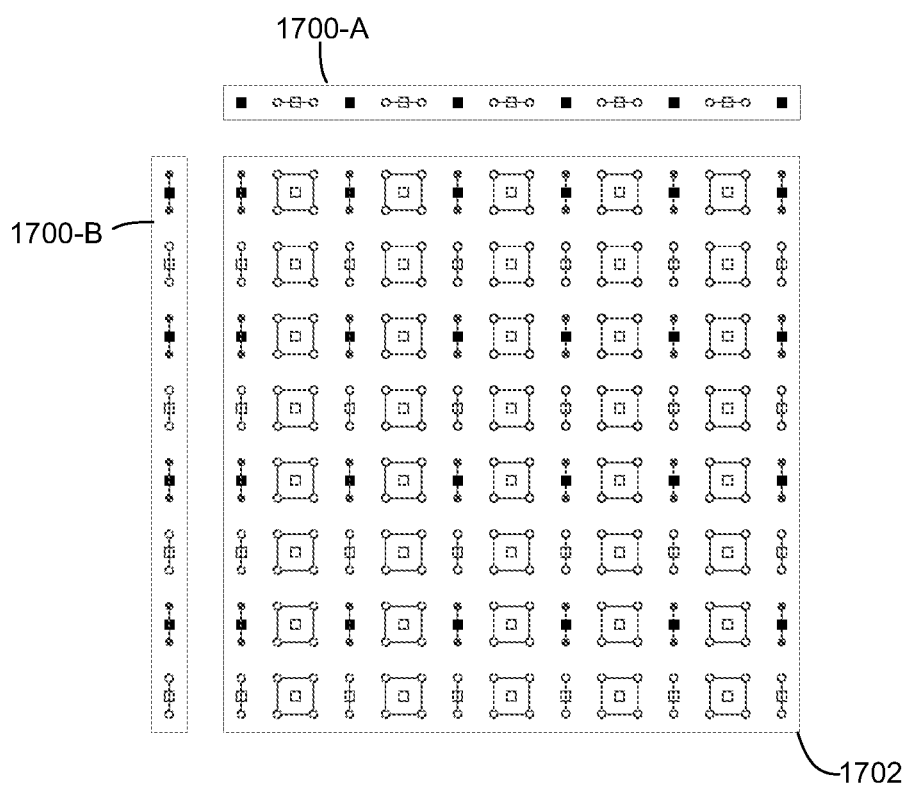
FIG. 17 shows an example 2D foveated rendering pattern.

FIG. 17 shows an example 2D foveated rendering pattern 1702. An example horizontal pattern 1700-A and an example vertical pattern 1700-B may be combined to form the 2D foveated rendering pattern 1702. The horizontal pattern 1700-A is a mid-ring pattern, with sample positions (corresponding to pixel positions) at either end, and the vertical pattern 1700-B is a top-of-ring pattern, with a sample position at the top and an interpolated position at the bottom. In FIG. 17, solid squares represent sample positions, outline squares represent interpolated positions, and circles connected by lines represent positions where a sampled or interpolated value is replicated. The 2D foveated rendering pattern 1702 may be represented as a set of pixel locations identified by offsets. The pixel locations may be understood as elements of a matrix having the dimensions of the 2D pattern 1702, and the offsets may identify the individual matrix elements. In particular embodiments, each pixel location may be associated with an operation identifier that specifies whether the pixel location is to be determined by sampling, interpolation, or replication. In the case of interpolation or replication, the pixel location may also be associated with offsets that identify the locations of other pixels in the pattern (or matrix elements) that are to be used as input to the interpolation or replication operation. The 2D foveated rendering pattern 1702 may be applied to a tile by performing the operation specified by the operation identifier for each pixel location on the tile pixel identified by the pixel location (e.g., offset), using the other tile pixels at locations specified by the parameters for the interpolation and replication operations.

In particular embodiments, a foveated rendering code may be associated with each tile to specify a detail level and a foveated rendering pattern for the tile. The foveated rendering code may be, e.g., 8 bits in length. The foveated rendering code may include the following fields:

A 2-bit DetailLevel to specify the level of detail The DetailLevel may be L0 (greatest detail), L1, L2, or L3 (least detail).

A 3-bit HorizPattern to select a horizontal foveated rendering pattern, dependent on the level of detail. The horizontal foveated rendering pattern may be selected from the patterns shown in FIGS. 18A-C.

A 3-bit VertPattern to select a vertical foveated rendering pattern, dependent on the level of detail. The vertical foveated rendering pattern may be selected from the patterns shown in FIGS. 18A-C.

The foveated rendering patterns may specify one or more different techniques for reducing computation, as shown by an example foveated rendering pattern 1702 in FIG. 17:

Sample at a position: indicated by solid square.

Interpolate 1, 2, or 3 values between sample positions: indicated by hollow squares.

Replicate a value 2, 4, or 8 times: indicated by small solid or hollow circles joined by lines.

In particular embodiments, a HorizPattern 1700-A and a VertPattern 1700-B may be combined to produce a 2D pattern 1702. As can be seen in FIG. 17, the 2D pattern 1702 may be produced by replicating the HorizPattern 1700-A for each row that requires a sample in the VertPattern 1700-B, replacing it will interpolated values when VertPattern 1700-B specifies interpolation, and replicating the previous row's values when VertPattern 1700-B specifies replication. The 2D pattern 1702 may be used to determine how to generate each pixel value in each tile that is associated with the same detail level as the pattern 1702, as described above with reference to FIGS. 15D-15G.

Figure 18A:
FIGS. 18A-C show example foveated-rendering patterns for different detail levels.

FIG. 18A shows an example foveated-rendering pattern for detail level L0. In particular embodiments, different foveated rendering patterns may be available for each level of detail (e.g., each level L0-L3). At detail level L0, there may be one pattern, which may sample all 16 pixels either horizontally or vertically. In hardware, the pattern field may be ignored for detail level L0, so that each foveated rendering code may produce a valid result.

Figure 18B:
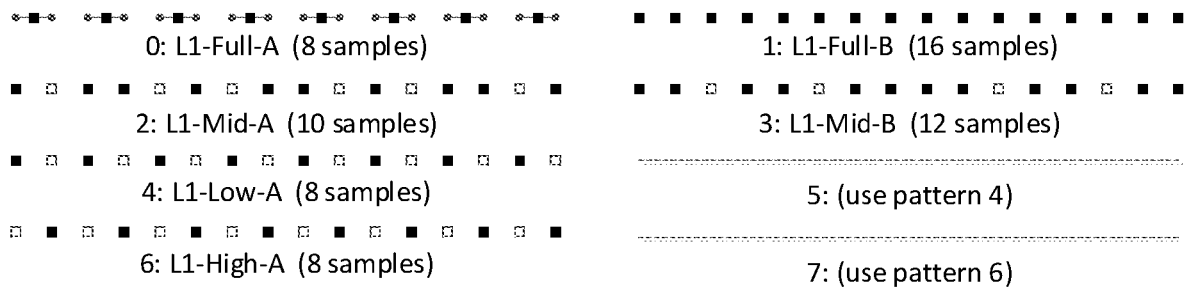

FIG. 18B shows example foveated rendering patterns for detail level L1. In particular embodiments, detail level L1 may specify six patterns: two that sample or replicate at each pixel (and may be used anywhere in a ring), two middle patterns, and an asymmetrical pattern having a sampled pixel at either the low address edge or high address edge. The two unused foveated rendering codes may be interpreted by hardware as the low and high patterns.

Figure 18C:
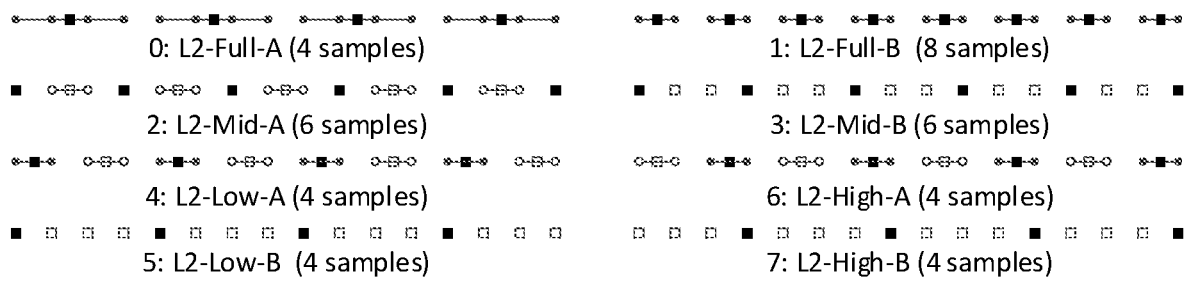

FIG. 18C shows example foveated rendering patterns for detail level L2. Detail level L2 may specify eight patterns: two that sample or replicate at each pixel (and may be used anywhere in a ring), two middle patterns, and two asymmetrical patterns, each having a sampled pixel at either the low address edge or high address edge. Detail level L2 may interpolate three values between two sampled positions. There may be an even or odd number of sample positions in each pattern Although this disclosure describes particular foveated rendering patterns, this disclosure contemplates any suitable foveated rendering patterns.

In particular embodiments, data defining each of the foveation patterns may be stored in a foveation table. The data in the foveation table may include the amount of replication and interpolation, and limitations on the tile usage (e.g., only low or high side). The foveation table may also specify an offset from the low address to the first sampled position and an increment amount between sample positions.

In particular embodiments, the transform block(s) 220, pixel block(s) 230, and display block(s) 240 of a display engine 112 may provide foveated rendering. The transform block 220 may look up the foveated rendering code for each tile and pass the foveated rendering code to the pixel block 230. The foveated rendering code may specify a level of detail and a foveated rendering pattern. There may be a different texture array of a different resolution for each detail level, and the pixel block 230 may use the specified level of detail to select the texture array to use for a surface. For example, detail level L0 may be associated with a 32×32 texture, L1 with a 16×16 texture, L2 with an 8×8 texture, L3 with a 4×4 texture, and so on. The pixel block 230 may use bilinear interpolation to sample a subset of positions in the tile based on offsets that may be specified by the selected foveated rendering pattern. In particular embodiments, at detail level L0, all 16×16 pixels of the tile may be sampled using bilinear interpolation from the texel array. At detail levels other than L0, a subset of the 16×16 pixels of the tile may be sampled using bilinear interpolation according to the selected foveated rendering pattern. For example, the pixel block 230 may use bilinear interpolation to sample the texel array for each pixel of the tile having a corresponding pixel location in the foveated rendering pattern with an operation identifier specifying a sampling operation. Further, the pixel block 230 may write the foveated rendering code to the display block 240 for each tile.

In particular embodiments, the display block 240 may store the foveated rendering code in a double buffer so that it can read the foveated rendering patterns for a row of tiles as it generates display pixels while the pixel block 230 is writing pixel colors and foveated rendering patterns for the next row of tiles. Further, the display block 240 may use the selected foveated rendering pattern to determine when to interpolate and when to replicate pixels. For example, for each pixel location in the foveated rendering pattern, the display block 240 may perform the operation specified by the operation identifier associated with the pixel location, which may be interpolation or replication, as described above with reference to FIG. 17. These pixel actions may involve storing data in line buffers and interpolating horizontally, vertically, or both.

In particular embodiments, interpolating tiles of pixels by transforming the corners may lead to perspective inaccuracy. As an example, the display engine 112 may bilinearly interpolate from the corner positions of the tile. This interpolation may result in an error if perspective causes a significant change in sample positions within the tile. The perspective error may be avoided by subdividing the tile so that the transform block 220 computes perspective-correct sample positions at edge mid-points in either the X or Y direction, or both directions. The 16×16 tile may then be split into 8×16, 8×8, or smaller pieces, as required by the degree of perspective error. This decision may be made for each edge separately, so that adjacent tiles make the same decision about whether to insert a perspective-correct midpoint. If one edge needs an inserted point but the opposite edge does not, the transform block 220 may insert an interpolated point on the opposite edge, rather than a perspective-correct point, to match the edge produced by the adjacent tile. When splitting tiles, the transform block 220 may also consider the level of foveation. If an edge is already split down to 2 samples due to foveation, then a mid-point may not be inserted. However, the computed positions may be moved to the centers of the two samples. The transform block 220 may perform this movement of the computed positions in cases where two samples are filtered in a particular dimension.

In particular embodiments, the microcontroller 212 may specify jitter offsets in X and Y. These offsets may be used to perform temporal blending. The microcontroller 212 may specify different jitter values per displayed frame to perform smoothing. The smoothing may include smoothing the edges between label regions, smoothing transitions between mipmap levels or foveated rendering patterns, and/or smoothing transitions between video frames. Jitter values may be specified in pixel units and may be passed to a pixel block 230 to be used in computing sample positions. A jitter value may be scaled based on the amount of pixel replication specified in the foveated rendering pattern, e.g., one-level coarser mipmap for 2× replication, and so on. Multiple jitter values may be specified within a single frame.

Figure 19:
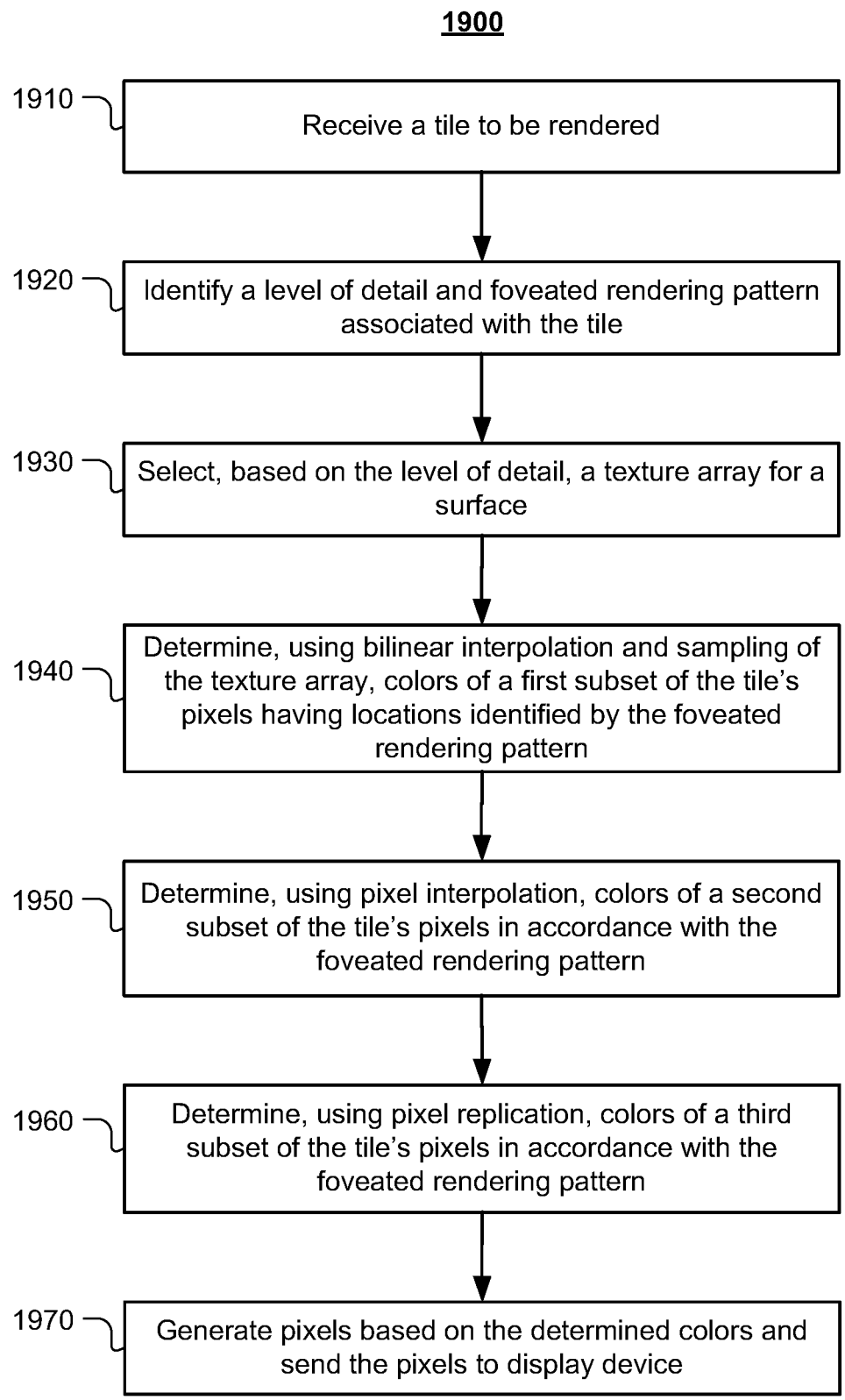
FIG. 19 illustrates an example method for foveated rendering.

FIG. 19 illustrates an example method 1900 for foveated rendering. The method 1800 may be performed by, for example, a display engine 112, and may generate pixels to be displayed by eye display 116A, 116B or other suitable display device. The method may begin at step 1910, where a transform block 220 may receive a tile to be rendered. At step 1920, the transform block may identify a level of detail and a foveated rendering pattern associated with the tile. The level of detail may correspond to a foveated or non-foveated region of a display 116A, 116B, for example. At step 1930, a pixel block 230 may select, based on the identified level of detail, a texture array for a surface. The pixel block 230 may retrieve the texture array from a texel memory 214. At step 1940, the pixel block 230 may determine, using bilinear interpolation and sampling of the texture array, colors of a first subset of the tile's pixels, where the locations of the pixels are identified by the foveated rendering pattern. In particular embodiments, the pixel block 230 may use bilinear interpolation to sample a subset of positions in the tile based on offsets that may be specified by the selected foveated rendering pattern. At step 1950, a display block 240 may determine, using pixel interpolation, colors of a second subset of the tile's pixels in accordance with the foveated rendering pattern. The foveated rendering pattern may identify the pixels that are to be interpolated. At step 1960, the display block 240 may determine, using pixel replication, colors of a third subset of the tile's pixels in accordance with the foveated rendering pattern. The foveated rendering pattern may identify the pixels that are to be replicated. At step 1970, the display block 240 may generate pixels based on the determined colors and send the pixels to display device.

Particular embodiments may repeat one or more steps of the method of FIG. 19, where appropriate. Although this disclosure describes and illustrates particular steps of the method of FIG. 19 as occurring in a particular order, this disclosure contemplates any suitable steps of the method of FIG. 19 occurring in any suitable order. Moreover, although this disclosure describes and illustrates an example method for foveated rendering, including the particular steps of the method of FIG. 19, this disclosure contemplates any suitable method for doing so, including any suitable steps, which may include all, some, or none of the steps of the method of FIG. 19, where appropriate. Furthermore, although this disclosure describes and illustrates particular components, devices, or systems carrying out particular steps of the method of FIG. 19, this disclosure contemplates any suitable combination of any suitable components, devices, or systems carrying out any suitable steps of the method of FIG. 19.

Figure 20:
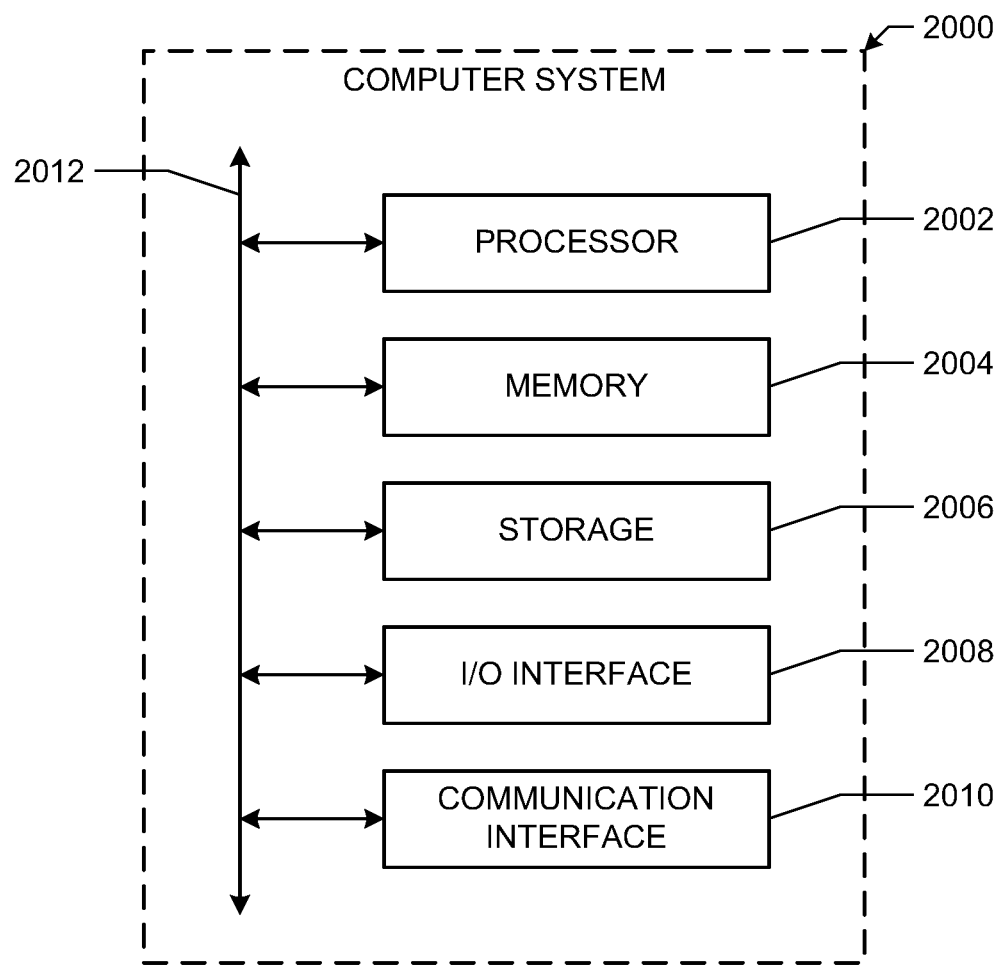
FIG. 20 illustrates an example computer system.

FIG. 20 illustrates an example computer system 2000. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real-time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2002 includes hardware for executing instructions, such as those making up a computer program. As an example and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002. Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere). One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memories 2004, where appropriate. Although this disclosure describes and illustrates particular memory, this disclosure contemplates any suitable memory.

In particular embodiments, storage 2006 includes mass storage for data or instructions. As an example and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it. As an example and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining (a) a first time interval for rendering first pixel values for a first portion of an image and (b) a second time interval for rendering second pixel values for a second portion of the image, wherein the first portion and the second portion of the image are part of a plurality of portions of the image to be output by a display;
   accessing a representation of virtual objects in a virtual scene;
   determining that the first time interval is insufficient for rendering the first pixel values for the first portion of the image based on the representation of virtual objects;
   in response to determining that the first time interval is insufficient:
      determining a first viewpoint of a user, the first viewpoint being associated with a first time;
      rendering, based on the first viewpoint of the user and a simplified representation of the virtual objects in the scene, the first pixel values for the first portion of the image; and
      sending the first pixel values to be output by the display;
   determining that the second time interval is sufficient for rendering the second pixel values for the second portion of the image based on the representation of virtual objects; and
   in response to determining that the second time interval is sufficient:
      determining a second viewpoint of the user, the second viewpoint being associated with a second time;
      rendering, based on the second viewpoint of the user and the representation of the virtual objects in the scene, the second pixel values for the second portion of the image; and
      sending the second pixel values to be output by the display.

2. The method of claim 1, wherein:
   the determination that the first time interval is insufficient is made while rendering a previous image that precedes the image.

3. The method of claim 1, further comprising:
   determining that a third time interval is insufficient for rendering third pixel values for a third portion of the image based on the representation of virtual objects; and
   in response to determining that the third time interval is insufficient, setting the third pixel values for the third portion of the display to a default value.

4. The method of claim 3, wherein the default value is a single color or a transparent value.

5. The method of claim 1, wherein the representation of virtual objects in the virtual scene has a first number of object representations, wherein the simplified representation of virtual objects in the virtual scene includes a second number of object representations fewer than the first number.

6. The method of claim 5, wherein each of the object representations is a surface.

7. The method of claim 1, wherein one or more removed object representations that are included in the representation of virtual objects and not included in the simplified representation of virtual objects are selected to be removed according to one or more predetermined rules.

8. The method of claim 7, wherein the one or more predetermined rules are based on one or more of: a screen coverage size, location, or priority of an object representation.

9. The method of claim 1, further comprising:
   in response to the determination that the first time interval is insufficient, causing an application that defines the virtual objects in the virtual scene to simplify the virtual scene.

10. One or more computer-readable non-transitory storage media embodying software that is operable when executed to:
    determine (a) a first time interval for rendering first pixel values for a first portion of an image and (b) a second time interval for rendering second pixel values for a second portion of the image, wherein the first portion and the second portion of the image are part of a plurality of portions of the image to be output by a display;
    access a representation of virtual objects in a virtual scene;
    determine that the first time interval is insufficient for rendering the first pixel values for the first portion of the image based on the representation of virtual objects;
    in response to determining that the first time interval is insufficient:
       determine a first viewpoint of a user, the first viewpoint being associated with a first time;
       render, based on the first viewpoint of the user and a simplified representation of the virtual objects in the scene, the first pixel values for the first portion of the image; and
       send the first pixel values to be output by the display;
    determine that the second time interval is sufficient for rendering the second pixel values for the second portion of the image based on the representation of virtual objects; and
    in response to determining that the second time interval is sufficient:
       determine a second viewpoint of the user, the second viewpoint being associated with a second time;
       render, based on the second viewpoint of the user and the representation of the virtual objects in the scene, the second pixel values for the second portion of the image; and
       send the second pixel values to be output by the display.

11. The storage media of claim 10, wherein:
    the determination that the first time interval is insufficient is made while rendering a previous image that precedes the image.

12. The storage media of claim 10, wherein the software that is operable when executed to:

determine that a third time interval is insufficient for rendering third pixel values for a third portion of the image based on the representation of virtual objects;

in response to determining that the third time interval is insufficient, set the third pixel values for the third portion of the display to a default value.

13. The storage media of claim 12, wherein the default value is a single color or a transparent value.

14. The storage media of claim 10, wherein the representation of virtual objects in the virtual scene has a first number of object representations, wherein the simplified representation of virtual objects in the virtual scene includes a second number of object representations fewer than the first number.

15. The storage media of claim 14, wherein each of the object representations is a surface.

16. A system comprising: one or more processors; and a memory coupled to the processors comprising instructions executable by the processors, the processors being operable when executing the instructions to:

determine (a) a first time interval for rendering first pixel values for a first portion of an image and (b) a second time interval for rendering second pixel values for a second portion of the image, wherein the first portion and the second portion of the image are part of a plurality of portions of the image to be output by a display;

access a representation of virtual objects in a virtual scene;

determine that the first time interval is insufficient for rendering the first pixel values for the first portion of the image based on the representation of virtual objects;

in response to determining that the first time interval is insufficient:

determine a first viewpoint of a user, the first viewpoint being associated with a first time;

render, based on the first viewpoint of the user and a simplified representation of the virtual objects in the scene, the first pixel values for the first portion of the image; and send the first pixel values to be output by the display;

determine that the second time interval is sufficient for rendering the second pixel values for the second portion of the image based on the representation of virtual objects; and in response to determining that the second time interval is sufficient:

determine a second viewpoint of the user, the second viewpoint being associated with a second time;

render, based on the second viewpoint of the user and the representation of the virtual objects in the scene, the second pixel values for the second portion of the image; and send the second pixel values to be output by the display.

17. The system of claim 16, wherein:

the determination that the first time interval is insufficient is made while rendering a previous image that precedes the image.

18. The system of claim 16, wherein the processors are further operable when executing the instructions to:

determine that a third time interval is insufficient for rendering third pixel values for a third portion of the image based on the representation of virtual objects;

in response to determining that the third time interval is insufficient, set the third pixel values for the third portion of the display to a default value.

19. The system of claim 18, wherein the default value is a single color or a transparent value.

20. The system of claim 16, wherein the representation of virtual objects in the virtual scene has a first number of object representations, wherein the simplified representation of virtual objects in the virtual scene includes a second number of object representations fewer than the first number.

* * * * *